United States Patent

[11] 3,634,828

[72] Inventors Roderick H. Myers
Wethersfield;
David L. Sharp, New Britain, both of Conn.

[21] Appl. No. 67,185
[22] Filed Aug. 26, 1970
[45] Patented Jan. 11, 1972
[73] Assignee United Aircraft Corporation
East Hartford, Conn.

[54] GRAPHICAL DATA PROCESSING APPARATUS
35 Claims, 32 Drawing Figs.

[52] U.S. Cl. .......... 340/172.5
[51] Int. Cl. .......... G06f 3/12,
G06k 15/10
[50] Field of Search .......... 340/172.5;
197/1; 101/13, 93

[56] References Cited

UNITED STATES PATENTS

| | | | |
|---|---|---|---|
| 3,236,351 | 2/1966 | Fitch et al. | 197/1 |
| 3,296,960 | 1/1967 | Felcheck et al. | 340/172.5 X |
| 3,348,212 | 10/1967 | Tubinis | 340/172.5 |
| 3,432,844 | 3/1969 | Winston | 340/324 |
| 3,453,421 | 7/1969 | Tonnesson | 235/150.4 |
| 3,453,648 | 7/1969 | Stegenga | 346/76 |
| 3,496,333 | 2/1970 | Alexander et al. | 219/216 |
| 3,509,817 | 5/1970 | Sims, Jr. | 340/172.5 X |
| 3,354,817 | 11/1967 | Sakurai et al. | 101/93 |
| 3,582,897 | 6/1971 | Marsh, Jr. | 340/172.5 |
| 3,174,427 | 3/1965 | Taylor | 101/93 |

*Primary Examiner*—Paul J. Henon
*Assistant Examiner*—Jan E. Rhoads
*Attorney*—Melvin Pearson Williams

ABSTRACT: Hard copy graphical output of a suitably programmed data processing system is generated in a matrix printer in response to controls and binary image information presented to the graphical system of the invention in the form of serially received data blocks, such as from a tape drive. The graphical system in accordance herewith receives data blocks including binary information in the form of standard templates, 16 printable dots wide and 16 printable dots high. The data block includes an input address for storing each binary image data template which follows the address. The system also receives in the data blocks, literal address codes which are stored in predetermined sequentially addressed locations of memory, the order of receipt of the literal address codes relating to the order in which the templates are to be accessed for printing. The input addresses used for storing literal address codes and binary image data templates comprise high-order address portions, the system herewith supplying sequences of low-ordered address portions to be used therewith for the purpose of accessing repetitively, in sequence, 16 storage locations for each input address received in the data block. Variations in graphical format are achieved with variations in the video clock rate with respect to the data presentation rate at the imager, variations in sheet transport speed, variations in the basic system clock rate, horizontal and vertical linking of basic templates, truncation of templates (to less than the standard size), and resolution variation resulting from single or quadruple spot generation per binary image bit. Data blocks received by the system include system control characters for controlling the above features. Indirect addressing includes automatic generation of low-order address bits for both read and write addresses of a read-write memory; automatic low-order address generation for read addresses controls scanning of the data through successive memory locations in a correct order to print one dot row at a time for as many data templates as should appear in the print line, repetitively, as many times as there are rows in the templates designated for the print line.

INVENTORS
RODERICK H. MYERS
DAVID L. SHARP

BY [signature]
ATTORNEY

FIG. 2a MEMORY LAYOUT
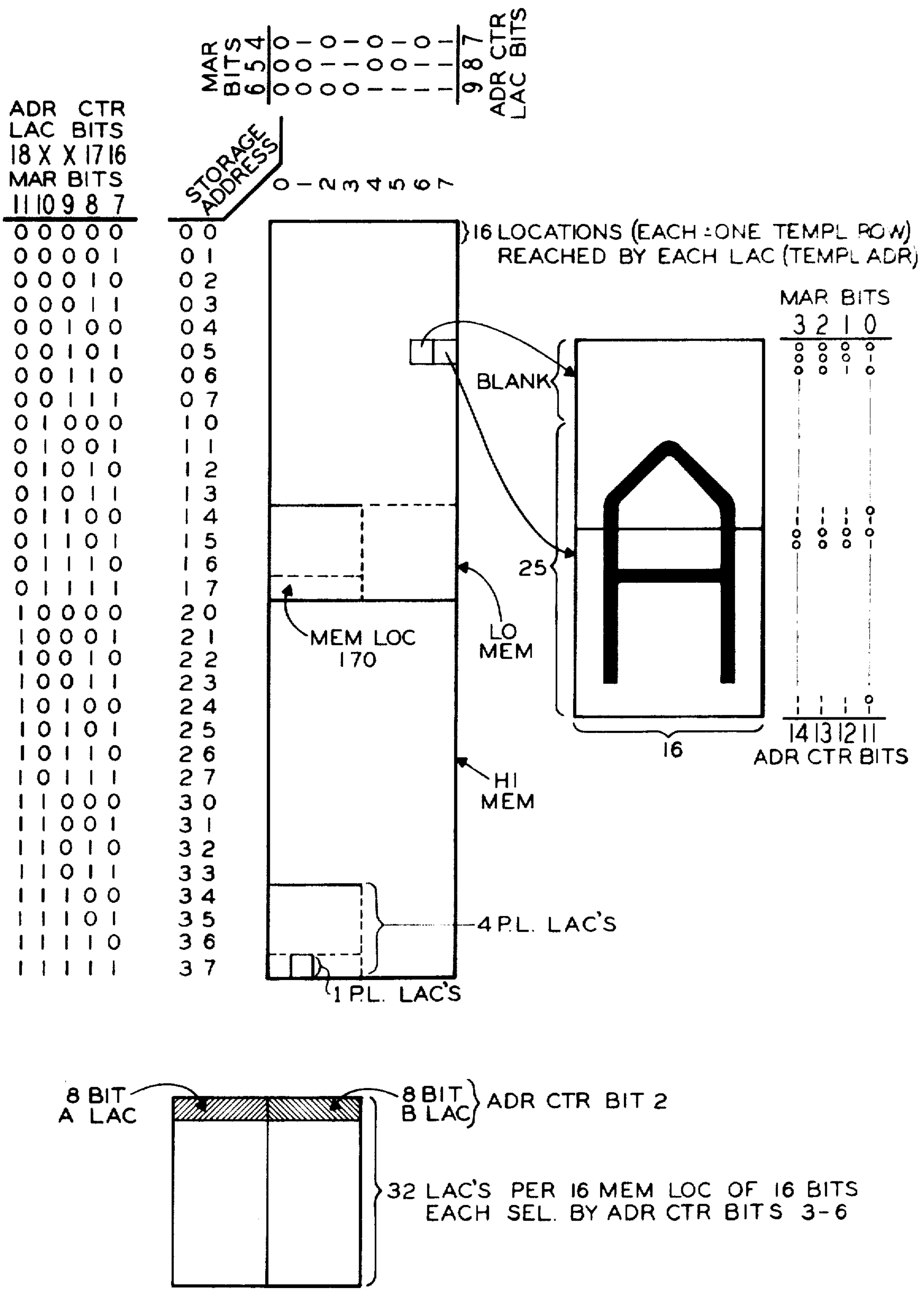

FIG. 2d 16 x 32 VERTICAL LINKING
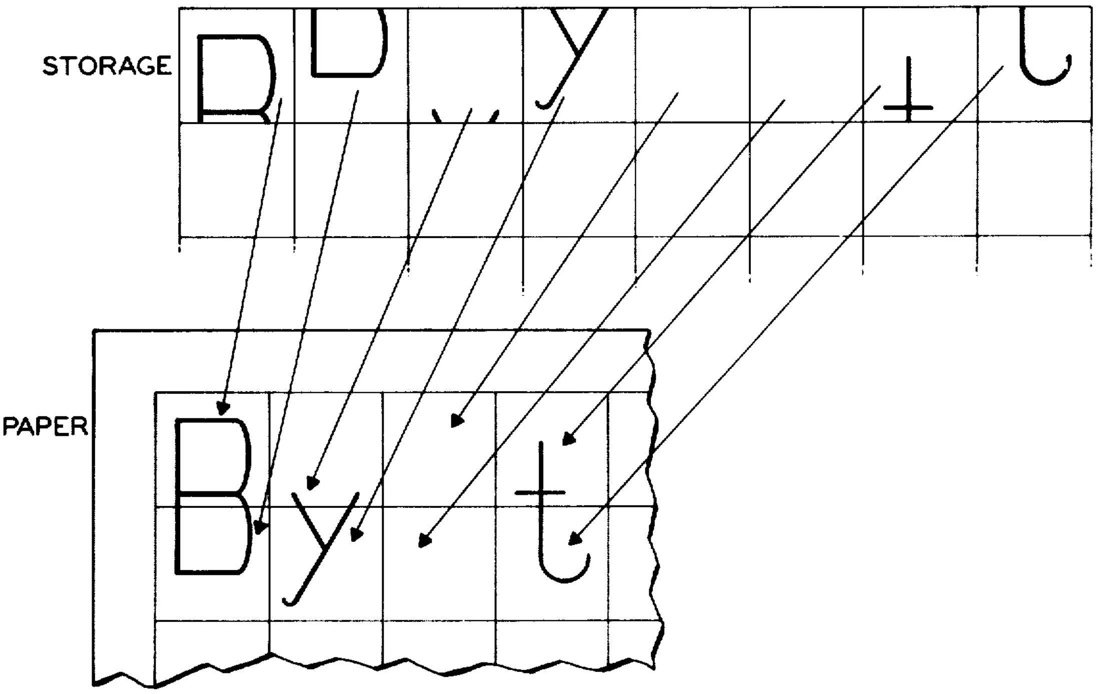
FIG. 2e 16 X 25 VERTICAL LINKING
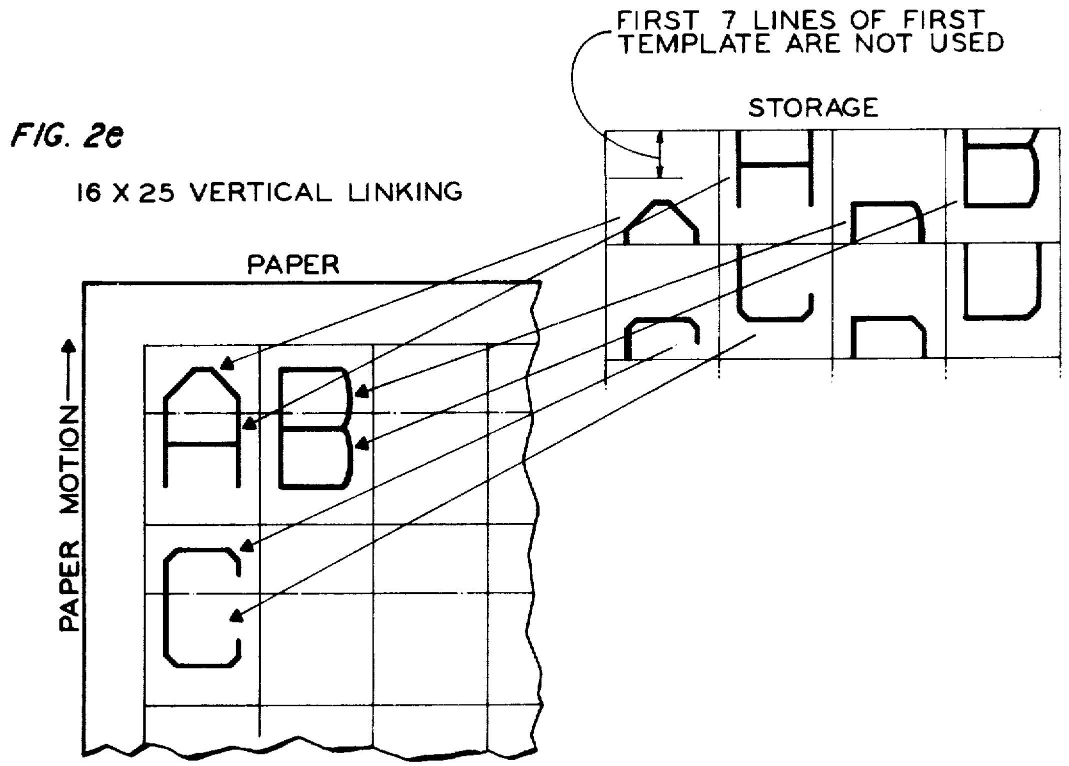

FIG. 3 CLOCKS
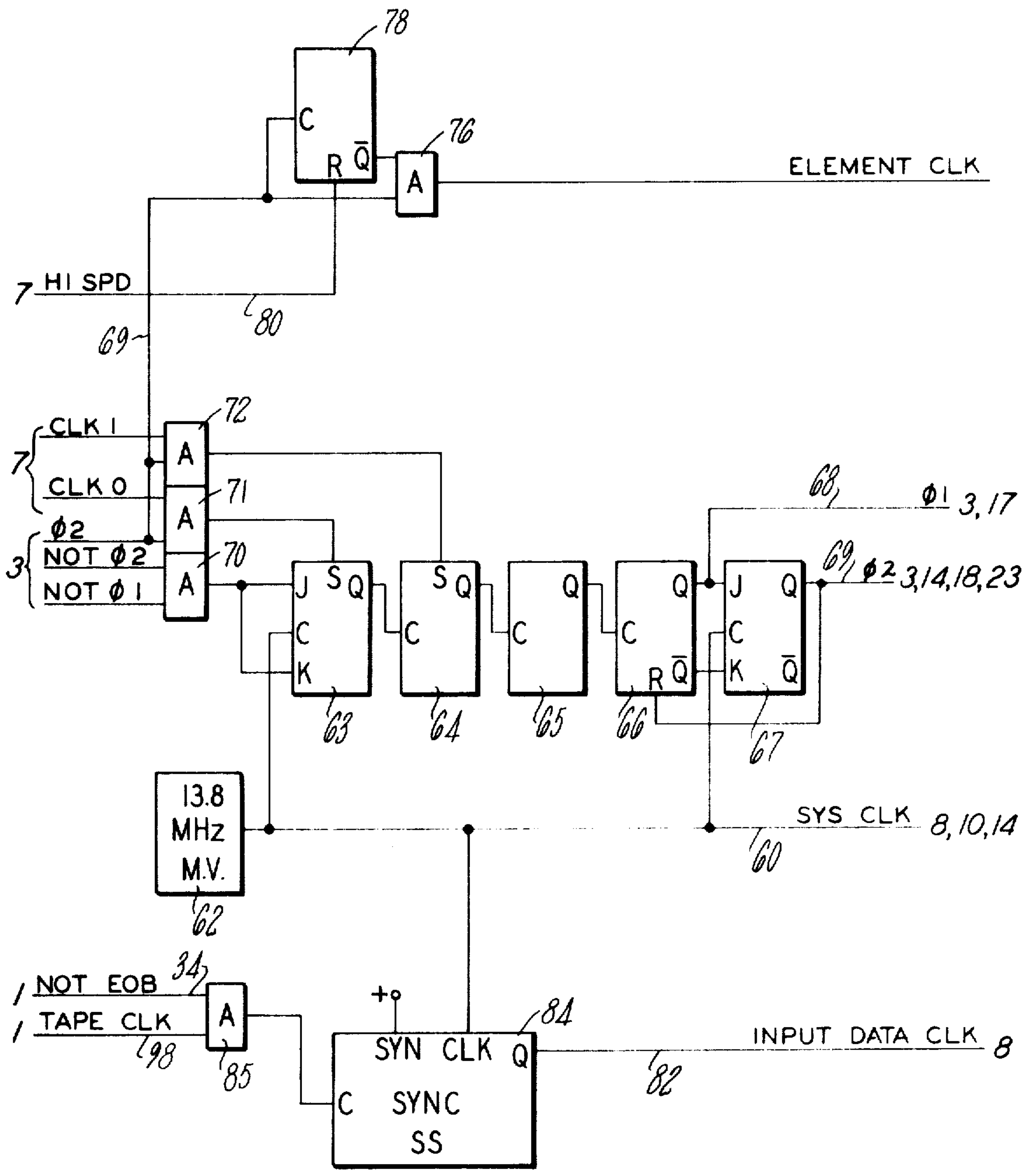

FIG. 4 CLOCKING
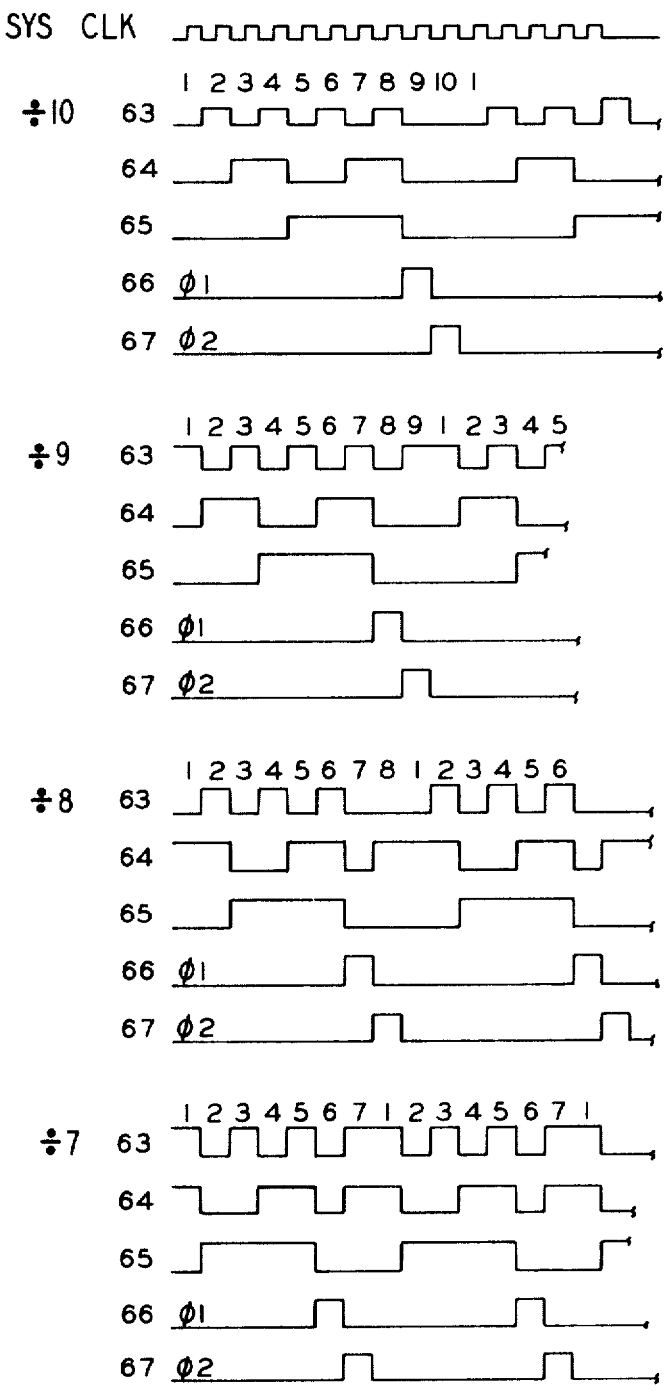

FIG. 7 SYS INPUT
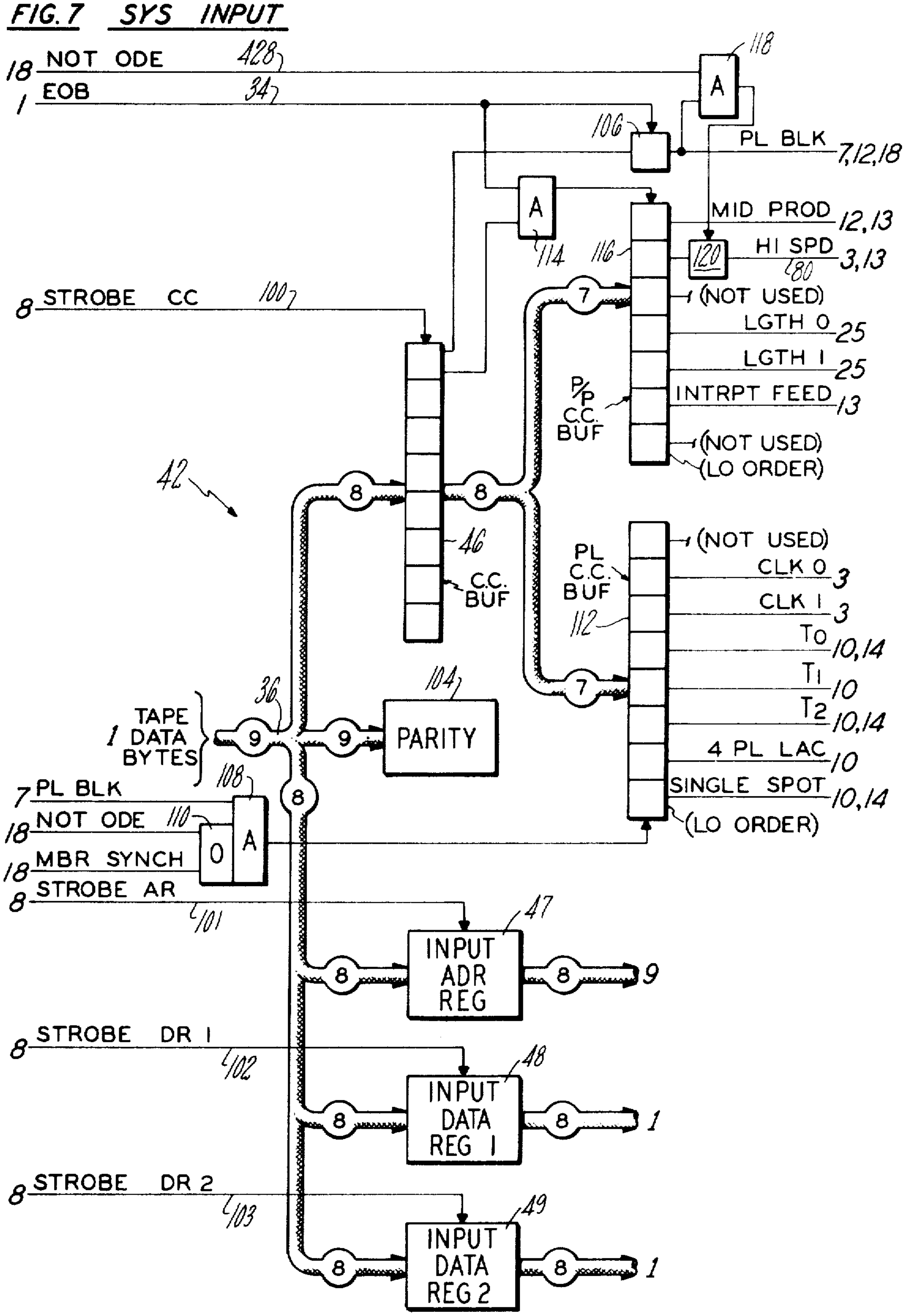

FIG. 8 INPUT CONTROLS
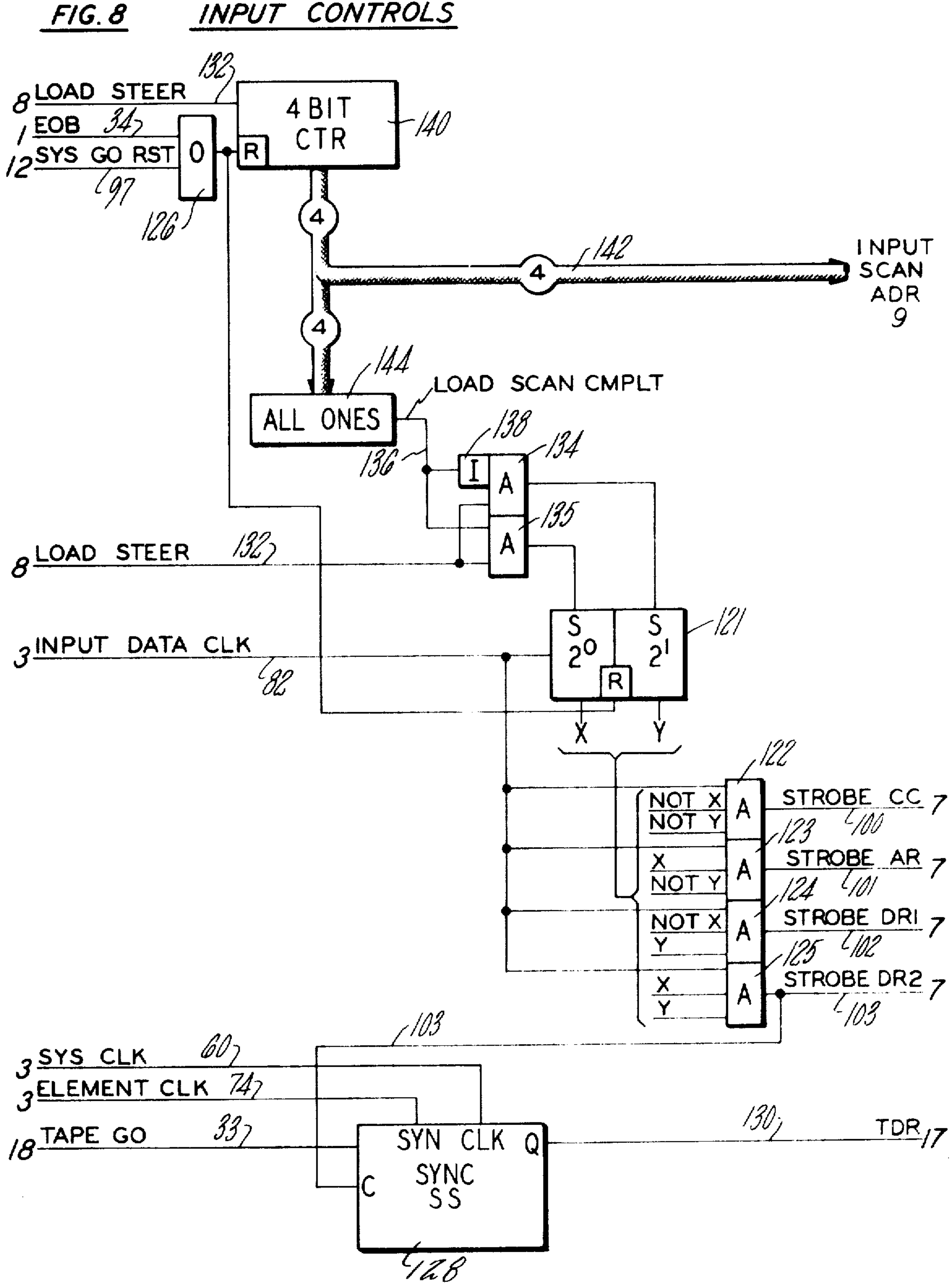

FIG. 9 ADDRESSING
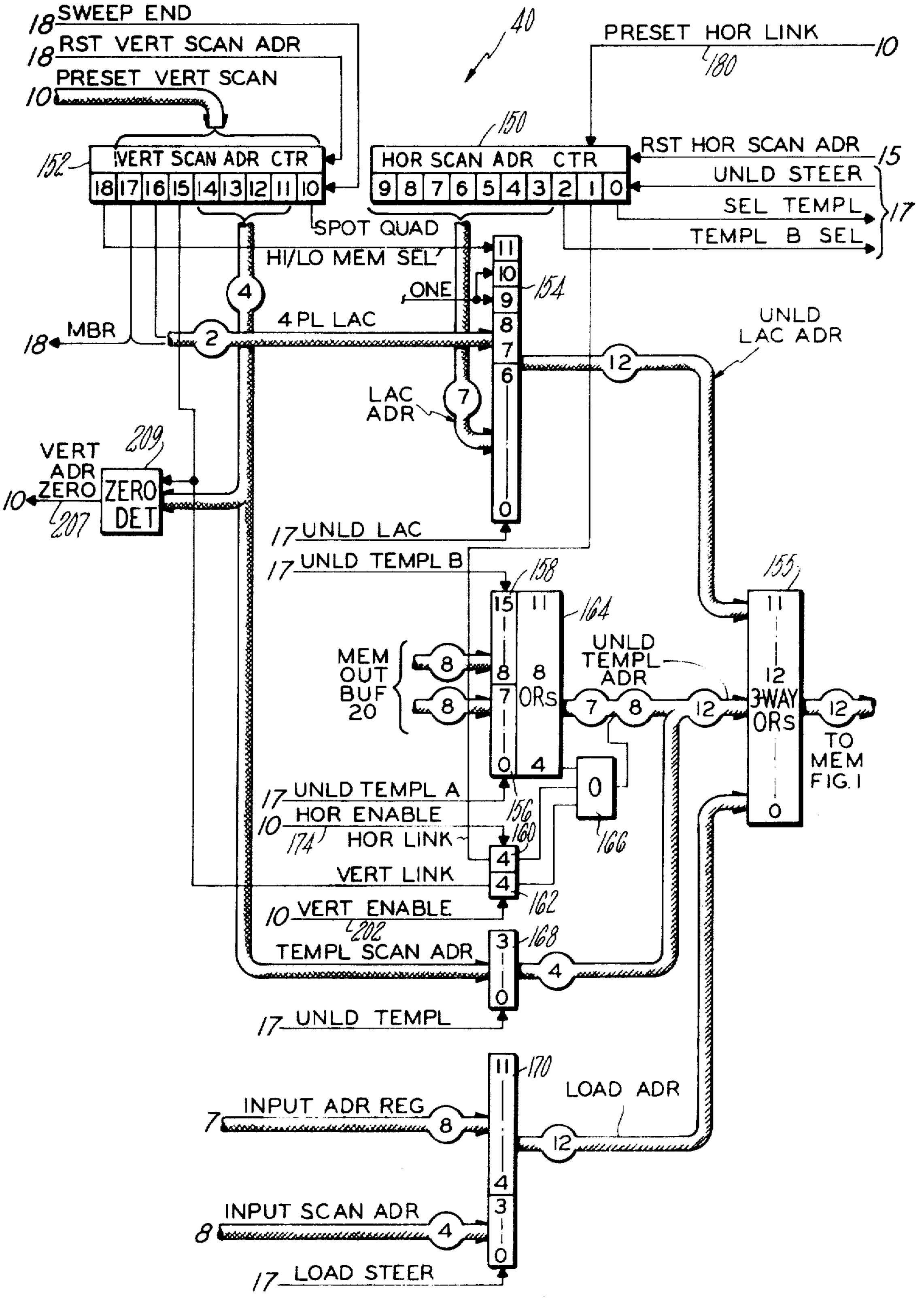

FIG. 10 SCAN ADR CONTROL
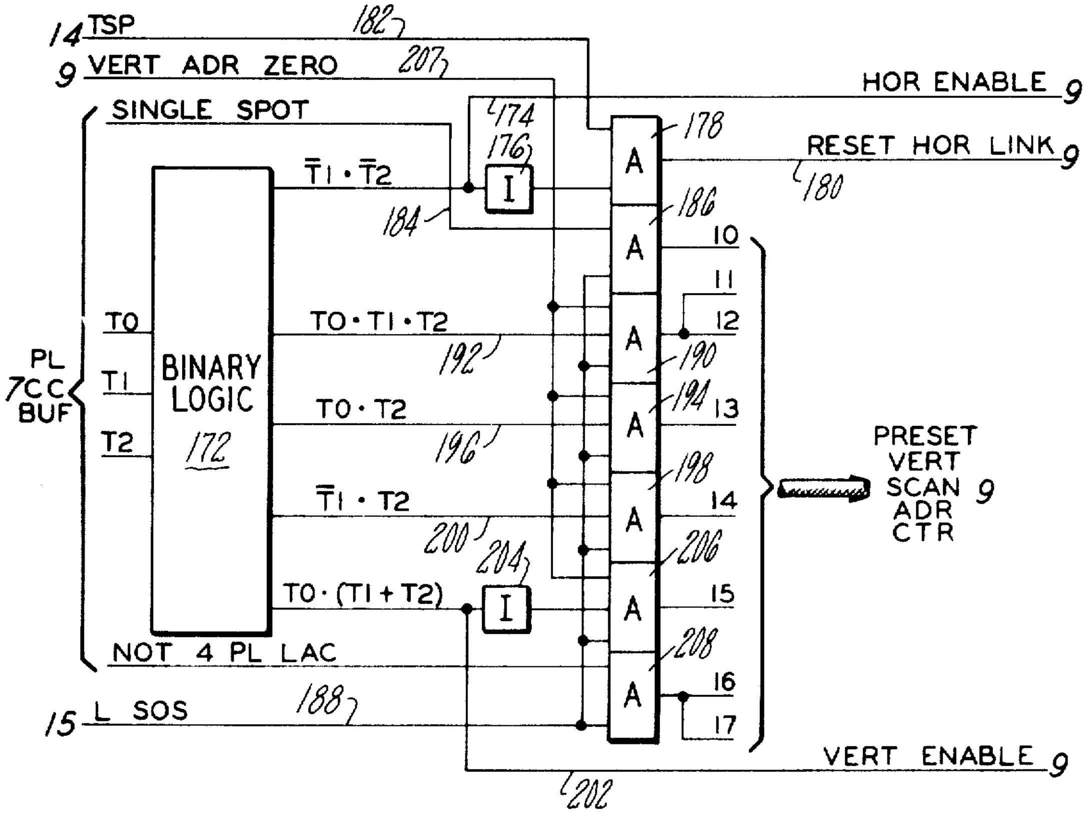
FIG. 11 TEMPLATE CONFIGURATION
| PL CC BUF T0 | T1 | T2 | WIDTH x HEIGHT | LINK | VERT. SCAN ADR PRESET REQ'D DEC. | BINARY |
|---|---|---|---|---|---|---|
| 0 | 0 | 0 | NOT USED | — | — | — |
| 0 | 0 | 1 | 16X8 | — | 24 | 1 1 0 0 0 |
| 0 | 1 | 0 | 8 X16 | — | 16 | 1 0 0 0 0 |
| 0 | 1 | 1 | 16X16 | — | 16 | 1 0 0 0 0 |
| 1 | 0 | 0 | 32X16 | HOR | 16 | 1 0 0 0 0 |
| 1 | 0 | 1 | 16X20 | VERT | 12 | 0 1 1 0 0 |
| 1 | 1 | 1 | 16X25 | VERT | 7 | 0 0 1 1 1 |
| 1 | 1 | 0 | 16X32 | VERT | 0 | 0 0 0 0 0 |
| | | | VERT SCAN ADR CTR BITS→ | | | 15 14 13 12 11 |

FIG. 12 SYSTEM START/STOP-RUN
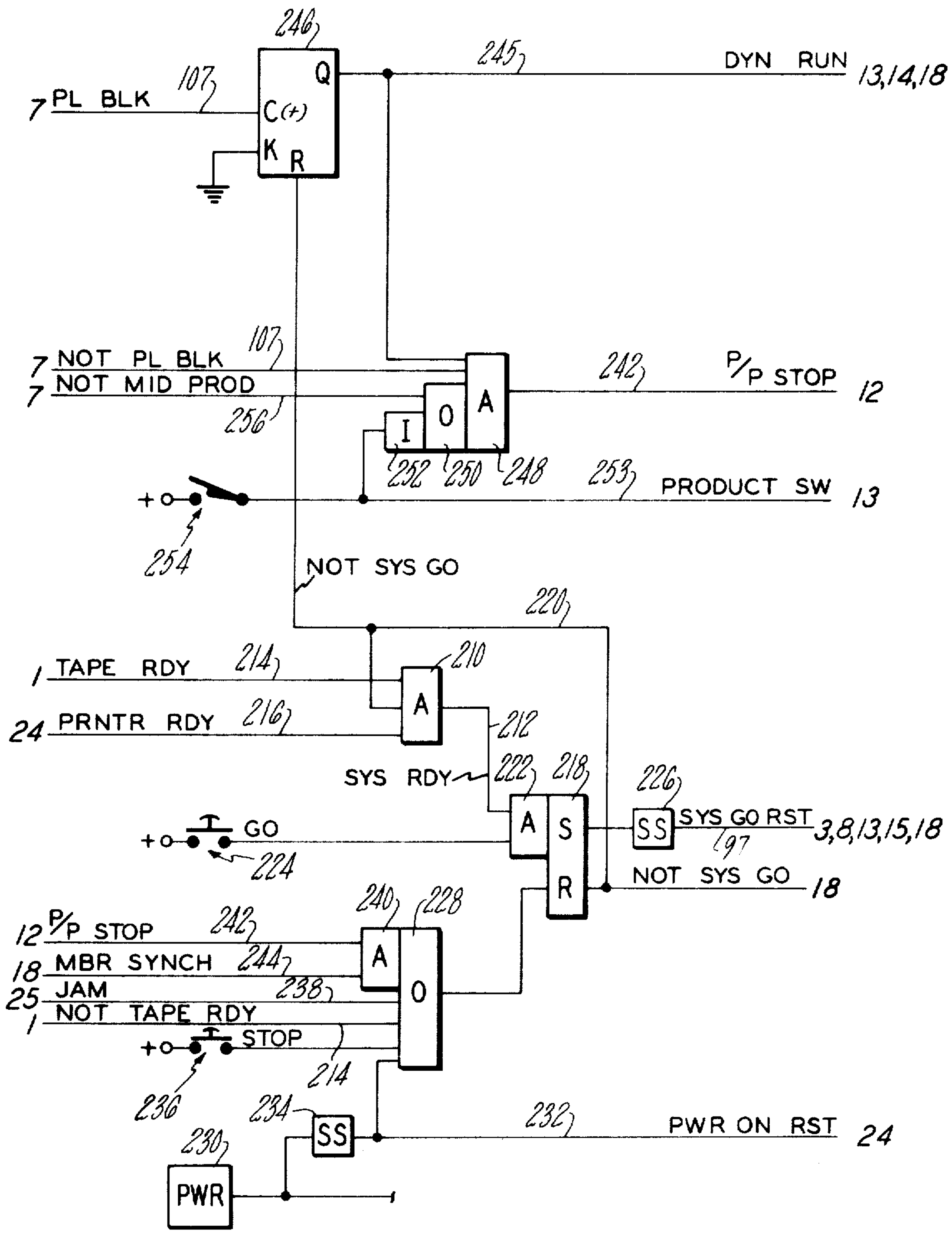

FIG. 13 PRINT FEED/SPEED
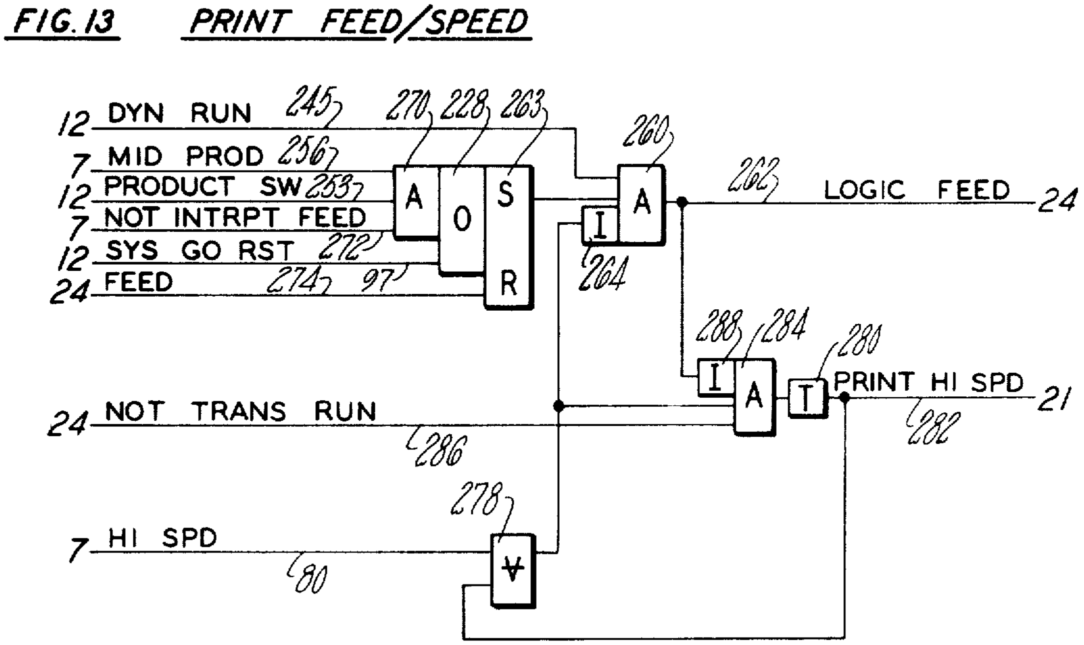

FIG. 14 TEMPLATE SYNC
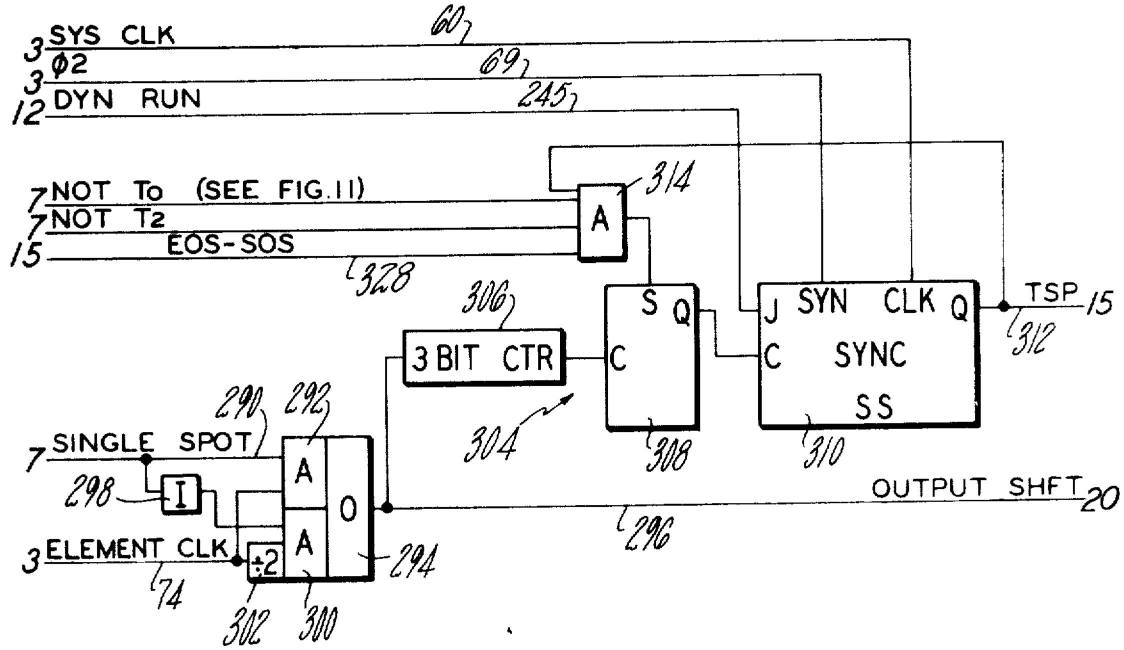
FIG. 5
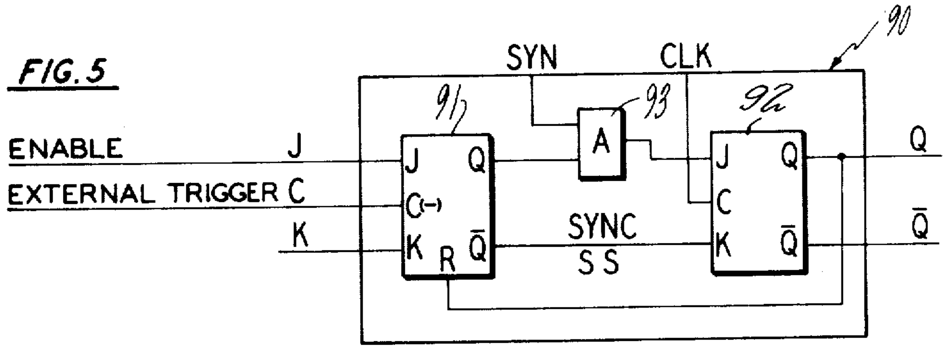
FIG. 6
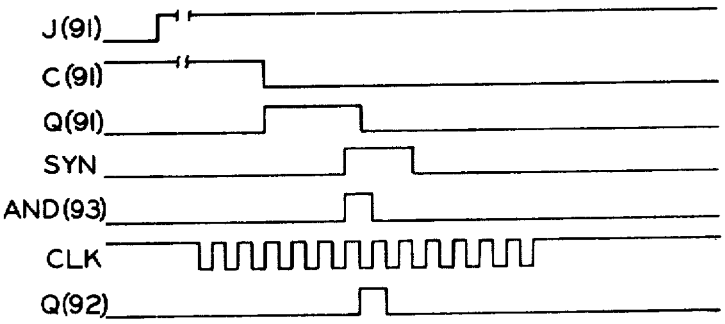

FIG. 16 SWEEP CTRL TIMING
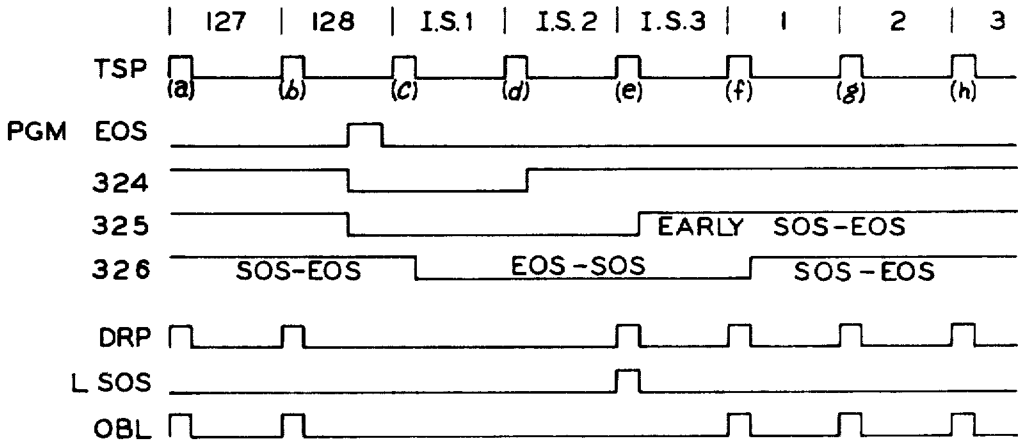
FIG. 15 SWEEP CTRL
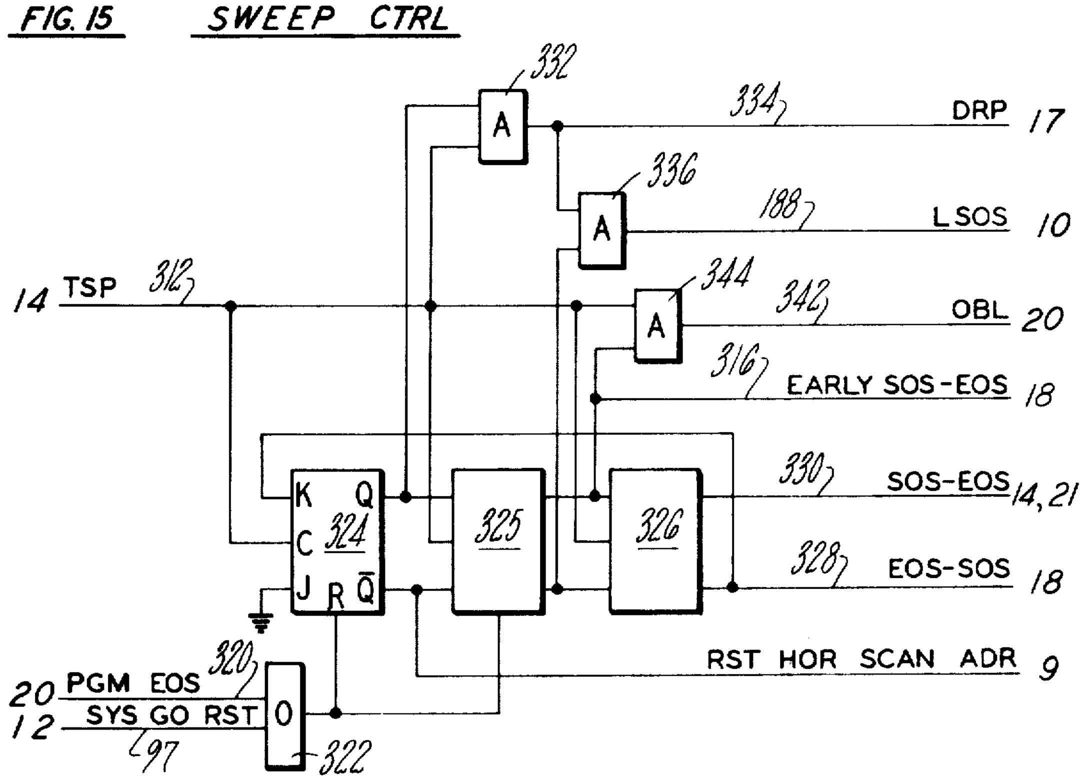

FIG. 17 MEM CONTROLS
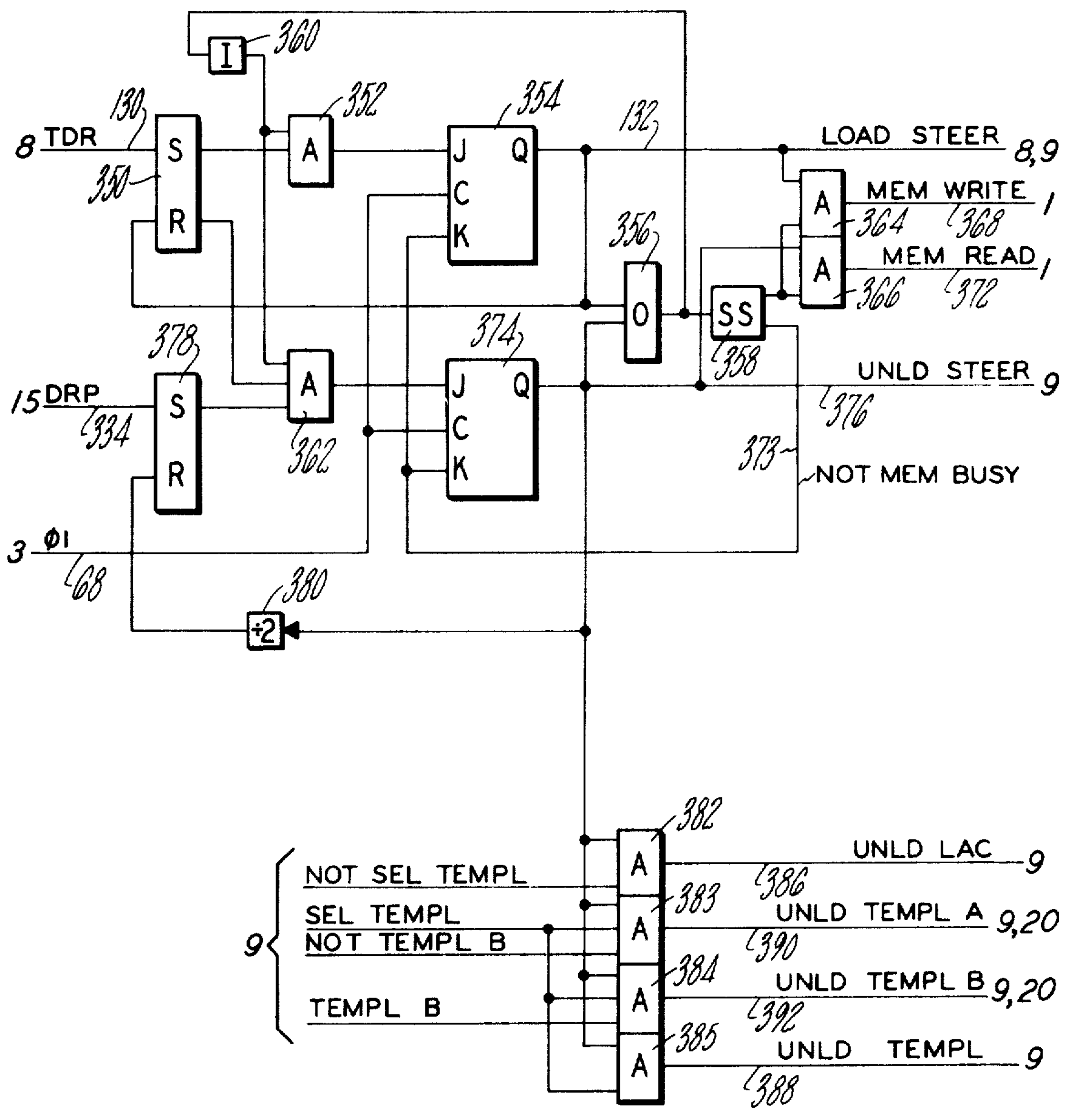

FIG. 18 MAIN FUNCTION CONTROLS
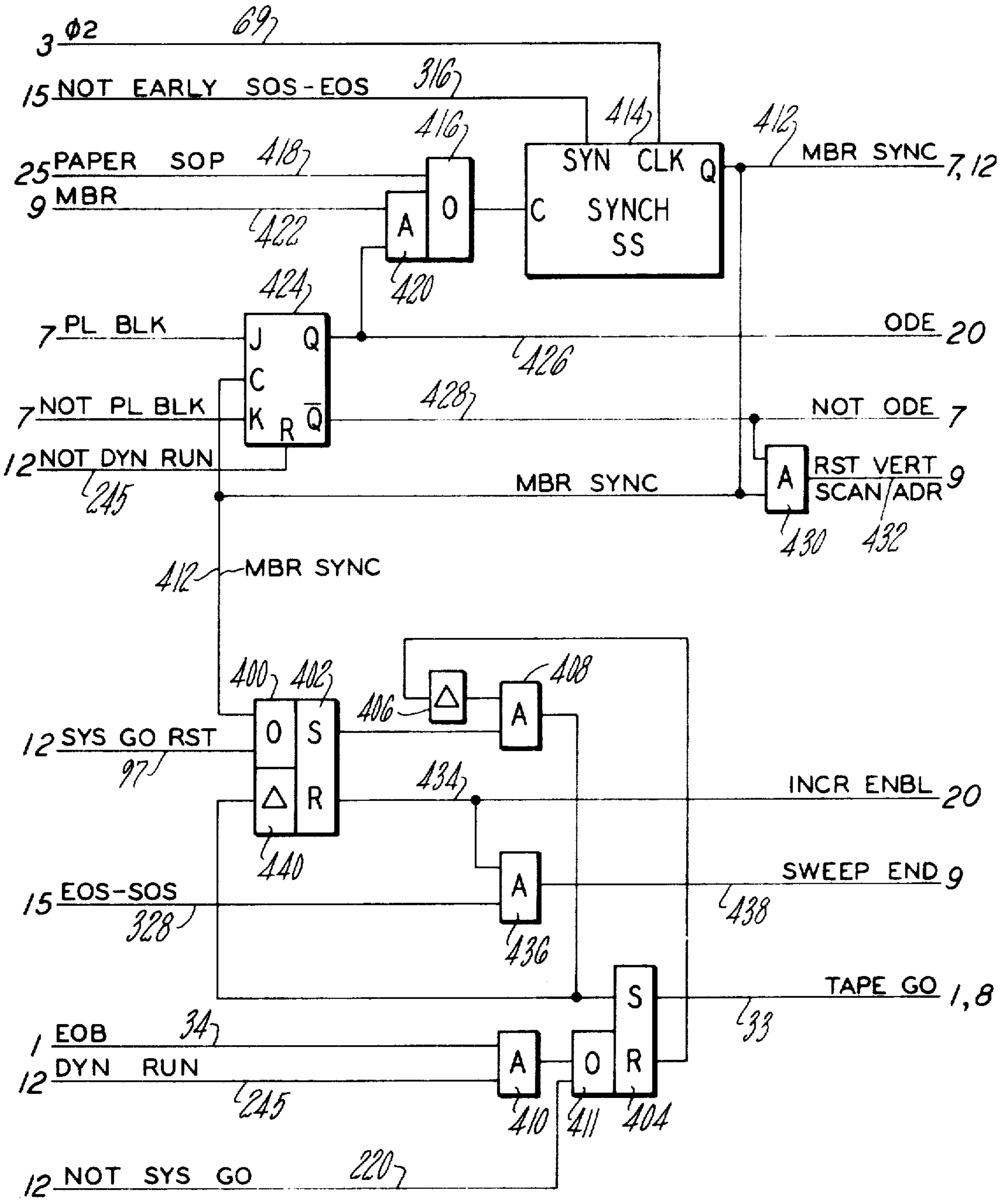

FIG. 19 MACRO TIMING
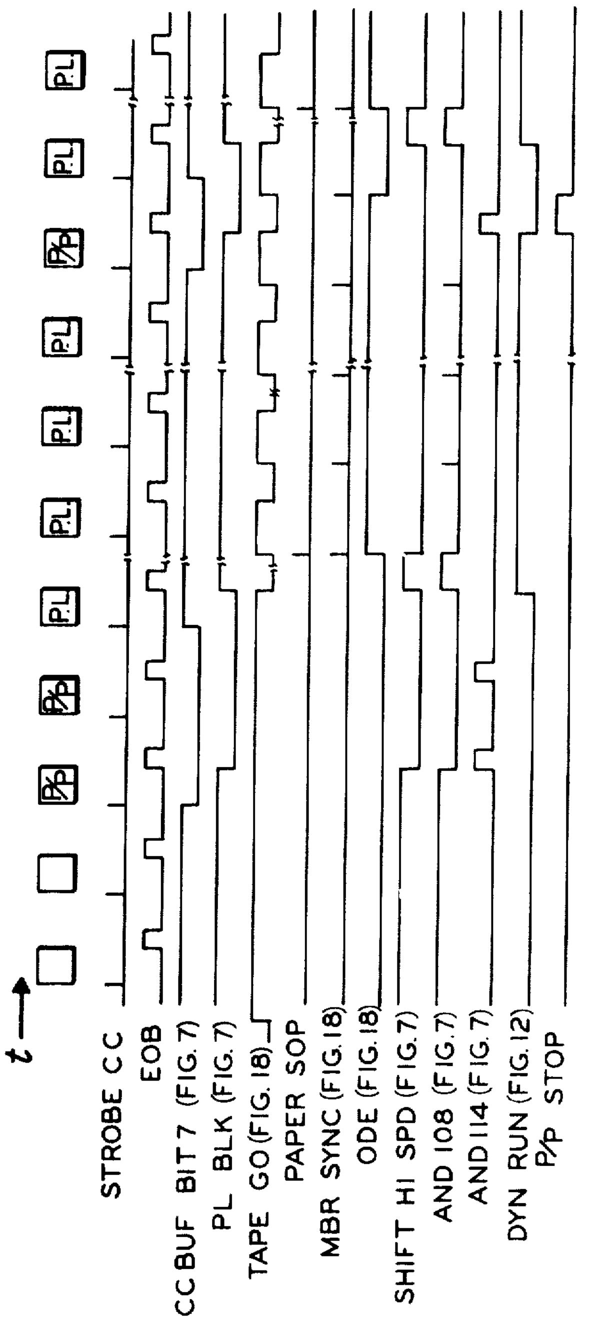

FIG. 20 MEMORY OUTPUT
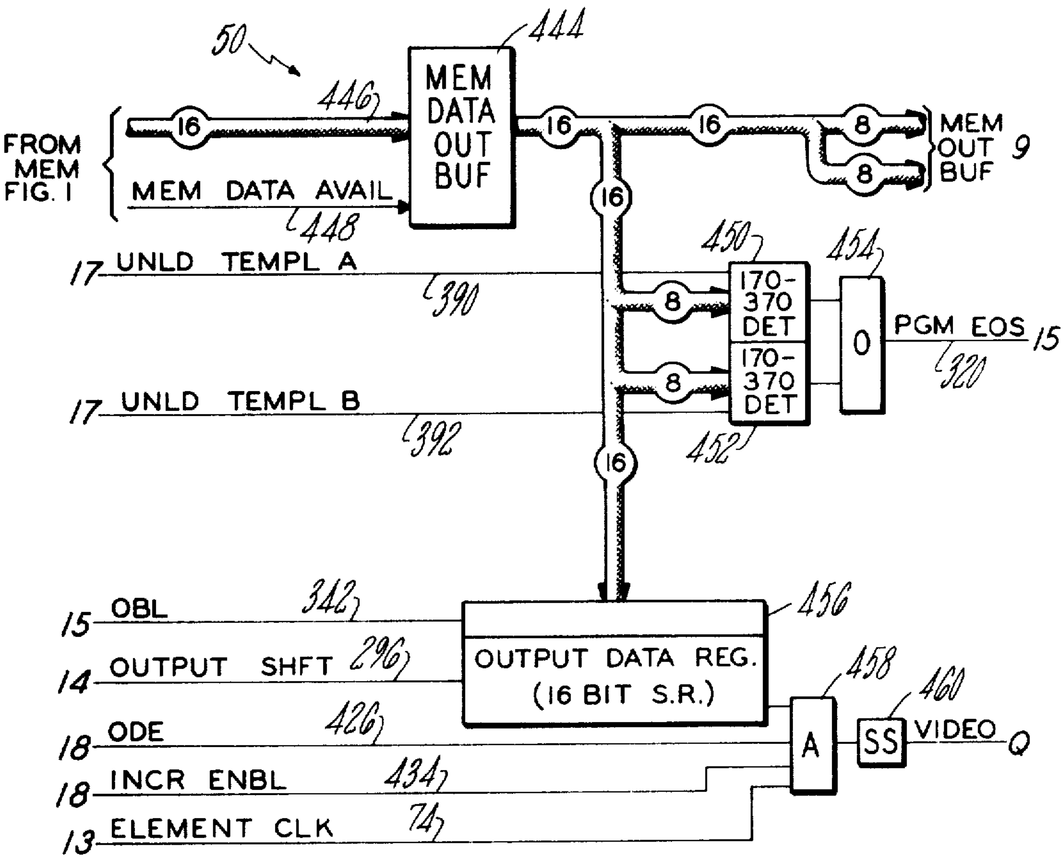

FIG. 22 FEED TIMING

GRAPHICAL DATA PROCESSING APPARATUS

CROSS-REFERENCE TO RELATED APPLICATIONS

The variable clock circuitry illustrated herein is disclosed and claimed in a copending application of the same assignee, Ser. No. 67,169 entitled INVARIANT CLOCK SIGNALS SEPARATED BY VARIABLE TIME INTERVAL, filed on even date herewith by D. L. Sharp.

The printer section disclosed herein is described with more particularity in a copending application of the same assignee, Ser. No. 67,168 entitled PRINTER/PLOTTER SHEET TRANSPORT filed on even date herewith by D. L. Sharp and D. P. Modeen, reference to which is hereby made to complete the disclosure herein.

BACKGROUND OF THE INVENTION

Field of Invention

This invention relates to graphical data processing and more particularly to a graphical printer/plotter utilizing a matrix printer responsive to binary image data derived from an indirectly addressed read/write memory.

Description of the Prior Art

Data processing has grown rapidly in recent years into a very sophisticated technology where, seemingly, there is no limit to the size or complexity of numerical, statistical and other data calculations and compilations which may be accomplished therewith. However, as speed, size and throughput of data processing equipment have increased, it has become more and more apparent that the achievement of suitable hard copy output from processors, both in terms of alphameric text and graphical data presentation (such as charts and bar graphs), has failed to keep pace with the development of the data processors per se. Primary consideration has been given to development of suitable printers; as a result, line printers (such as the well-known chain printer) have been developed which print at relatively high speed (on the order of 1,000 lines per minute) with medium quality at a moderate cost. However, the quality is found to be insufficient for finished products such as high-level management reports and externally distributed copy, and the like. On the other hand, phototypesetting devices are capable of very high quality; but such devices are very expensive and extremely slow, and therefore have limited utility. Not available, heretofore, is a high-speed printer (in excess of 1,000 lines per minute) capable of printing with a quality suitable for external distribution and high-level internal use, at an intermediate cost.

In the case of plotting graphical information from computers, the art is less well developed. Most plotting devices capable of working from digital data prepared by computer, and use either online, or driven by suitable means such as a tape device either online or off-line, are low-cost, low-quality devices which require minutes to prepare a page of coordinate information in graphical form; such devices may take tens of minutes to print graphical aids such as bar charts. Some devices have been made to operate with high quality, but in each case, the increase in quality is paid for by a decrease in speed performance. The time required to plot a page of graphical information with devices known to the art is several orders of magnitude greater than the time required to print ordinary alphameric text.

SUMMARY OF INVENTION

An object of the present invention is to provide a printer responsive to digital information capable of high-quality print at high speed at a cost which is commensurate to lesser devices known in the art. Another object of the present invention is to provide a plotting device capable of plotting graphical information of high quality at very high speed and at cost comparable to the cost of devices known to the art. A further object of the present invention is to provide a digital hard copy output device capable of both printing and plotting at high speed and with high quality.

According to the present invention, there is provided computer output printing and plotting means which utilizes a programmable memory device to provide printer image control in response to data-related addresses. In accordance with the invention, the program of the data processor is competent not only to establish the order in which images are selected for printing (such as through addresses and commands relating thereto) but also to specify, on a line by line, a page by page, or a page-group basis, the set of images from which ordered selection is to be made by any given sequence of data-related addresses and commands related thereto. Stated alternatively, the program can define both the ultimate data content and the access route to that data. In accordance with one aspect of the invention, binary image data relating to at least a portion of a desired graphical image are stored, at least a portion of the stored binary image being utilized within a given time unit to create corresponding images at a surface, the composite of such images presenting information in human-recognized form. In accordance with the invention, information is represented in the form of standard templates of uniformly sized dot matrix binary images to represent portions of the final, desired human-recognizable images relating to the information, together with addresses presented in a sequence relating to the desired sequence of presentation of the various generated image portions.

According to the present invention, computer output printing and plotting means utilizing a programmable memory device to provide print image control in response to data-related addresses employs indirect addressing wherein sequences of low order addresses are generated to specify the order of storing incoming data in areas of memory determined by incoming data-related addresses, and to access successive locations of memory utilizing stored data related addresses.

According to the invention still further, a read/write memory is loaded with binary image data to be utilized for generating corresponding images in a matrix printer, the binary image data being accessed in response to memory output address signals, or literal address codes, which are stored in an ordered fashion in the memory means, whereby the order of appearance of binary image information for recording by the matrix printer is determined by the order in which a related memory output address is fetched. A source means such as a tape drive presents blocks of data signals to the system, the data signals including memory output address signals or literal address codes which are preceded in the data blocks by first memory input signals which define where they are to be stored, and those blocks of data signals which include binary image information signals preceded by second input addresses defining random portions of memory, related to the memory output address signals, where the binary information is to be stored. A system in accordance with the invention includes input means, such as buffer registers, data paths and control means for receiving information from the source and causing the output addresses and binary information to be stored in the memory means. In accordance with one aspect of the invention, the source means presents only high-order address portions, and sequences of input storage addresses are automatically generated, using the high-order portions provided from the source and sequentially generated low-order portions, for storing related output addresses or binary image information in sequential storage locations of the memory means.

In accordance with one aspect of the present invention, data is handled in the form of standard templates of N sets of M binary bits per set. In accordance still further with the invention, the standard data templates may be linked so that more than one data template may be accessed by utilizing a single memory output address, or literal address code, provided from the source. In accordance further with the invention, the data templates may be horizontally linked so as to provide N sets of P×M binary bits per set or may be vertically linked so as to provide K×N sets of M binary bits per set. In further accord with the invention, both linked and unlinked templates may be truncated so as to provide: less than M×N binary bits in a printed template; less than N sets in at least one template of a vertically linked group of K templates (thereby to provide less than K×N sets in the group); or less than M bits per set. In accordance further with the invention, these characteristics may be utilized so as to control interline spacing by specifying the total size of a printable template, and by utilizing less of the template to actually specify dot images in the corresponding image to be recorded on a print-receiving web, whereby not only the font, but the intercharacter and interline spacing may be controlled through the definition of the binary image within a selectable template configuration.

In further accord with the present invention, the standard template configuration is chosen to comprise as many dots per row as there are bits in an addressable storage location of the memory means; according to one aspect of the invention, one high-order address portion is utilized to reach all of the storage locations related to the storage of a standard data template, and automatic sequential low-order addressing is utilized to reach the different storage locations related to rows of the template. In accordance with another aspect of the invention, the memory output addresses, or literal address codes, comprise half as many bits as are contained in an addressable storage location, said output addresses being stored in areas of memory commensurate with the size of an area required to store a standard data template, low-order addressing being utilized to reach various ones of the storage locations within the area. In accordance further with the invention, accessing of memory output addresses, or literal address codes, is achieved sequentially, the order in which the data templates are to be recorded by the printer being determined by the related literal address codes being stored in the sequential areas of memory, there being included in the system in accordance herewith means to access each of the ordered locations containing memory output addresses twice in succession, thereby to access both memory output addresses stored in a given storage location.

In further accord herewith, control over basic system synchronization is in response to master, or system clock signals, the printing of images being in response to element clock signals derived by dividing system clock signals by an integral number, said number being adjustable, whereby the rate of printing dot images is adjustable. In accordance further with the invention, selectable element clock signal frequencies, combined with a fixed scan rate of the dot image-generating means provides controllable dot-to-dot spacing in the matrix printer. In accordance further with the invention, a length of a print line to be generated in the matrix printer is program controllable by specifying uniquely detectable end of sweep, or end of line, control signals, said signals being stored in the same fashion as said output address signals or literal address codes, whereby said signals may be repetitively accessed to designate the ends of successive ones of single-dot lines utilized to compose an entire multidot-high print line of characters or plotted graphics.

In accordance with the invention, the data blocks received from the source may be so arranged as to provide sufficient literal address codes and data templates for either a single print line, or multiple print lines.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

FIG. 1*a* is a graphical representation of memory organization in the embodiment of FIG. 1;

FIG. 2*d* is a graphical representation of storage and printing of 16×32 vertically linked template configurations;

FIG. 2*e* is a graphical representation of storage and printing related to 16×25 vertically linked and truncated template configurations;

Figure 21:
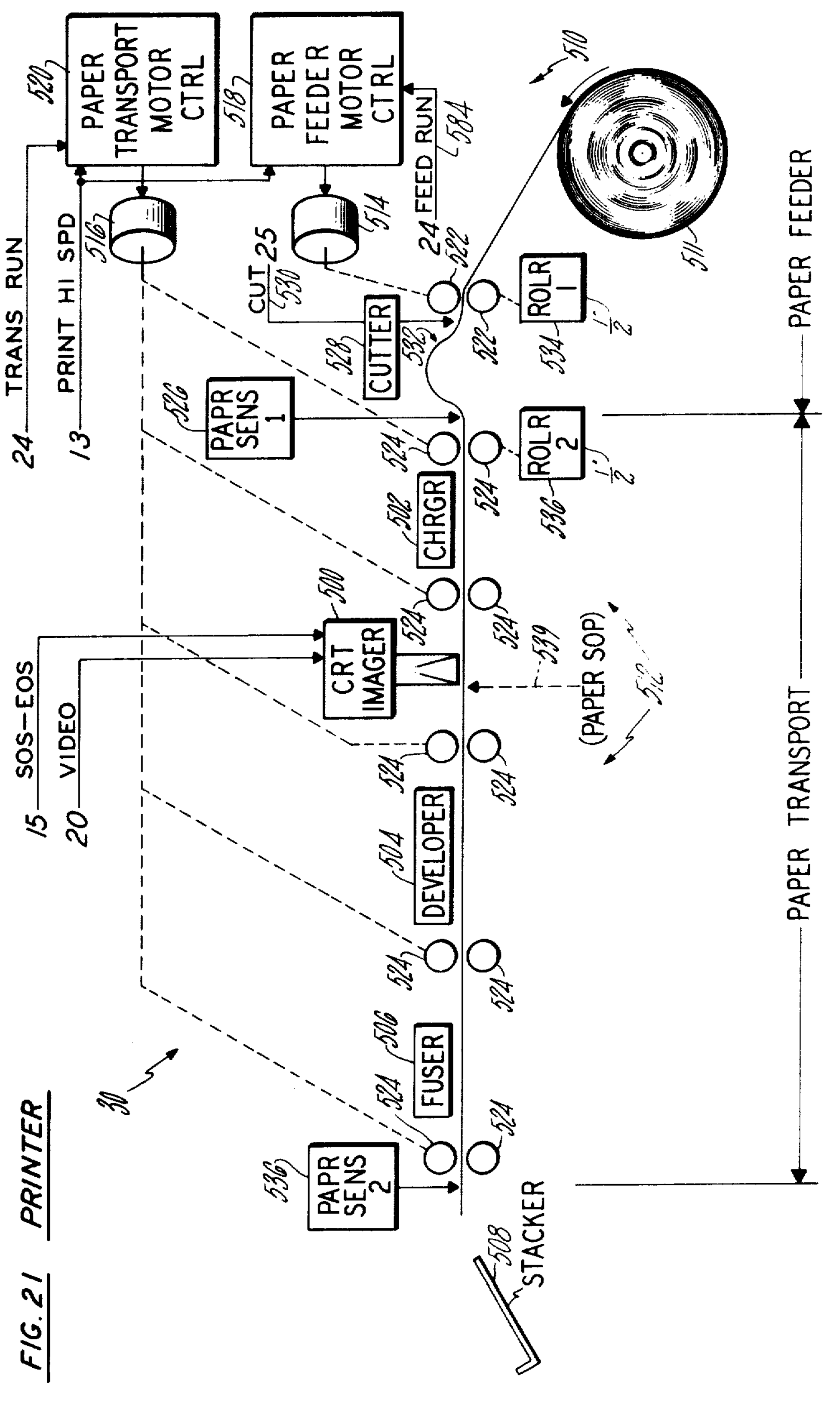
Figure 22:
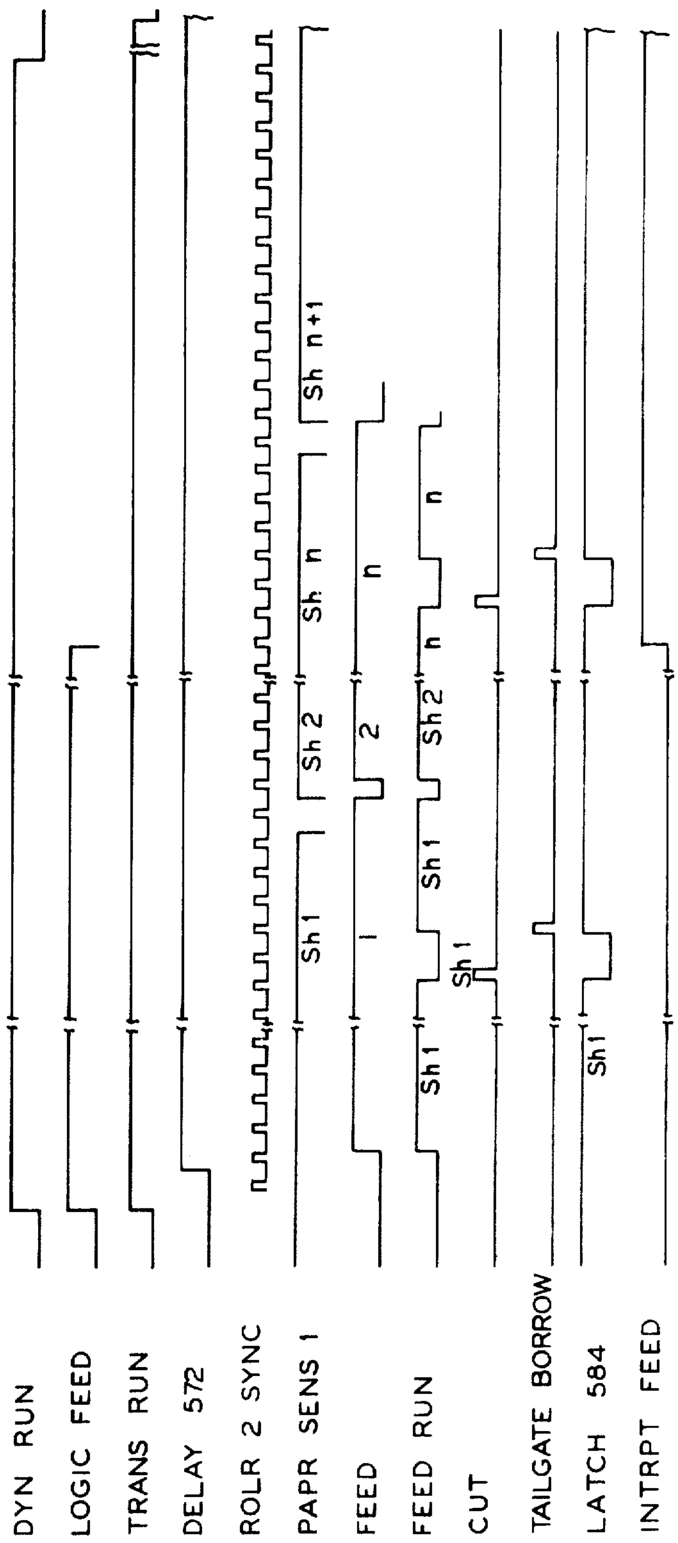
Figure 23:
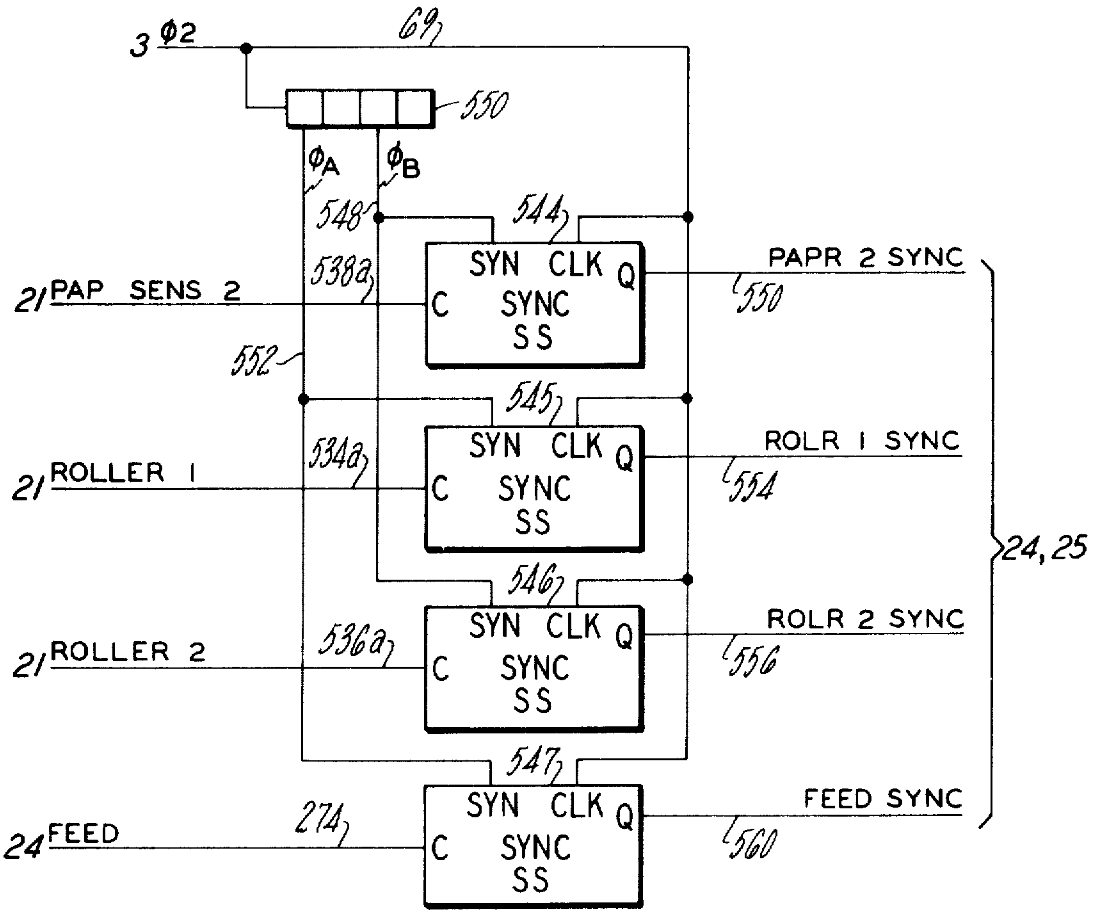
Figure 23A:
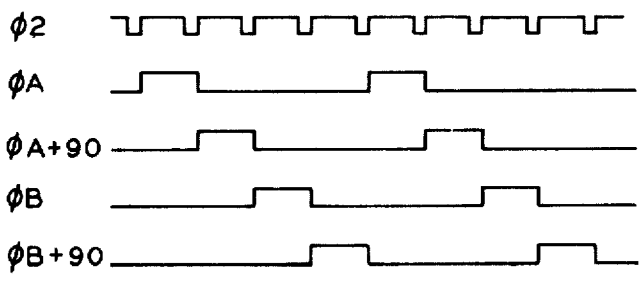
Figure 24:
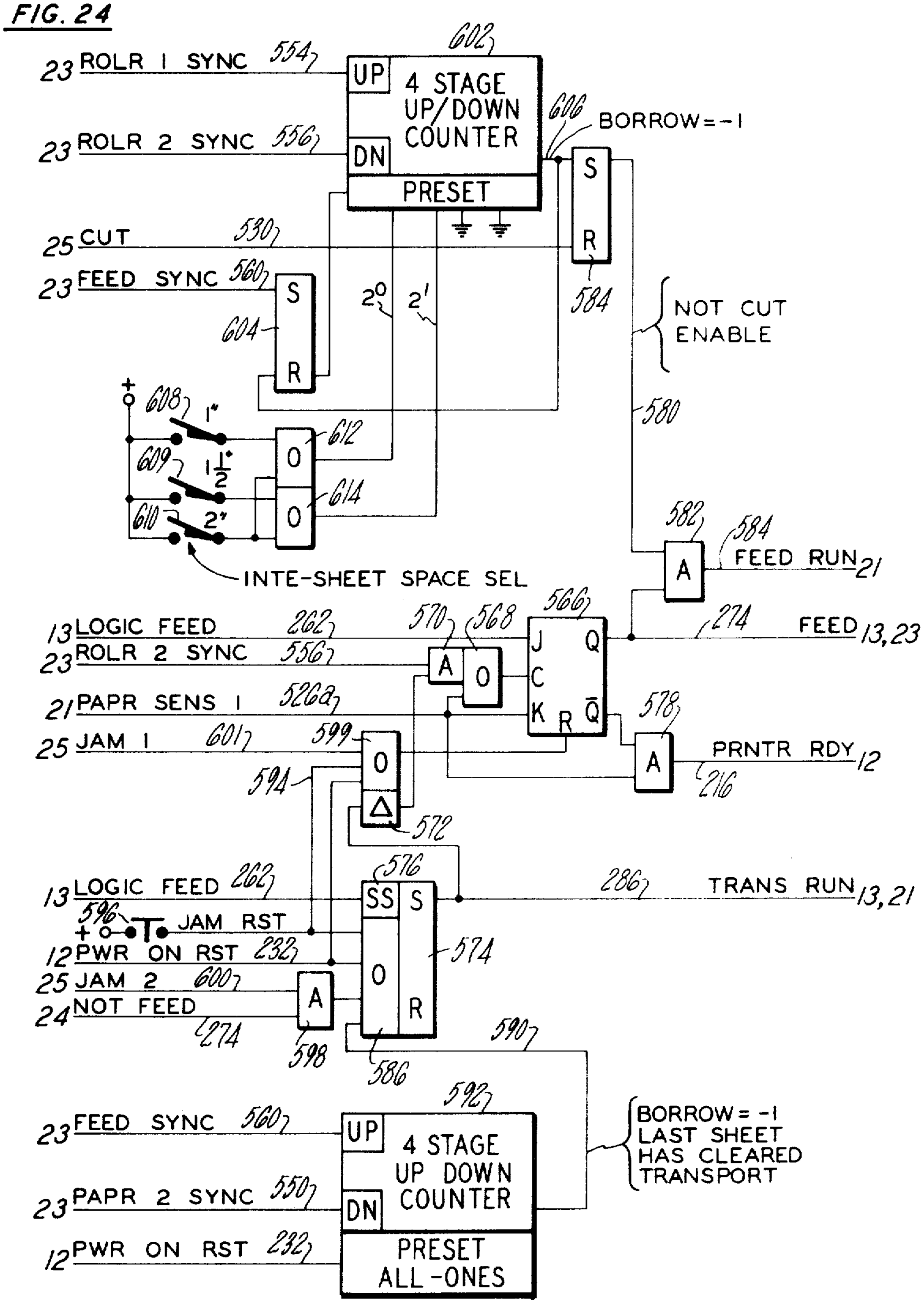

The remaining figures are simplified schematic block diagrams of circuitry, timing illustrations, or charts, relating to the embodiment of the invention illustrated in FIG. 1, as follows:

FIG. 3—clock circuitry;
FIG. 4—clock timing;
FIG. 5—synchronous single-shot circuitry;
FIG. 6—synchronous single-shot timing;
FIG. 7—system input circuitry;
FIG. 8—input control circuitry;
FIG. 9—addressing circuitry;
FIG. 10—address control circuitry;
FIG. 11—template configuration chart;
FIG. 12—system start, stop and run circuitry;
FIG. 13—printer feed and speed control circuitry;
FIG. 14—template synch pulse circuitry;
FIG. 15—sweep control circuitry;
FIG. 16—sweep control timing;
FIG. 17—memory control circuitry;
FIG. 18—main function control circuitry;
FIG. 19—macro system timing;
FIG. 20—memory output circuitry;
FIG. 21—paper transport mechanism schematic;
FIG. 22—paper transport timing;
FIG. 23—transport synchronizing circuitry;
FIG. 23*a*—transport synchronizing timing;
FIG. 24—feed and transport run control circuitry; and
FIG. 25—jam, cut, and start of page circuitry.

DESCRIPTION OF THE PREFERRED EMBODIMENT

System: FIGS. 1 and 2

Figure 1:
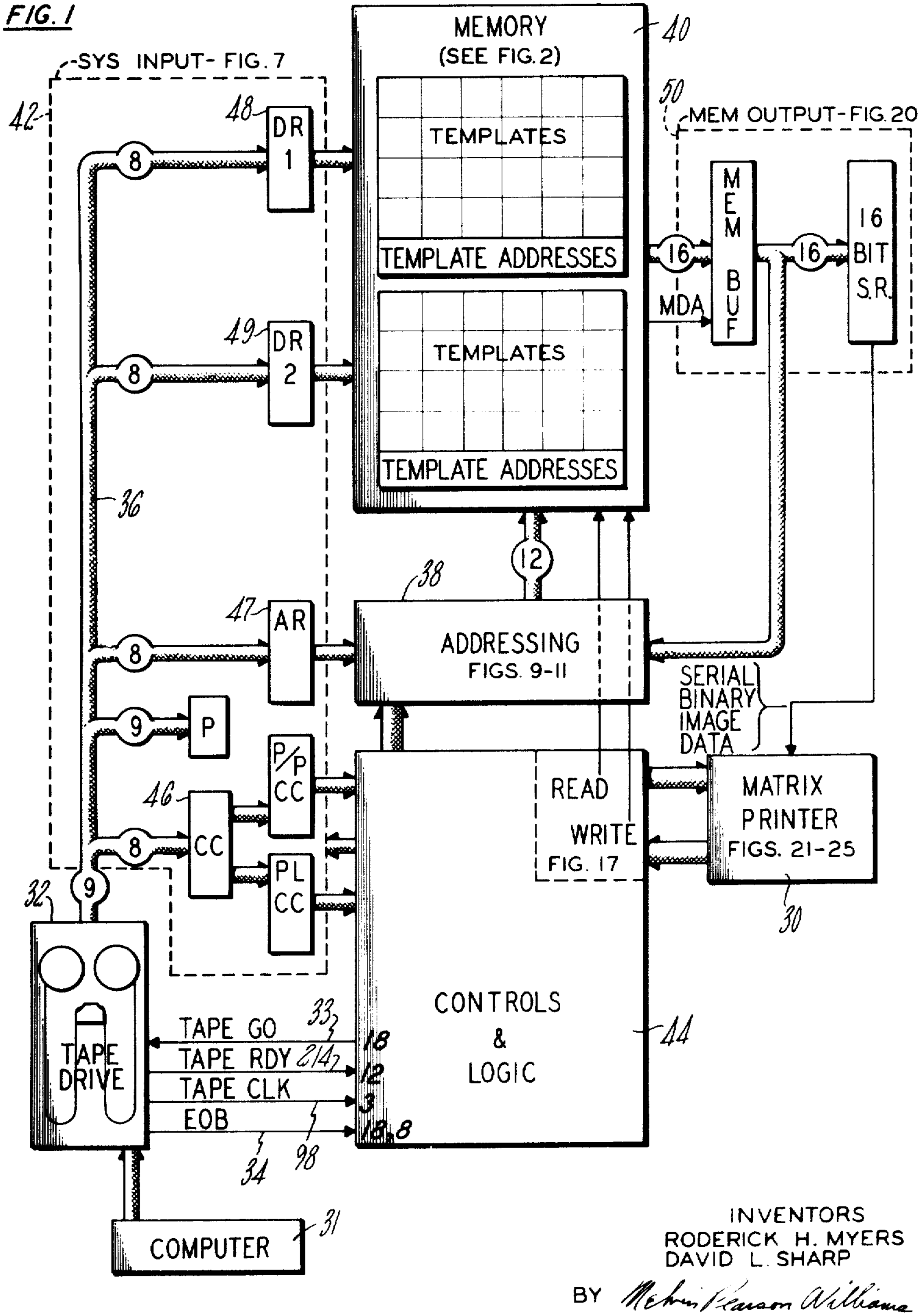
FIG. 1 is a simplified, schematic block diagram of a graphical data processing apparatus in accordance with the present invention.

Referring now to FIG. 1, an exemplary embodiment of a graphical data processing system in accordance with the present invention includes the printing or plotting in a matrix printer 30 of information prepared in a suitable format by a computer 31 and provided to the system by a tape drive unit 32 in response to a TAPE GO command on a line 33. Information on tape comprises digital bytes of eight bits each, serially arranged along the tape. The system can recognize any byte received from the tape as appropriate data, and the end of the data block is signaled to the unit by an end of block signal (EOB) sent to the system by the tape unit over a line 34. Each data block transmitted to the system by tape over eight data lines (and a parity line) 36 is structured as illustrated in table I. As shown therein, the first byte of every data block is a control character which identifies the type of data block and defines certain control variables for the page and/or product (a group of pages) which follows, in the case of a page/product (P/P) data block, or certain control variables for the following print line, if the control character is part of a print line (PL) block. The next byte in the sequence of bytes within the data block is an input address; the input address is used by addressing circuits 38 to cause the next 32 bytes of data to be stored at an appropriate portion of a memory unit 40. Depending upon which portion of memory the particular input address designates, the next 32 bytes of data are determined to be either data templates or literal address codes (LACs)—which are addresses for data templates. The LACs (addresses subsequently to be used to access memory for the purpose of providing data templates to control printing) are stored in the highest addressed portions of each half of memory, whereas the remainder of memory is used to store the data templates themselves. After 32 bytes of data, there follows (the 35th byte) another input address to define the storage location of the following 32 bytes, and so forth.

TABLE 1: DATA BLOCK FORMAT

| Byte Sequence Number | Designation | Function |
|---|---|---|
| 1 | Control Character (CC) | Control variables of the following product and/or page if in a P/P block or of the following print line if in a PL block. |
| 2 | Input Address | Designates the template (or starting) address of the next 32 bytes of data. |
| 3<br>4<br>.<br>.<br>.<br>34 | Templates or Template Addresses (LACs) | Data to be loaded at input address (above); depending on input address, data is either one 256-bit template of text, or 32 8-bit template addresses (to be stored together in one template-area of memory). |
| 35 | Input Address | |
| 36<br>37<br>.<br>67 | Templates or Template Addresses (LACs) | |
| 68 | Input Address | |
| 69<br>.<br>.<br>100 | Templates or Template Addresses (LACs) | |
| 101<br>.<br>.<br>. | Input Address | |
| 4194<br>.<br>.<br>.<br>4225 | Templates or Template Addresses (LACs) | |

The formating of data blocks on tape, as described briefly hereinbefore and more fully hereinafter, is accomplished in a suitably programmed general purpose computer.

The nature of the page/product and print line control characters are illustrated in tables 2 and 3. Page/product blocks appear only between pages and may appear between pages of the same product, or between the last page of one product and the first page of a subsequent product. Intraproduct P/P blocks are designated by the midproduct bit being a ONE, while interproduct P/P blocks are designated by the midproduct bit being a ZERO (table 2). Products must commence with one or more intraproduct P/P blocks and terminate with one interproduct block. This allows repetitive paper feeds, wherein all pages within a product may be printed without operator intervention, as described hereinafter.

As data is supplied to the system by the tape drive 32, it is sorted out in system input circuitry 42 under control of various circuits indicated generally (inter alia) in controls and logic circuitry 44 in FIG. 1. As a block of data is received, the first byte is gated into a control character buffer 46, the second byte is gated into an input address register 47, the third byte is gated into a first data register 48 and the fourth byte is gated into a second data register 49. Once the data register 49 is loaded, the controls and logic circuitry 44 provide a signal to memory to store the contents of the first and second data registers 48, 49 at the 16-bit location specified by the address register 47; then two more bytes of data are loaded into the data registers 48, 49—and the controls and logic circuitry 44, together with the addressing circuits 38, cause these two bytes of data to be loaded at an address which is automatically incremented to be one address higher than the address stored in the address register 47. This continues until 32 bytes of data have been read in, as illustrated in table 1. Note that the address register 47 specifies a memory template address which comprises storage for 256 bits (32 bytes of data). However, since the memory 40 in this embodiment (as is typical in the industry) is capable of addressing to the 16-bit level (two bytes per memory word) the controls and logic 44 and addressing circuits 38 provide automatic addressing of the remaining memory words within a memory template specified by the address register 47.

Once the tape drive 32 commences to send a data block to the system, the memory 40 and other related circuits are committed to handling the incoming data. As is described more fully hereinafter, the loading of double-byte memory words from the data registers 48, 49 is interspersed with the unloading of rows of a template through memory output circuitry 50. These may be interspersed in alternate memory cycles, but they need not be; priority is given to loading tape data into memory.

Figure 2B:
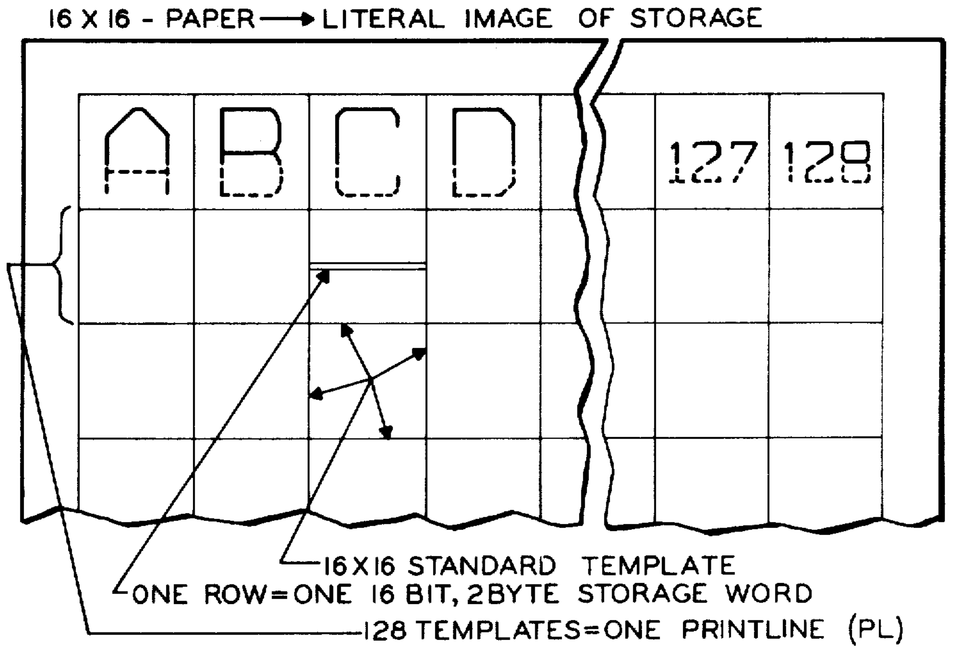
FIG. 2*b* is a graphical representation of standard template printing in the embodiment of FIG. 1.

As illustrated in table 1, each data block includes one control character plus any number of 33-byte groups, up to and including 256 groups. Each of the 33-byte groups includes one input address (to determine the template-sized area in memory where the group is to be stored), together with 32 bytes of data which may comprise either template addresses to be stored in the higher order portion of either memory half, or templates (text) to be stored in the lower order portions of either memory half. As an example, a page/product block may comprise a control character plus 128 standard templates of text. The layout of memory, including the nature of a pair of typical standard templates and the manner in which 32 template addresses are stored in a single template-sized area of memory are all illustrated in FIG. 2*a*. In FIG. 2*b*, the nature of a standard data template is illustrated; a data template comprises 16 rows of 16 binary bits each, each row manifesting a binary image of a related dot row in a portion of matrix print which comprises the output text. As is described more fully hereinafter, the present embodiment utilizes electrostatically charged paper, and printing of each row of dots is accomplished by sweeping the beam of a cathode-ray tube across the paper, perpendicular to paper motion, while each binary ONE in the related rows of the data templates causes intensification of the beam to locally deplete the charge. After developing (by the application of toner to the latent charge image) and fusing, the paper contains dots arranged in the same fashion as the sum total of universal data templates utilized to control the printing.

TABLE 2: PAGE/PRODUCT CONTROL CHARACTER

| Bit | Designation | Function |
|---|---|---|
| 7 (Hi Order) | Page (PL BLK) | This bit, when present, designates a print line block; it is thus always "0" in a P/P block. |
| 6 | Product (MID PROD) | When "0,"this designates either the first or last block of a product; when 1, it designates an interpage. |
| 5 | Paper Speed (Hi Spd) | At "1" designates high paper speed (216 inches per minute); a "0" designates low paper speed (108 inches per minute). |
| 4 | Not used | |
| 3, 2 | Sheet Length (LNGTH 1, LNGTH 0) | Designates length of sheets of paper to be printed (See FIG. 25) |
| 1 | Interrupt Feed | When an OK, indicates that |

| | | |
|---|---|---|
| | (INTRPT FEED) | the paper feed portion should not feed a sheet for a subsequent page. |
| 0 (Lo Order) | Not used | |

TABLE 3: PRINTLINE CONTROL CHARACTER

| Bit | Designation | FUNCTION |
|---|---|---|
| 7 (Hi Order) | Page (PL BLK) | "1" designates a PL block. |
| 6, 5 | Clock Rate (CLK 1, CLK 0) | Selects output clock rate to vary dot spacing along CRT sweep. (See FIG. 3) |
| 4, 3, 2 | Template Configuration (T2, T1, TO) | Selects width and height of text template to be extracted for printing. (See FIG. 10) |
| 1 | Template Address Buffer (4 PL ADR) | When "1" designates buffering of enough template addresses for four print lines. |
| 0 (Lo Order) | Resolution (Single Spot) | "1" designates one spot to be printed for each "1" in the binary image data; "0" designates spot quadrupling for lower resolution printing. |

System Clock Circuits: FIGS. 3 and 4

Referring now to FIG. 3, basic timing of the system is controlled by a system clock (SYS CLK) signal on a line 60 which is generated by a standard crystal oscillator, such as a 13.8 MHz multivibrator 62 in the exemplary embodiment of the invention herein.

The system clock signal on line 60 is applied to a series of flip-flops 63–67 which are JK master/slave flip-flops of the type widely used in the art. The flip-flops 63–67 form a variable digital frequency divider. When used as a divide-by-10 counter, the first stage 63 toggles on the fall (binary ONE to ZERO transition) of each system clock pulse, as illustrated in FIG. 4. With no special controls applied, the fall of the first system clock pulse will cause stage 63 to become set, the fall of the second clock pulse will cause it to be reset and so forth. Each time it turns from a set to reset state, it toggles stage 64; likewise, as state 64 switches from set to reset, it toggles stage 65. When 65 turns off (in response to the fall of clock pulse 8 in the case of divide by 10) it sets stage 66 generating the phase 1 (01) timing signal on a line 68; the fall of the ninth clock pulse, with stage 66 set, causes stage 67 to be set, generating a phase 2 (02) timing signal on a line 69. However, the occurrence of phase 2 becoming set causes stage 66 to become reset; with stage 66 reset, the following clock signal causes stage 67 to also become reset. Notice that during the period of time when either stage 66 or stage 67 is set, an AND-circuit 70 causes both the J and K inputs to stage 63 to be ZERO, so that, in response to clock signals, stage 63 remains set in whatever state it was in instead of toggling as it does when both inputs are ONE. To make the device produce one each of the phase 1 and phase 2 timing signals for a lesser number of clock pulses requires only forcing the initial transitions of either stage 63 or stage 64 or both. For instance, divide by nine is achieved by an AND-circuit 71 forcing stage 63 to become set during the phase 2 period so that the first clock signal will cause it to become reset (rather than to become set as in the divided-by-10 case). This is shown in the second illustration of FIG. 4. Stated alternatively, it takes one less clock pulse to get to the circumstance of turning on stage 64 when stage 63 has been forced into a set state during phase 2. Similarly, generation of phase 1 and phase 2 for every eight clock pulses merely requires that stage 64 be forced into a set state by an AND-circuit 72 during phase 2, so that the first clock pulse turns on stage 63, the second clock pulse turns off stage 63 and this transition causes stage 64 to turn off. To divide by seven, both stages are set, and the first clock pulse turns them both off and turns stage 65 on. In contrast, stage 65 is turned on at the fall of the second clock pulse in divide by 8, in response to the fall of the third clock pulse in divide by 9, and in response to the fourth clock pulse in the divide-by-10 situation. Notice that the duration of, and relationship between phase 1 and phase 2 signals remains constant, regardless of the number of clock pulses between the successive signals.

Notice in FIG. 4 that the clock pulse which will cause initial toggling of stage 63 at the end of phase 2 is not the same clock pulse that causes the end of phase 2, since the fall is gone by the time that stage 67 is turned off and the AND-circuit 70 is turned on. Thus it is the following clock pulse that causes the initial toggling of stage 63.

The phase 2 signal shown in FIG. 3 also generates an ELEMENT CLK signal on a line 74 in response to an AND-circuit 76 controlled by the reset side of a JK flip-flop 78. Depending upon the presence of a HI SPD (High Speed) signal on a line 80, the flip-flop 78 will always be in the reset state and the AND-circuit 76 will be enabled by the off side of the flip-flop 78 at all times. Thus one element clock signal will be generated for each phase 2. On the other hand, if low-speed operation is desired (meaning there is no signal on line 80) then each phase 2 signal will cause the flip-flop 78 to toggle, and thus the AND-circuit 76 can operate once (so as to supply one element clock signal on line 74) for each pair of phase 2 signals; in other words, without the high-speed signal present, the flip-flop 78 acts as a divide-by-2 circuit. The element clock signal is used to actually control timing of spot generation in the CRT imager, and for certain related control functions.

Another clock illustrated in FIG. 3 provides the INPUT DATA CLK signal on a line 82 in response to a synchronous single shot 84, which is of the type illustrated generally in FIG. 5, which will be described first. In FIG. 5, a synchronous single shot 90 is composed of two JK flip-flops 91, 92 and an AND-circuit 93. As is known, when a negative transition is received at the C input to the flip-flop, it will respond in dependence upon the J and K inputs and its original condition. For instance, if both J and K are ZERO, then the negative transition at C will cause the flip-flop to remain in its current state. However, if both J and K are ONEs, then the flip flop will toggle. On the other hand, if J is a ONE, and K is a ZERO, then the flip-flop will be set (having an output at Q and no output at $\bar{Q}$) regardless of its original condition; but if K is a ONE and J is a ZERO, then a negative transition at the C input will cause the flip-flop to assume the reset state (having an output at $\bar{Q}$). Thus the input to the synchronous single shot 90 responds in accordance with the characteristics of the JK flip-flop 91. However, if the flip-flop is set, this is transmitted to a synchronizing AND-circuit 93 so as to enable the J input to flip-flop 92. Then, when the clock signal appears, flip-flop 92 can turn on in response to flip-flop 91 being on. When flip-flop 92 turns on, that condition is transmitted back as a signal to reset the flip-flop 91. This in turn alters the J and K inputs to flip-flop 92 such that the next clock signal will cause it to be reset. Thus, the output of the synchronous single shot, which is the Q output of flip-flop 92, always appears between two successive negative transitions of the clock (CLK) input.

The synchronous single shot is used in FIG. 3 to generate the input data clock (INPUT DATA CLK) signal on the line 82 simply by allowing the synchronization input (SYN) of the synchronous single shot to be forced to ONE at all times. In this case, the enables (J,K) are floating, so the single shot responds to each tape clock signal on a line 98 unless an AND-circuit 85 is blocked by lack of a NOT EOB signal on line 34. This prevents check characters on tape from entering the system once the end of the data block has been sensed. Thus, each time a tape clock signal is received on a line 98 from the tape unit (FIG. 1), the synchronous single shot 84 will provide one input data clock, synchronized to the system clock, in a manner described with respect to FIGS. 5 and 6 hereinbefore.

System Input Circuits: FIG. 7

The system input circuits 42 illustrated generally in FIG. 1 are shown in detail in FIG. 7. In FIG. 7, as data appears on the trunk of nine lines 36 from the tape drive, it is gated into any one of: the control character buffer 46; the input address register 47; the input register 1 48; or input data register 2 49; by respective strobe signals on related lines 100–103, each of which is timed with the input data clock derived from the tape clock in FIG. 3, hereinbefore. As described with respect to FIG. 8 hereinafter, the STROBE CC signal on line 100 is timed to gate the first byte of a data block into the control character buffer 46. The STROBE AR signal on line 101 is timed to gate the second byte of data in the data block into the input address register 47. The STROBE DR 1 signal on the line 102 is timed to gate the third byte of data into input data register 1 48 and the STROBE DR 2 signal on line 103 is timed to gate the fourth byte of data in the block into input data register 2 49. Thereafter, the STROBE DR 1 signal and STROBE DR 2 signal appear alternatively so as to strobe each subsequent odd-numbered byte into input data register 1 48 and each subsequent even-numbered byte into input data register 2 49.

The tape data bytes on the trunk of nine lines 36 are also applied to a parity circuit 104 which is conventional and used to supply an indication of fault if suitable parity of each of the bytes is not maintained with an accompanying parity bit.

Each time that a control character is gated into the control character buffer 46, the highest ordered bit thereof, which corresponds to the print line block bit (PL BLK), is tested to determine the type of data block being received. This is accomplished at the end of reading in the entire data block as determined by receipt of the end of block signal (EOB) on the line 34. Regardless of which type of block it is (that is, a PL block as indicated by the highest ordered bit of the control character being ONE, or a P/P block as indicated by the highest ordered bit of the control character being ZERO) it is set into a bit register 106. If it is a ONE, it provides a signal on a line 107 which enables an AND-circuit 108 to operate in response to an OR-circuit 110 so as to cause the content of the control character buffer 112. On the other hand, if the highest ordered bit in the control character is a ZERO (indicating a page/product block) then it enables an AND-circuit 114 to set the content of the control character buffer 46 into a P/P control character buffer 116. The operation of the OR-circuit 110 is controlled on a page by page basis in a manner as hereinafter described with respect to FIG. 18. The content and meaning of the control character bits are as described hereinbefore with respect to tables 2 and 3. In addition, an AND-circuit 118 allows buffering of the high-speed (HI SPD) bit in a single-bit register 120 in order to ensure that this parameter is not altered during the printing of a page; in other words, while printing a page utilizing control variables established at the beginning of that page, a new control character can be received for a following page; the remaining bits of the P/P control character are essentially buffered elsewhere, but the HI SPD bit dynamically controls print parameters at the time that the subsequent page control character could be received. This will appear more clearly hereinafter, as details of system operation unfold.

The strobe signals used to separate data bytes received from tape are generated in FIG. 8. Therein, the INPUT DATA CLK signals on a line 82 are applied to a two-bit binary counter 121 as well as to four AND-circuits 122–125 which generate respective signals on the lines 100–103. When the system is first commanded to go, a master reset signal on a line 97 will cause an OR-circuit 126 to reset the counter 121. Thereafter, during the presence of the next input data clock signal on the line 82, the AND-circuit 122 will cause the STROBE CC signal on the line 100. On the fall of the input data clock signal on line 82, the two-bit counter 121 (which is presumed to be comprised of a pair of JK flip-flops, as described with respect to FIG. 5 hereinbefore) will advance from a count of ZERO ZERO to a count of ONE ZERO (low order first). This comprises a setting of X and NOT Y at the input to the AND-circuits 122–125. Thus when the second input data clock signal appears on line 82, the AND-circuit 123 will generate a STROBE AR signal on the line 101. The fall of the second input data clock signal on line 82 advances the two-bit counter 121 from a count of ONE ZERO to a count of ZERO ONE (high order last). This equals a setting of NOT X and Y so that the AND-circuit 124 will operate on the following input data clock signal to generate the STROBE DR 1 signal on the line 102. Similarly, the fall of the third input data clock signal on the line 82 will cause a counter setting of ONE ONE so that the fourth input data clock signal on line 82 will pass through the AND-circuit 125 to generate the STROBE DR 2 signal on the line 103. The signal on the line 103 is used to clock a synchronous single shot 128 whenever the tape drive is running (TAPE GO, line 33), as synchronized to the system by the ELEMENT CLK signal on the line 74. Thereafter, the synchronous single shot 128 will generate a tape data ready signal (TDR) on a line 130. The TDR signal generates a LOAD STEER signal on the line 132 (top of FIG. 8) in a manner to be described in detail with respect to FIG. 17, hereinafter. This is a signal that causes a memory write operation, to store the data which has been gated into data register 1 and data register 2 as a result of the strobe signals on the lines 102 and 103, and provides certain other controlled functions as well, all as is described in more detail hereinafter. However, for each generation of the strobe signals on the lines 102, 103, there is one TDR signal generated on line 130 which causes one load steer signal on the line 132. The load steer signal on the line 132 is applied to a pair of AND-circuits 134, 135, one or the other of which will be operable in dependence upon the presence or absence of a load scan complete signal (LOAD SCAN CMPLT) on a line 136. Thus, if the signal is present, the AND-circuit 135 will operate, and if it is absent it will cause an inverter 138 to operate the AND-circuit 134. In the case of the first load steer signal, the AND-circuit 134 will operate, causing the higher ordered bit of the two-bit counter 121 to be forced into a set condition at all times. This makes the output Y present at the inputs to the AND-circuits 124, 125 and removes the not Y input from the AND-circuits 122, 123; then, for each input data clock signal which appears, the X output of the counter 121 will alternate, thus causing alternative bytes to be gated into data register 1 and data register 2, respectively. However, once 32 bytes of data have been received and stored in the 16 double-byte storage locations (relating to the input address which had been gated into the input address register as the second byte of the data block), it becomes necessary for the address register to respond to a second input address (as illustrated in table 1, hereinbefore). Since each input address reaches 16 sequential storage locations in memory (the size of a standard template in this embodiment), the 15 storage locations which follow the actual input address are reached by means of automatic addressing, the low-order address bits of which are generated in circuitry shown at the top of FIG. 8, and the utilization of which is described in more detail with respect to FIG. 9 hereinafter. For each load steer signal on the line 132, a four-bit counter 140 is incremented by one count. The output of the four-bit counter comprises four low-order address bits, referred to as INPUT SCAN ADR, on a trunk of 4 lines 142. Thus, as illustrated in FIG. 2, each template-sized storage area in memory is comprised of a plurality of rows, each row corresponding to one addressable storage location in memory. From the input address applied by tape, 16 storage locations are reached, in dependence upon four low-order bits added to the address set in the input address register 47 (FIG. 7). Once the storage area is full, however, it then becomes necessary to receive another address from tape for controlling storage of the next 16 storage words of two eight-bit bytes each. Note that since an addressable storage word comprises 16 bits in the present embodiment, the contents on input data register 1 48 and input data register 2 49 are stored as the two halves of one storage word in each memory cycle. When the template-sized storage area of 16 double-byte storage locations have been filled, the output of the four-bit counter 140 stands at all ONEs, which fact is sensed by an ALL ONES detector 144, the output of which comprises the LOAD SCAN CMPLT signal on the line 136. At this time, the AND-circuit 134 becomes blocked and the AND-circuit 135 is allowed to operate during the next load steer signal on line 132 so as to force a setting of the lower ordered bit of the two-bit counter 121. This will occur at a time when the last input data clock signal on line 82 has caused the two-bit counter 121 to reach a count of ZERO ZERO; therefore the forced setting of the lower ordered bit will result in a count of ONE ZERO (X and NOT Y). This operates AND-circuit 123 to cause a STROBE AR signal on the line 101 to cause the data byte being received from tape to be transferred into the input address register 47 (FIG. 7). The AND-circuit 135 operates only once for each successive 33-byte block of data (after the control character) received from tape; at all other times the alternative operation of AND-circuits 124 and 125 resumes while 32 more bytes are received by the two input data registers 48, 49 and loaded into memory.

ADDRESSING CIRCUITRY: FIGS. 9–11

The addressing circuitry 38 illustrated briefly in FIG. 1 is shown in detail in FIGS. 9–11.

The addressing circuitry 38 determines the storage locations for loading data bytes, received from the tape drive 32, in the manner described briefly hereinbefore. It also determines the locations for fetching literal address codes (LACs), and controls the utilization of said literal address codes to fetch data templates from memory for printing. The unloading functions are more complex than the loading functions, and are best described with an understanding of the manner in which memory is accessed for the purpose of controlling the printing of template information on paper, which is performed one row at a time in the present embodiment. In order to simplify address handling for unloading templates from memory, the following discussion ignores the fact that memory accesses may be made for the purpose of storing a subsequent print line while the current print line is being extracted from memory; it also assumes printing or plotting of standard 16×16 templates.

Referring to FIG. 2 and FIG. 9, the first step is to reset both horizontal and vertical memory scan address counters 150, 152. Then a memory fetch is made utilizing LAC address 170–0 (binary = 01 111 000 0000). This is specified when all LAC address bits equal ZERO, except for the second through fifth from highest order bits of the memory address, which are preset to ONEs. LAC address bits 9 and 10 are forced to ONEs at all times, as indicated in the gate 154, while bits 7 and 8 are made to be ONEs by forcing stages 16 and 17 of the vertical scan address counter 152 to ONEs, as described with respect to FIG. 10 hereinafter. When accessed, the memory 40 (FIG. 1) supplies a 16 bit data word from address 170–0, containing the two LAC addresses stored therein (bottom of FIG. 2) to the memory output 50. After this initial access, the horizontal scan address counter is incremented and the lowest ordered stage (stage 0) signals that a template is to be accessed (rather than a LAC); this causes the next unload address to be chosen from the memory output buffer.

Because stage two of the horizontal memory scan address counter was set to ZERO as a result of resetting of the entire counter, LAC A of the first LAC address pair (the high order byte of the 16-bit storage word) will be selected by a gate 156 (FIG. 9) and used as the address with which to access the first template. Since the vertical memory scan address counter had also been reset, stages 11 through 14 thereof are still at ZERO and the row of the template which is accessed in memory is the topmost row of the printable template (lowest ordered address).

After this second access, the horizontal scan address counter 150 is again incremented so that the lowest ordered stage specifies a ZERO, again indicating that a LAC is to be fetched from memory. Because standard 16×16 templates are to be printed, no linking is involved and stage 1 of the horizontal scan address counter 1 will be preset once for each template fetched from memory, as described in more detail hereinafter. It thus acts as if this stage were not even present in the counter, so that when the lowest ordered stage changes from a ONE to a ZERO, stage 2 changes from a ZERO to a ONE. Notice that the actual LAC address has not been changed; it remains at 170–0 due to bits 7–10 of the memory address input 155 being forced to ONE and the remaining bits being ZERO.

After this third access, the counter is again incremented and the low order stage is again ONE, indicating a template is to be fetched. Since stage 2 of the horizontal scan address counter is set to a ONE, a gate 158 will select LAC B (the low-order byte of the 16-bit storage word). The fourth access will then supply the 16-bit storage word comprising the first row of the second template of the print line for printing. Note that the four lowest bits which accompany the eight-bit byte in forming the address have remained ZERO since no incrementing of the vertical scan address counter has yet occurred.

After this fourth access, the counter is again incremented so that stage 0 becomes a ZERO, stage 1 remains a ONE (and acts as if it is not even there), stage 2 again becomes a ZERO, and stage 3 becomes a ONE. With stage 3 set to ONE, the memory address input 155 now includes bits 7–10 remaining at ONE (due to their presets) and bit 0 equal to a ONE. The fourth access will therefore be from storage location 170–1, which contains the next two LACs.

After this access, the counter is incremented so that bit 0 becomes a ONE, causing the memory data output buffer to be used as a source for the highest order eight bits of the address, while the four lowest ordered bits (comprising the template scan address bits of the vertical scan address counter) remain set to ZERO. Because bit 2 is a ZERO, the high order eight bits (LAC A) are selected by the gate 156. Thus the first row of the third template to be printed is accessed from the memory.

This process repeats itself until 128 templates have been accessed and all dots appearing in the first row of these templates have been printed on paper via one scan of the CRT imager. In the present embodiment, the completion of scanning of one dot row is monitored by the amount of information (normally 128 data templates) sent to the printer, rather than by timing considerations of the imager sweep circuitry. This allows control over interline spacing, in that end of scan is actually determined by the programmer, who must use a specially designated end-of-line LAC which itself specifies either of the basic LAC storage location addresses 170 or 370. Thus, the programmer can insert as many LACs as he desires to be printed (including LACs which cause accessing of blank templates), so as to complete the print line he wishes the printer to develop, after which he inserts as a LAC, either address 170 or 370, rather than the address of a template to be printed. Using this programmable end of scan (referred to herein as PGM EOS), the scan is normally limited to 128 templates in the present embodiment. However, when printing 8×16 templates (half the normal width) 256 such templates could be printed, necessitating that twice as many LACs be utilized. In any event, the completion of LAC address incrementing in the horizontal scan address counter is not normally signaled by the counter reaching a given count, but rather occurs as a result of sensing the programmer's designation of end of scan.

When the scan of one row has been completed, the vertical scan address counter must be incremented. Since it is assumed in the present example that single-dot printing is in effect, stage 10 will therefore have initially been preset to a ONE. Thus the vertical scan address incrementing will cause stage 11 to be set from a ZERO to a ONE. At this time, the horizontal scan address counter is reset to all ZEROs, as it was at initialization.

The process described above will then be repeated, but now in each case the low ordered bits of the template address are no longer ZERO; instead of fetching the top row of each template, the second row of each template will be fetched for all 128 templates in the print line; and so forth, until all 16 rows have been printed.

Referring now in more detail to FIG. 9, addresses are supplied to the memory by 12 three-way OR-circuits 155 which may be fed from any one of three sources. One source is the gate 154 which supplies addresses used to unload LACs. A second source, used to supply addresses for unloading templates, includes the gates 156, 158 which select the low and high ordered bytes delivered by memory as a result of fetching LACs, as well as a pair of gates 160, 162 used for template linking. For simplified understanding of the logic involved, the gates 156, 158 are shown feeding eight two-way OR-circuits 164, and an OR-circuit 166 shown responding to either the lowest ordered output of the OR-circuits 164 or either of the gates 160, 162. However, it will be appreciated that the ORing functions of the OR-circuits 164, 166 may be combined with ORing functions of the OR-circuits 155, if desired.

Each LAC specifies one data template in storage, each of which specifies 16 storage locations of 16 bits each such that each storage location comprises one row of a template. Each template is specified by a single LAC; since the printer prints one entire dot row at a time, all of the selected templates required to make up a print line must be accessed in order for each scan line, with the low ordered template addresses incremented once for each scan line, as described hereinbefore. Incrementing the vertical scan address counter at the end of each scan specifies the next higher ordered template storage locations to be selected by the same string of 128 LACs in composing the next complete dot row. These low-order bits are taken from bits 11–14 of the vertical scan address counter and transferred through a gate 168 each time that LAC A or LAC B is transferred through one of the gates 156, 158.

Horizontal linking is illustrated in FIG. *2c*. Therein it is shown that the binary image information may be stored in data templates in such a fashion as to print horizontally and therefore be readable with the paper oriented in the same direction as paper motion. The program controls template linking by providing the correct configuration of TO T1 and T2 bits as illustrated in FIG. 11 and described hereinafter; the program must also supply the two templates which comprise a single character in adjacent locations; and it must supply LACs which specify only even addresses. Thus the first fetch is for a LAC at address 170–0. Then the horizontal scan address counter will be incremented to cause the template fetch, utilizing the first LAC to fetch the first row of the first template (for instance the first row of the template having the top portion of the letter B in it). It then is incremented again causing stage 0 of the horizontal scan address counter to be again set to ZERO and stage 1 of the counter to change from a ZERO to a ONE. However, this does not alter the address which the gate 154 passes to the memory address input 155; nor does it alter whether LAC A or LAC B will be selected by the gates 156, 158. In fact, the exact same LAC will again be fetched and selected by the gate 156 and passed to the OR-circuit 164. However, since stage 1 of the horizontal scan address counter is now a ONE, with the horizontal enable (HOR ENABLE) signal present on line 174, the horizontal link gate 160 provides a ONE through the OR-circuit 166 so that the template reached as a result of the same LAC will now be in the next higher addressed, odd template storage location (such as the bottom half of the letter B). Thus in horizontal linking, each LAC is even, and is used once as is and once with the low-order bit set to a ONE so as to reach two different templates.

Vertical template linking is illustrated in FIGS. *2d*. Therein, template orientation is specified as 16 bits across by 32 bits high, and is achieved by linking two standard 16 by 16 data templates. As is described with respect to FIG. *2e* and FIG. 11, hereinafter, vertical linking may also be specified as 16 bits across and 20 bits high or as 16 bits across and 25 bits high. This allows flexibility in the appearance of printed text, as well as permitting certain programming techniques to be utilized when plotting graphical data. Vertical linking differs from horizontal linking in that in vertical linking the top halves of each vertically linked template pair are all printed before the bottom halves of the template pairs are printed. In all template linking, the linked templates appear in adjacent storage locations and are reached by a single LAC. The program specifies the linked pair of templates with an even-addressed LAC, and automatic addressing (FIGS. 9–11) is utilized to cause the sequence of LACs to access both parts of the linked template pair in the proper sequence so as to cause the template pair to print in the desired vertical relationship. When vertical linking is involved, an entire print line of single templates is printed first, and then a second print line of single templates is printed; the two print lines of templates comprise a single print line of text which is two templates high. During the time when the even-addressed templates are fetched to print the uppermost rows of the print line, bit 15 of the vertical scan address counter remains ZERO so that even though the vertical enable signal may be available at the gate 162, the gate does not operate since stage 1 of the horizontal scan address counter is ZERO. The lowest order output of the OR-circuits 164 therefore remains unaltered. As stated, whenever vertical template linking is specified by the program, it must provide all LACs with low-order bits of ZERO. It also must provide that the template having the upper half of the character is stored at the next lower ordered template address than the template containing the lower portion of the character. Then both templates may be accessed from memory using a single LAC and the automatic addressing herein. For instance, once stages 11 through 14 of the vertical scan address counter have reached a count of all ONEs, all of the storage locations relating to the rows of a full line of templates have been accessed for an entire print line using only the even-addressed LACs specified by the program. When the counter is next advanced, stages 11–14 are set to all ZEROs to specify the upper most row of a data template storage area but stage 15 becomes set to a ONE. Since the vertical enable signal will be present at the gate 162, this will pass through the OR-circuit 166 and cause the lowest ordered bit of the memory address input 155 to be a ONE, thereby specifying only odd-addressed template storage locations as the remainder of the print line is completed.

As is illustrated in FIG. *2e*, in the case of 16×25 (and similarly with respect to 16×20) vertical linking, the upper rows of the first template specified are not utilized. These rows in fact include binary image information of all ZEROs, and form no part of the printing operation. When vertical linking is involved, it is apparent from FIG. *2d* that all of the even-addressed data templates in storage contain the upper portion of characters and all of the odd-addressed templates in storage contain the lower portions of characters. When vertical linking is involved, therefore, printing of the first nine dot lines (16×25 configuration) requires accessing only even storage locations followed by accessing only odd storage locations for the next 16 dot lines. In the case of 16×25 vertical linking, since seven rows of the first template are not used, the low-order bits of the template address (which must be added to the LAC which specifies the template) must start by specifying the eighth row from the top of the data template in storage. Since the first row at the top if specified by address bits equal to decimal zero, the eighth row would be specified by address bits equal to decimal 7. Thus, the vertical scan address counter is preset at the start of each print line, in a manner described with respect to FIGS. 10 and 11 hereinafter, so that each of the even-addressed templates are pulled out successively so as to print the tops of the characters; storage accessing starts with the eighth storage location from the top of the storage locations relating to the template.

The memory address input 155 also responds to load addresses supplied thereto by a gate 170 which utilizes the eight-bit load address supplied by tape (FIG. 7, hereinbefore) and four low-order bits provided by the input scan address counter (FIG. 8, hereinbefore).

Stage 10 of the vertical scan address counter is not associated with unload addressing. It is used as a divide-by-2 stage to cause each row of every template to be printed twice when spot quadrupling (low resolution) is specified by the absence of a SINGLE SPOT bit in the print line control character buffer. Thus, with the vertical scan address counter set to ZERO, the upper most row of each data template is accessed in memory for the entire dot line; then the vertical scan address counter is incremented and, since paper moved continuously, although bit 10 is now set to a one, bits 11–14 have not been incremented. This causes the same template rows to be accessed again, and since paper is moving continuously, all of the dots in the very first dot row are repeated a second time, the second row of dots being immediately beneath the first row of dots, dot for dot. As is described in more detail hereinafter, each binary ONE in the binary image information contained within each data template also results in the CRT beam being unblanked twice in succession in the case of spot quadrupling, so that a four spot cluster is in fact printed rather than one spot for each binary ONE in a data template. This is described in more detail with respect to FIG. 14, hereinafter.

As seen in FIG. 2*a*, the memory is organized in a high-order half and a low-order half. In normal graphical plotting operations, one print line is normally loaded into one half from tape while a previous print line is being printed from the other half, in an alternating fashion. In the present embodiment, each half of memory has sufficient storage locations to store 128 templates of information, that is, it has 2,048, 16-bit storage locations in each half. In the ordinary plotting mode where it is assumed that, except for blanks or grids, all of the templates to be printed in a print line are different, it would require using all 128 template storage locations for the storage of templates, and there would be no storage locations available for LACs. However, it may be statistically shown that, in any printing or plotting function, at least a few templates are used more than once in a print line; therefore only 124 template locations per print line are allocated to the storage of print data; the remaining four template locations are used to store 128 LACs. In the case of printing ordinary English language text, however, the multiple utilization of templates (such as the letter A is far greater, both with and without template linking. Thus, it has been found that 16 template storage locations may be utilized to store LACs so that a total of 512 LACs can be stored. Since 128 LACs are required for each print line (except in the case of 32×16 where only 64 are required, and in the case of 8×16 where 256 are required) sufficient LACs for four print lines can be stored in each memory half. During four print line operation, stages 16 and 17 of the vertical scan address counter are used to specify which print line of LACs is being accessed. In the case of single print line operations, these two stages are forced to a one at the start of print line. Selection between the high and low halves of memory is accomplished by stage 18 of the vertical scan address counter, a transition from a ONE to a ZERO signifying a change in memory halves at the end of each print line during single print line buffering, and at the end of each fourth print line in the case where four print line LAC address storage is used.

Controls for the horizontal scan address counter 150 and the vertical scan address counter 152 (FIG. 9) are illustrated in detail in FIG. 10. These controls take into account the template configuration specified by the bits T0, T1 and T2 in the print line control character buffer (FIG. 7). The encoding of these bits to specify template configuration is illustrated in chart form in FIG. 11. Bits 11 through 15 of the vertical scan address counter can count from zero through 31, thereby being capable of specifying a total of 32 scan lines in height. In the case of the standard 16×16 template, only 16 rows need be counted to fetch the 16 different storage locations of each template as described hereinbefore. Therefore, the counter is preset to a count of 16 by forcing bit 15 of the vertical scan address counter to a one at the start of each print line. In the case of 8×16 printing, template linking is not involved and only the left-hand half of each template is utilized in a manner described with respect to FIG. 14, hereinafter; however, it is 16 bits high and so the preset for the vertical scan address counter is the same as in the case of the 16×16 template. In the case of a 16×8 template, the template is only eight bits high, and the vertical scan address counter is preset to a count of 24 so that after taking the lowest eight rows out of a template, the scan line is considered to be complete. This is done by presetting both bit 14 and bit 15 to ONEs. This is similar to the 16×25 template configuration described hereinbefore except for the fact that it requires no linking of templates. In other words, just as the top part of the letters in the case of vertical linking appear in the bottom portion of a template, the entire image appears in the lowest half of a template in the case of the 16×8 template configuration. As described with respect to the 16×25 template configuration hereinbefore, whenever vertical template linking is utilized with less than 32 rows, the counter has to be preset a certain amount. Thus a presetting to seven permits utilizing a total of 25 rows, nine from the low addressed, even template and 16 from the higher addressed, odd template. Similarly, in a 16×20 configuration, presetting of the vertical scan address counter to 12 allows using the last four rows of the even-addressed template together with all 16 rows of the odd-addressed template. In the case of the 16×32 template configuration, a full count of 32 is required by the vertical scan address counter, so no presets are utilized.

In FIG. 10, binary logic responds to the print line control character buffer bits T0, T1 and T2 so as to generate signals indicating the circumstances of FIG. 11. As is described with respect to the 32×16 template configuration hereinbefore, horizontal linking requires use of the same LAC twice, and is involved with the horizontal scan address counter. Horizontal linking is specified to T0, T1, T2 of 100 and is recognized by the binary logic 172 by sensing NOT T1 and NOT T2. This also occurs in the case of all three bits being ZEROs, but that code is not used and is therefore never specified by the program. When the binary logic 172 senses NOT T1 and NOT T2, it generates the HOR ENABLE signal on line 174 which is utilized in FIG. 9 to enable the gate 160. Whenever there is no signal on the line 174, an inverter 176 will cause an AND-circuit 178 to generate a PRESET HOR LINK signal on a line 180. This causes stage 1 of the horizontal scan address counter 150 (FIG. 9) to be set just prior to utilizing the horizontal scan address counter to fetch a LAC in each case. This timing is effected by utilizing a TSP (template synch pulse) signal on a line 190 to gate the AND-circuit 178; the TSP signal is described in detail with respect to FIG. 14 hereinafter.

In cases where spot quadrupling is not desired, there will be a SINGLE SPOT signal on a line 184, from the print line control character buffer in FIG. 7, which will cause an AND-circuit 186 to generate a signal to preset stage 10 of the horizontal scan address counter at the start of each scan line (the printing of one row of dots in the printer) in response to the LSOS (logical start of scan) signal on a line 188. An AND-circuit 190 responds to a signal on a line 192 from the binary logic 172 indicating that all three of the bits T0–T2 are present. This identifies the 16×25 template configuration which requires presetting of the counter to decimal 7, including setting bits 11 and 12 to ONEs. Similarly, an AND-circuit 194 senses the case when both T0 and T2 are ONEs which identify both the 16×20 and the 15×25 template configurations, both of which require presetting of bit 13 of the vertical scan address counter to a ONE. An AND-circuit 198 responds to a signal on a line 200 from the binary logic 172 which recognizes when T1 is a ZERO and T2 is a ONE, thereby identifying either the 16×8 configuration or the 16×20 configuration, both of which require presetting of bit 14 to a one. The binary logic 172 generates the VERT ENABLE signal on the line 202 when it senses the condition of T0 being a ONE when either T1 or T2 is also a ONE; this condition senses the 16×20, 16×25 and 16×32 template configurations. The vertical enable signal on line 202 is utilized to enable the gate 162 (FIG. 9) in a manner described hereinbefore. Whenever the vertical enable signal is not present on line 202, an inverter 204 will cause an AND-circuit 206 to preset stage 15 of the vertical scan address counter, since in no case are more than 16 rows required except when vertical linking is utilized. As described briefly hereinbefore, stages 16 and 17 of the vertical scan address counter are utilized to allow accessing enough LACs for four print lines of print or plotting before switching from the low-order half of memory to the high-order half (and vice versa). Thus when four print line LAC addressing is not specified, an AND-circuit 208 will cause presetting of stages 16 and 17 of the vertical scan address counter at the start of each scan in response to the LSOS signal on the line 188. The AND-circuits 190, 194, 198, and 206, which control presetting of stages 11–14 of the vertical scan address counter, are gated by a VERT ADR ZERO signal on a line 207, which is generated in FIG. 9 by a zero detector 209 responsive to stages 11–15 of the vertical scan address counter. The AND-circuits 190, 194, 198 and 206 are also gated with the logical start of sweep signal on the line 188 so that these AND circuits operate only at the start of the first dot row of a print line. Therefore, the presets necessary to achieve proper truncation for the template configuration designated by the bits TO T1 and T2 (as illustrated in the chart of FIG. 11) occurs only at the start of sweep of the first dot row of a print line, whether the print line be eight, 16, 20 or 25 scan lines in height.

Start, Stop and Run Circuits: FIG. 12

Referring to the middle of FIG. 12, an AND-circuit 210 generates a system ready signal on a line 212 in response to a tape ready signal on a line 214 (which is received from the tape unit, FIG. 1) concurrently with a printer ready signal on a line 216 (described with respect to FIG. 24 hereinafter) provided that a "system GO" latch 218 is not in the set condition so that a NOT SYS GO signal is available on a line 220. With the system ready signal at the input to an AND-circuit 222, all that remains to start the system is to press a GO switch 224 so that the AND-circuit 222 will set the latch 218. In the transition from the reset to the set state, the latch 218 causes a single shot 226 to generate the SYS GO RST signal on the line 97. The latch 218 then remains set until reset by an OR-circuit 228, which is responsive to normal stopping, abnormal conditions and manual stopping. When power is applied to the system, power circuits (indicated generally by a block 230) causes a power on reset (PWR ON RST) signal to be generated on a line 232 by a single shot 234. This signal will pulse the OR-circuit 228 to ensure that the latch 218 is reset upon the initial application of power. Additionally, a stop switch 236 may be pressed by the operator to operate the OR-circuit 228. If for some reason the tape is no longer ready for operation, then the NOT TAPE RDY signal on line 214 (which is simply the complement of the TAPE RDY signal) will operate the OR-circuit 228. Additionally, in the event that paper runs out or there is a jam in the paper feed and transport mechanisms of the printer, then a JAM signal will appear on a line 238 to operate the OR-circuit 228. Normal stopping is under control of an AND-circuit 240 in response to a page/product stop (P/P STOP) signal on a line 242 which is generated at the end of a product when the product switch is closed, or is generated at the end of each page when the product switch is not closed. The AND-circuit 240 causes P/P STOP to be synchronized with an MBR SYNCH signal on a line 244. The MBR SYNCH signal, as described in detail with respect to FIG. 18 hereinafter, indicates to the system when the memory has performed a read operation and the data is available in the memory output circuitry 50 (FIG. 1).

Referring to the top of FIG. 12, a dynamic run (DYN RUN) signal is generated on a line 245 by a flip-flop 246 in response to a positive transition of the print line block (PL BLK) signal on the line 107. Thus, after the SYS GO signal is available, the latch 246 will be set the first time that the print line block register 106 (FIG. 7) is set, and remains set until the NOT SYS GO signal appears on line 220. The DYN RUN signal signifies that the first print line block of a page has been received and that dynamic running, including printing and receiving further print lines, as described hereinbefore, can commence. See table 4. The DYN RUN signal on the line 245 is applied to an AND-circuit 248 which allows generating of the page/product stop signal on the line 242 which in turn will reset the system go latch 218, as described hereinbefore. The AND-circuit 248 senses the receipt of a page/product block (which is either an interpage block, an end of product block, or an interproduct block) whenever the system is running by responding to a NOT PL BLK signal on line 107 concurrently with the output of an OR-circuit 250. The OR-circuit 250 senses that the system is running in the page mode (which prints one page and stops and requires that the GO switch 224 be depressed in order to get an additional page printed) due to an inverter 252 providing a signal to the OR-circuit 250 whenever a product switch 254 is not closed. Alternatively, if the product switch 254 is closed, so there is no output from the inverter 252, the OR-circuit 250 can nonetheless energize the AND-circuit 248 whenever the product bit turns to zero as sensed by a NOT MID PROD signal on a line 256. In other words, whenever there is no PL block signal on line 107 (indicating a page/product block has been received from tape), and the page product block is not a mid product, interpage block, but is an end of product block or a between product block, then there will also be no mid product bit so there will be a signal on line 256. On the other hand, even when the mid product bit is present, if page mode has been designated by leaving the product switch 254 open, then the sensing of an interpage block (a page/product block) by the signal on the line 107 can cause stopping.

TABLE 4.—ORGANIZATION OF DATA BLOCKS ON TAPE

| Order of events, block No.[1] | Block type | PL BLK BIT | MID PROD BIT | Comments[2] |
|---|---|---|---|---|
| 1 | P/P | 0 | 0 | Beginning or end of product blocks Data for 1st product if required. |
| 2 | P/P | 0 | 1 | More data, if required, and control for 1st page of 1st product; the number of P/P blocks can vary to facilitate bulk data transfers. |
| 3 | P/P | 0 | 1 | |
| 4 | P/P | 0 | 1 | |
| 5 | PL | 1 | X | 1st good print line block, PL blocks supply template addresses and/or templates, this is text; the number of PL blocks can vary depending on the desired page length. |
| 6 | PL | 1 | X | |
| 7 | PL | 1 | X | |
| 8 | PL | 1 | X | |
| . | . | | | |
| 36 | PL | 1 | X | |
| 37 | P/P | 0 | 1 | End of 1st page and start of 2d page; includes control for 2d page, plus data if required. |
| 38 | PL | 1 | X | Template addresses and/or templates for 2d page. |
| 39 | PL | 1 | X | |
| . | . | | | |
| 60 | PL | 1 | X | |
| 61 | P/P | 0 | 0 | Termination for 1st product, data for 2d product, if required. |

[1] Tape runs and reads into SYS whatever is there—may be several useless blocks of data read into SYS first.
[2] "Product"=a related group of pages.

Print Feed and Speed Controls: FIG. 13

At the top of FIG. 13, an AND-circuit 260 generates a LOGIC FEED signal on a line 262 which causes a feed flip-flop in the paper handler section (as described with respect to FIG. 24 hereinafter) to become set and thus allow the feeding of one page of paper. The AND-circuit 260 is enabled by the presence of the DYN RUN signal on line 245 concurrently with the output of the latch 263 provided no speed change is about to take place as indicated by an inverter 264, and described hereinafter. The latch 263 is initially set at the time that the operator presses the GO switch 224 (FIG. 12, hereinbefore) as a result of a SYS GO RST signal on the line 97 enabling an OR-circuit 268. The OR-circuit 268 can also respond to an AND-circuit 270 when in the product mode (253) and prior to the end of printing, as indicated by a NOT INTRPT FEED signal on a line 272, so as to hold a continuous set on the latch 263. This results in a constant LOGIC FEED signal on line 262 which is interpreted by the paper feed control section, as described hereinafter, as a command to feed multiple sheets. Multiple sheets will normally be fed until an interrupt feed signal (indicating an approaching end of product) is received, or an operator switches the system from PRODUCT to PAGE mode. Had the system been in the PAGE mode at the outset, the FEED signal on line 274 which results from the logic feed signal on line 262 would have reset the latch 263 (in the absence of the continuous set described hereinbefore) and only a single sheet of paper would have been fed.

The inverter 264, which prevents the AND-circuit 260 from operating whenever a speed change is to occur, responds to an exclusive OR-circuit 278 which compares the control character indication of whether high speed operation is to be utilized or not, as manifested by the HI SPD signal 80 with the setting of a trigger or flip-flop 280, the affirmative output of which comprises a PRINT HI SPD signal on a line 282 which controls the rate of paper handling as described with respect to FIG. 21 hereinafter. The flip-flop 280 can be triggered by the output of an AND-circuit 284. Each time the AND-circuit 284 operates, the flip-flop 280 will alter its state. The AND-circuit 284 will operate in response to an output from the exclusive OR-circuit 278, which is an indication that the speed called for by the program (line 80) is different than the speed commanded by the trigger 280 (line 282). However, the circuitry is interlocked in such a fashion that the speed cannot be changed whenever the transport is running, as controlled by a NOT TRANS RUN signal on a line 286 (described with respect to FIG. 24 hereinafter) nor can it operate when the LOGIC FEED signal is present on line 262, due to an inverter 288. In summary, whenever the paper transport is not running or being commanded to run, the flip-flop 280 may be altered to bring it into agreement with the speed command on line 80.

Sweep, Template and Memory Controls: FIGS. 14–17

Referring to the bottom of FIG. 14, the ELEMENT CLK signal on the line 74 defines the time at which each dot used in matrix printing may be generated by the CRT imager in the printer section (as described hereinafter). The element clock signal on line 74 is therefore utilized to synchronize both the fetching of a binary image template row from memory, and the shifting of this row through a shift register to serially present the row to the printer. As described briefly with respect to FIG. 9 hereinbefore, the present embodiment has the capability of printing one dot per binary ONE of the template data, or to repeat each dot both vertically and horizontally and hence print four spots per binary ONE of the template data. This spot quadrupling, which is used to halve the output resolution requires printing each template row twice (as described with respect to FIG. 9 hereinbefore) and requires that the imaging beam be intensified twice for each video output signal which corresponds to a binary ONE in the template data. Whether single-spot printing or spot quadrupling is programmed is determined by the presence or absence, respectively, of a SINGLE SPOT signal on a line 290 which is provided by the print line control character buffer in FIG. 7. When this signal is present, an AND-circuit 292 causes each element clock signal to energize an OR-circuit 294 and generate one output shift (OUTPUT SHFT) signal on a line 296. As is described with respect to FIG. 20, hereinafter, this is the signal that controls shifting the 16-bit binary image of one template row out of a shift register to control the printer. If the SINGLE SPOT signal is not present on the line 290, then an inverter 298 will cause an AND-circuit 300 to respond to a divide-by-2 circuit 302 (which may comprise a simple toggling flip-flop) so that the OR-circuit 294 will generate one OUTPUT SHFT signal on the line 296 for every two element clock signals on the line 74. Thus, two element clock signals will cause two spots to be printed for each binary ONE shifted serially out of the output shift register, thereby causing spot doubling to occur in each dot row of print. Note that only half as much information per line results when spot quadrupling is used: this is because the element clock, and therefore the rate of printing dots, remains the same. Thus, each character or element of the printed text is twice as wide. As described with respect to FIG. 9 hereinbefore, since two rows of output dots are used for each template row, each element of the text is also twice as long. Thus spot quadrupling results in one fourth as much information per page as may be printed with the single spot.

Figure 2C:
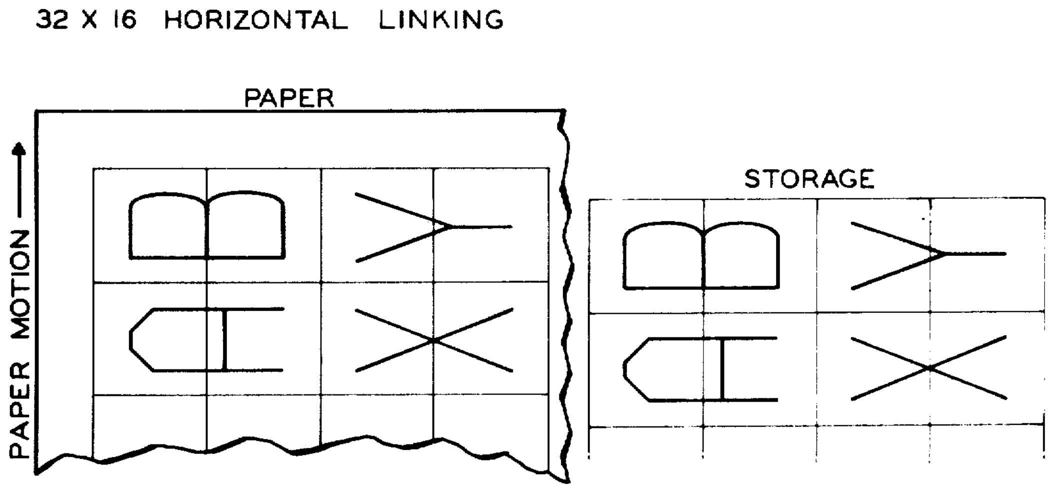
FIG. 2*c* is a graphical representation of storage and printing of 32×16 horizontally linked template configurations.
Figure 2F:
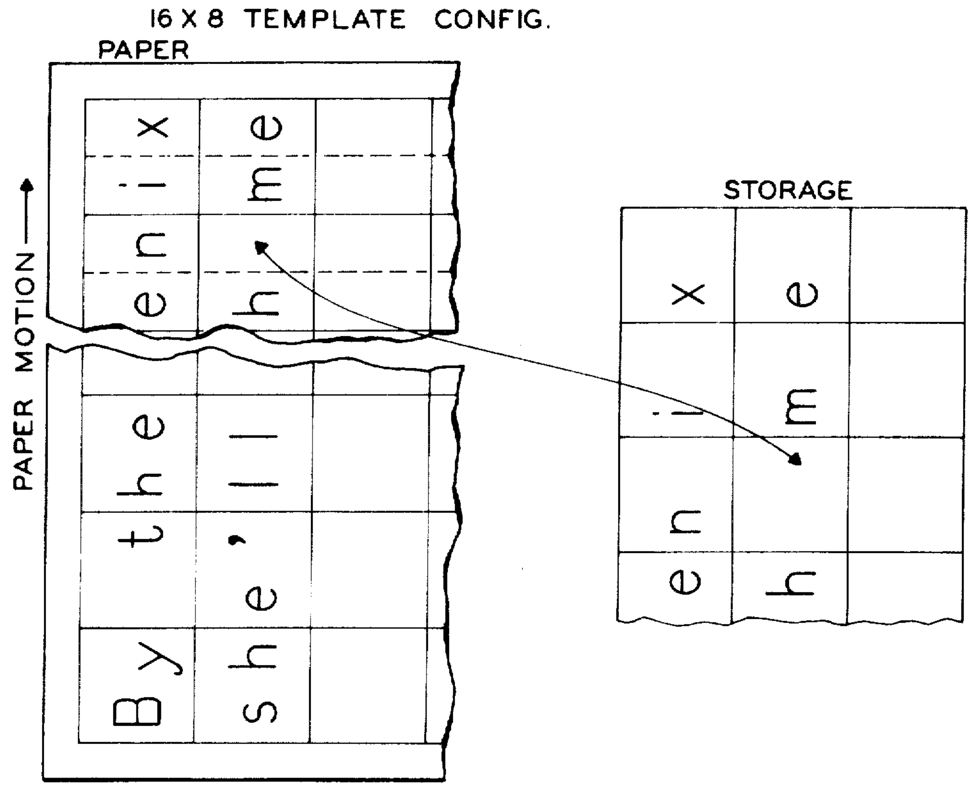
FIG. 2*f* is a graphical representation of 16×8, vertically truncated template configurations.
Figure 2G:
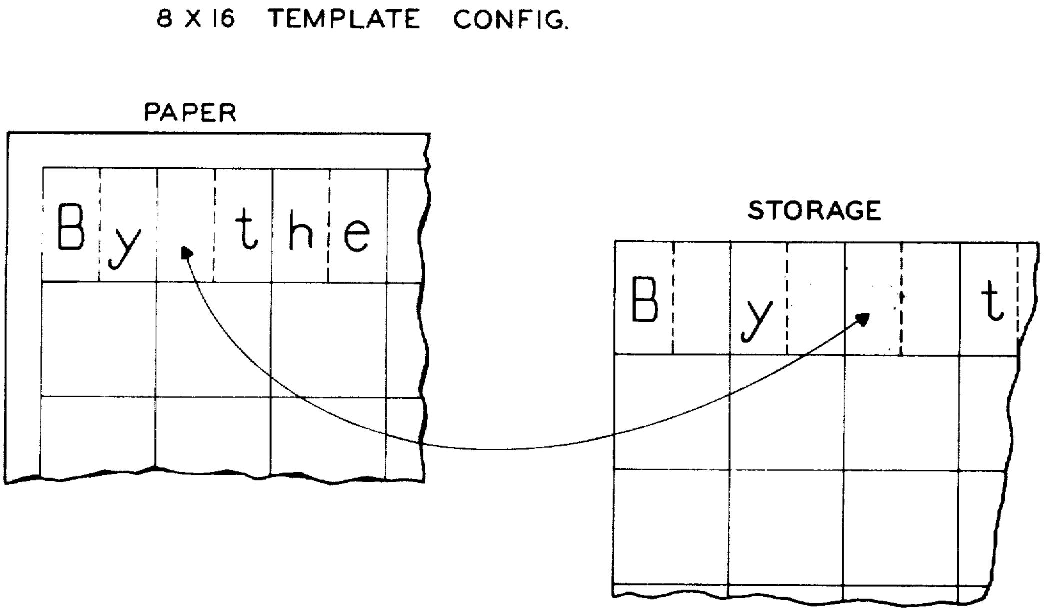
FIG. 2*g* is a graphical representation of 8×16, horizontally truncated template configurations.

In the case of a template configuration which is 16 bits wide, one template row will be read out to the printer as a result of 16 output shift signals on the line 296. When this has occurred, then it is time to fetch another template for loading into the output shift register so printing can continue across the dot row. To sense this, a four-bit counter 304 comprising a three-bit counter 306 and a controllable flip-flop 308, triggers a synchronous single shot 310 (of the type described with respect to FIGS. 5 and 6 hereinbefore), once for each 16 bits shifted out (in the normal case). During a normal running condition, as indicated by the DYN RUN signal on line 245, the single shot 310 generates a template synch pulse (TSP) signal on a line 312 to signify the beginning of each template during the serial shifting of data along the scan line. This template synch pulse is synchronized and clocked with phase two and system clock in a manner as shown in FIG. 6. In the case where 8×16 template configurations have been specified by a suitable combination of bits T0, T1 and T2 (PL CC BUF, FIG. 7), then the four-bit counter 304 is forced to act as a three-bit counter, and thus count to 8 instead of to 16. This is achieved by an AND-circuit 314 which monitors the absence of bits T0 and T2, which when T1 is a ONE designates the 8×16 configuration. (T1 equal to ZERO designates an unused code which is not used by the program). The AND-circuit 314 is further enabled by an end of sweep-start of sweep (EOS-SOS) signal on a line 316, which signal designates the actual dot generation portion of the CRT sweep, as described with respect to FIG. 15 hereinafter. When strobed by the template synch pulse signal on the line 312, the AND-circuit 314 will cause the four bit counter 306, 308 to operate in the 8×16 configuration during the active portion of each template row of each dot row of print, but not between dot rows. The AND-circuit 314 is applied to the forced set input of the trigger 308 so that the trigger 308 is set to one at the start of each dot row when eight-bit-wide template configurations have been specified. Thus, when the three-bit counter 306 advances from an all ONES to an all ZEROS condition (having counted to 8) it will cause the trigger 308 to toggle and since it has previously been set, it will become reset and the transition will gate the synchronous single shot 308 to generate a template synch pulse 312. The early SOS–EOS signal on line 316 causes the four-bit counter 304 to act as a four-bit counter during the between-sweep intervals so as to provide proper timing between sweeps, regardless of whether eight-bit-wide or 16-bit-wide templates are being utilized. This is necessary since continuous paper motion and control over the start of the sweep of the imager is what spaces the dot rows from each other. Note also that in the case of 32×16 template configuration, the templates are printed side by side in the same order in which they appear in storage (as illustrated in FIG. 2*c*) so that each template can be printed in sequence, 16 dots per template, and no alteration of the element clock, output shift or template synch pulse relationship need be made in the relationship. In summary, when high-resolution single-spot printing is being performed, one output shift is generated to shift one bit of binary image video information to the printer for each element clock signal. On the other hand, if two spots are to be printed for each binary bit in the binary image, one output shift signal is generated for each two element clock signals. when an eight-bit-wide template is being printed, one template synch pulse is generated for each eight output shifts; whereas when 16- or 32-bit-wide template printing is being performed, one template synch pulse is generated for each 16 output shifts.

The template synch pulse signal on line 312 is used in FIG. 15 to clock the transition which occurs at the end of one sweep (one dot row) through an intersweep period and the start of a subsequent sweep, as illustrated in FIG. 16. Therein, for each of the usual 128 templates contained in a print line, there is one template synch pulse generated. During the printing of the 128th (or such other template which is designated as the last template of a print row), the end of the print row will be indicated by the presence of a program end of sweep (PGM EOS) signal on line 320 (bottom of FIG. 15). This causes an OR-circuit 322 to force a first flip-flop 324 and a second flip-flop 325 into reset states. The very next template synch pulse which is generated will cause a third flip-flop 326 to assume the state of the flip-flop 325 since it is connected thereto in a double-rail fashion. Thus the flip-flop 326 assumes the reset state which signifies the end of sweep through start of sweep period by the generation of an EOS-SOS signal on a line 328. This signal is applied to the K input of the flip-flop 324 so that the next template synch pulse can cause the flip-flop 324 to again be set, which in turn enables the flip-flop 325 to follow the condition of the flip-flop 324 in response to the subsequent template synch pulse on the line 312. Thereafter, the flip-flop 326 again follows the flip-flop 325 and resumes the set condition so as to generate the start of sweep through end of sweep indication in the form of an SOS–EOS signal on a line 330. Thus, depending on where the program calls for the end of a print line (as described with respect to FIG. 20 hereinafter) the three flip-flops 324–326 will cause three intersweep periods (I.S. 1 etc., top FIG. 16) to be generated between sweep periods during which time a dot row has been printed. For each template synch pulse except during the time when the flip-flop 324 is in the reset condition ((*c*), (*d*), FIG. 16), an AND-circuit 332 will generate one data request pulse (DRP) signal on a line 334. The first data request pulse on line 34 will cause an AND-circuit 336 to generate a logical start of sweep (LSOS) signal on a line 338. This is so because only the first data request pulse coincides with the reset condition of the flip-flop 325.

The circuit of FIG. 15 generates one output buffer load signal for each data request pulse except the last (the one coincident with template synch pulse (*b*)). Since the last DRP fetches PGM EOS, but no output data, OBL is not required for that one instance. It is a matter of timing definition that the data request pulse generated by one template synch pulse will result in data being available to the 16-bit output shift register by the time the following template synch pulse occurs. In other words, response to data is controlled by the circuitry of FIG. 15, rather than by a synchronizing signal from the memory itself. At the bottom of FIG. 15, the OR-circuit 322, which initiates the end, between and start of sweep sequencing illustrated in FIG. 16, is initially operated by a system go reset signal on the line 97. This is necessary in order to cause the logical start of scan signal on line 188 to be generated in order to synchronize the horizontal scan address presets in FIG. 10.

In FIG. 17, memory requests for storing input data or fetching LACs and templates are utilized to generate interlaced memory read and write signals in accordance with a predetermined priority system. Referring briefly to FIG. 8, each time that both input data registers are filled, the synchronous single shot 128 will develop one tape data request (TDR) pulse on the line 130. This pulse is utilized in FIG. 17 to cause a memory write cycle in order to store those two bytes of data into memory. The TDR signal on line 130 sets a latch 350; its output can normally pass through an AND-circuit 352 so as to enable a flip-flop 354. The flip-flop is clocked with the phase one signal on the line 68. When the flip-flop 354 becomes set, it generates the load steer signal on the line 132, which is utilized in FIGS. 8 and 9 to control a memory write operation in order to store the two bytes of data from tape into one 16-bit storage location in memory, as described hereinbefore. The load steer signal on line 132 is used to reset the latch 350 and will cause an OR-circuit 356 to trigger a single shot 358. The OR-circuit 356 also operates an inverter 360 which blocks the AND-circuit 352 (and a similar AND-circuit 362 used to initiate memory read cycles). The output of the single shot 358 will operate either one of two AND-circuits 364, 366 in dependence upon the presence or absence of the load steer signal; when present, the AND-circuit 364 will cause a memory write (MEM WRITE) signal on a line 368 which is utilized (FIG. 1) to initiate a memory write or input operation within the memory. On the other hand, if the single shot 358 operates as a result of an unload steer signal on the line 376 the AND-circuit 366 will generate a MEM READ signal on a line 372, causing a fetch operation in memory. The complementary output of the single shot 358 constitutes a not memory busy (NOT MEM BUSY) signal 373 and is applied to the K inputs of both the load steer flip-flop 354 and unload steer flip-flop 374. This ensures that, when either flip-flop is in the one state, it will stay in that state until the single shot 358 completes its operation. When it has done so, the first phase one pulse following will cause whichever flip-flop happens to be set to become reset. With both flip-flops 354, 374 again reset, the OR-circuit 356 and inverter 360 act to enable AND-gates 352, 362 to permit the desired priority selection of the next load or unload memory operation.

An unload steer (UNLD STEER) signal may be generated by the flip-flop 374 in response to the AND-circuit 362 when a latch 378 has been set in response to a data request pulse (DRP) signal on the line 334. The AND-circuit 362 is not only blocked by the inverter 360 during the set condition of either trigger 354, 374, but is also blocked by absence of the complementary output of the latch 350. This gives priority to tape data request signals on the line 130 over the data request pulse signals on the line 334. In other words, whenever the tape has provided two bytes to be stored in memory, a related tape data request signal will be recognized in FIG. 17 provided only that neither of the triggers 354, 374 is currently on. The unload steer signal on line 376 is applied to a divide by two circuit 380, which may comprise an ordinary flip-flop, so that the latch 378 will remain set through two successive unload steer signals. When the first unload steer signal is generated by the flip-flop 374, the OR-circuit 356 will trigger the single shot 358. This causes the not memory busy signal on the line 373 to place a ZERO on the K input to the flip-flop 374. Since the flip-flop 374 is in the set condition, the OR-circuit 356 operates the inverter 360 to block the AND-circuit 362. Thus there is no input at either J or K input to the flip-flop 374 so that it cannot be clocked to a different state by the phase one signal 68. Hence it remains set, as described hereinbefore, until the single shot 358 completes its timing and NOT MEM BUSY 373 goes to a ONE. When the ensuing phase one signal clocks the flip-flop 374 off, the inverter 360 no longer is blocking the AND-circuit 362 so the next phase one signal can turn the flip-flop 374 on for a second time. Referring again briefly to FIG. 9, the first unload steer signal on line 376 is used to fetch a LAC, and a second unload steer signal is used to fetch the template specified by the LAC. Because the divide by two circuit 380 senses the second turning on of the flip-flop 374 and causes the latch 378 to be reset, no further unload cycles are generated until the next DRP is received.

In summary, each TDR results in one memory load operation while each DRP results in two unloads. Both load and unload cycles may be successively interlaced. In the present embodiment priority is given to the load operation due to external system constraints.

The unload steer signal on the line 376 is also applied to four AND-circuits 382–385 (bottom of FIG. 17). These AND circuits respond to stage zero and stage two of the horizontal scan address counter of FIG. 9 so as to utilize the first unload steer signal to generate the unload LAC signal on a line 386, and a second unload steer signal to cause the AND-circuit 385 to generate the unload template signal on the line 388, along with one or the other of the AND-circuits 383, 384 generating an unload template. A signal on a line 390 or an unload template B signal on the line 392. Thus, in four successive unload steers, the first generates an unload LAC, the second generates unload template and unload template A, the third generates an unload LAC, and the fourth generates an unload template and an unload template B.

Main Function Controls: FIGS. 18 and 19

As described briefly hereinbefore, the tape unit will supply two different types of data blocks to the system, as seen in table 4. The page/product blocks contain page and product control information and may contain a number of data templates. On the other hand, print line blocks contain print line control information and literal address codes as well as templates, in some cases. Since it is operationally possible for the tape drive to start up at other than at the beginning of a page the constraint has been made that receipt of the first print line block of a page must be recognized prior to allowing the system to enter the dynamic run condition, which initiates the printer operation. As shown near the bottom of FIG. 18, a system go reset signal on the line 97 operates an OR-circuit 400 to set a tape command buffer latch 402 which in turn sets a tape go latch 404 (assuming the latch had been initially reset) and, via a delay circuit 440, resets the latch 402. The latch 404 generates the TAPE GO signal on the line 33 which causes the tape unit to commence delivering bytes of data to the system input circuits 42 shown in FIG. 7, the receipt of which enables the generation of the tape data ready signal at the bottom of FIG. 8. The latch 404 will thereafter remain set until receipt of an end of block signal from the tape unit on line 34 in the presence of a dynamic run condition (245), which condition can occur only after the receipt of the first print line block of data of a page. The AND-circuit 410 will therefore not respond to end of block signals associated with spurious page/product blocks at the commencement of a printing operation. The latch 404 is also reset (OR-circuit 411) if the system go latch is reset (FIG. 12).

Following the initial data transfer, the OR-circuit 400 will be wholly operated by the MBR SYNCH signal generated on a line 412 by a synchronous single shot 414. One MBR SYNCH signal is normally generated for each print line when plotting, but may span multiple print lines when printing. The single shot 414 is synchronized with the end of sweep-start of sweep signal on the line 328 so that MBR SYNCH occurs during the intersweep period for reasons of internal timing discussed hereinafter. The MBR SYNCH is initially triggered by the output of an OR-circuit 416 which responds to a paper start of page (PAPER SOP) signal on a line 418. As described in more detail with respect to FIG. 25 hereinafter, the paper start of page signal indicates that the paper feed has been energized and that the paper has advanced to the point where printing may begin (leading edge of the page aligned with the imager in the present embodiment). After the initial MBR SYNCH (for each page) the OR-circuit 416 responds solely to an AND-circuit 420 upon receipt of a memory buffer ready (MBR) signal on a line 422 in dependence upon an output data enable flip-flop 424 being set. The MBR signal on line 422 is generated by stage 17 of the vertical scan address counter. When stage 17 advances from a one to a zero, the negative transition is fed through the AND-circuit 420 and OR-circuit 416 to trigger the synchronous single shot 414. This occurs when the vertical scan address counter has counted all the way through 16-dot rows, indicating that a complete print line has been printed in the case of single print line LAC addressing. In the case where four print lines of LACs are stored in either memory half, then the memory buffer ready signal appears after all four print lines have been completed. In either case, it signals that one memory half has completed printing and may be refilled while the other memory half is printing. The MBR SYNCH signal on line 412 also clocks the ODE flip-flop 424, whose double rail input is the print line designating bit of the control character in FIG. 7. The flip-flop 424, which is initially reset by the NOT DYN RUN 245 signal, will always be set in response to the MBR SYNCH signal resulting from paper start of page; this is so because start of page is the first logical event acknowledged following the receipt of the first print line block, wherein the print line designating bit is by definition a ONE. MBR SYNCH causes the ODE flip-flop 424 to remain set so long as the last data block received is a print line block rather than a page/product block. As long as the flip-flop 424 is in the set state, it signifies the output data enable (ODE) signal on the line 426. As its name applied, this signal permits data shifted serially out of the output shift register to be passed to the video section; alternatively, without the output data enable signal on line 426, no video signals are sent to the printer. The complementary output of the output data enable trigger 424, comprising the not ODE signal on a line 428 is used as a recognition of before page and between page times; this signal enables setting the first print line control character into the buffer 112 (FIG. 7) and also causes the first memory buffer ready synch pulse on line 412 to operate an AND-circuit 430 which resets the vertical scan address counter at the start of each page. At all other times, the vertical scan address counter is free running in that it does not get reset between print lines or after use of each memory half. During normal operation the output data enable latch 424 remains set until a page/product block is read from tape into the system; When this happens the next MBR synch pulse received, which logically signifies that the last PL block of the page has been printed, will cause a resetting of the output data enable flip-flop 424 to block further video output for that page. The output data enable latch may also be reset by the NOT DYN RUN signal on the line 245 in the event that the system go latch 218 (FIG. 12) is turned off for any of the reasons described hereinbefore.

After the initial MBR SYNCH (the one generated by PAPER SOP), subsequent MBR synchs will be generated at fixed timing intervals as determined by the output of the vertical scan address counter. Each MBR SYNCH generated will result in the generation of a TAPE GO signal on line 33, in a manner as described hereinafter, so as to cause a complete data block to be transferred prior to the receipt of the next MBR SYNCH. System timing constraints (such as tape transfer rate, paper speed, etc.,) may be readily determined to ensure the successful attainment of the data block transfer on an average basis; however, certain anomalies exist in tape characteristics (such as successively long record gaps, etc.,) which prelude the attainment of proper data transfer rates in isolated instances. Therefore each MBR SYNC is buffered by a flip-flop 402 prior to being transferred to a flip-flop 404 to generate a TAPE GO record gaps, etc.,) which prelude on line 33.

The latch 402 is set by each MBR synch pulse, but reset only when the tape go latch is actually set due to the feedback through the delay circuit 406, and the AND-circuit 408, which through a delay circuit 440 controls the resetting of the latch 402. Thus, if the end of block has not yet been received from tape at the time that an MBR synch pulse is received, the latch 402 will become set and remember that the MBR synch pulse has been received, but the AND-circuit 408 will not operate until the EOB resets the latch 404. In this condition latch 402 will remain set and indicate a NOT INCREMENT ENABLE condition on a line 434. In the present embodiment the option exists to ignore this signal and continue printing under the assumption that the resultant printing errors will be minimal; conversely, the signal may be used to inhibit either or both the vertical scan increment and output video data. In the present embodiment with synchronous paper motion, the latter option results in a blank space between successive print lines which is proportional to the time of duration of the aforementioned condition. With an incremental paper handler, the latter option could also be employed to inhibit paper motion and thereby avoid the incurrence of extra line spacing.

Memory Output: FIG. 20

At the top of FIG. 20, the memory data output buffer 444 comprises a gated register of any well-known type which will assume the condition of 16 data input lines 446 containing memory output data whenever it receives a memory data available signal on a line 448 from memory; the content of the memory data output buffer will therefore remain static between the receipt of successive memory data available signals on the line 448. This data may either comprise a pair of LACs which are applied to the address selection circuits of FIG. 9 or it may comprise a row of a data template which is to be printed. It may also comprise a coded indication of the end of a sweep line as determined by detectors 450, 452 which sense the presence of a LAC which itself specifies the basic LAC address. This represents an illegal operation which has intentionally been incorporated to signify the end of scan signal. Detection of this condition causes an OR-circuit 454 to generate the program end of sweep (PGM EOS) signal on the line 320. The detectors 450, 452 may comprise any form of simple decode circuits such as a diode matrix or a combination of AND or OR circuits.

Design timing requirements dictate the selection of a core memory of sufficient speed (1.0 microsecond cycle time in the current embodiment) to permit the load/unload priority selection and executions as described herein before to be accomplished within a known, fixed time interval. Thus, the data template is assumed to be present in the memory data output buffer during the occurrence of the output buffer load signal on the line 342. This signal causes the content of the memory data out buffer 444 to be gated, in parallel, into a 16-bit shift register comprising the output data register 456. The next 16 output shift pulses on the line 296 will cause the data bits to be shifted out of the shift register through an AND-circuit 458, each bit being shaped in a single shot 460. The output of the single shot 460 comprises the video signals used to control the duration of beam on-time in the CRT imager, as required for printings. AND-circuit 458 will operate only when the output data enable signal is present on the line 426 and (optionally) the increment enable signal is present on the line 434. The AND-circuit 458 is gated by the element clock signal on the line 74. As described hereinbefore, in normal printing there is one element clock signal per output shift signal; however when spot quadrupling has been specified by the program, then there will be two element clock signals on the line 74 for each shift of the shift register 456 so that two spots will be generated in response to each binary ONE shifted out through the shift register 456.

Printer: FIGS. 21–25

In FIG. 21, the printer includes an imagining device 500 which in the present embodiment comprises a cathode-ray tube having a fiber optic face plate for improved image resolution. Paper is fed from a continuous roll, out to predetermined lengths, and fed beneath a charger station 502 where the paper receives an electrostatic charge. As the charged paper passes over the CRT imager, each binary ONE in the video unblanks the beam to deplete the charge on the paper at a given spot. The beam sweeps across the paper in a direction (assumed to be into the page as seen in FIG. 21) perpendicular to paper motion as the paper advances (from right to left in FIG. 21) beneath the CRT imager 500. The paper passes a developer which applies toner to the latent charge image, and then passes a fuser (which may apply heat or pressure in any number of well-known ways) to fuse the toner at the charge-depleted spots on the paper. The paper is then lodged in a stacker 508. The printer of FIG. 21 also comprises the paper-handling mechanism to cause the advancement of the paper through the apparatus just described. The paper handler comprises two main sections: the first section is the feeder 510 which supplies uncut paper from a continuous paper roll 511, cuts it to desired lengths, and passes the cut sheets to the other section—the transport 512. The paper feeder feeds paper slightly faster than the paper transport moves paper, for reasons described hereinafter. In the present embodiment the paper transport 512 may operate either at 1.8 or 3.6 inches per second. Paper motion through the feeder and transport sections is governed by corresponding motors 514, 516, each of of which has a related motor control circuit 518, 520. The motor 514 drives the feed rollers 522 whereas the motor 516 drives the transport rollers 524. Such systems are well known in the art and will not be described further.

In the present embodiment, as is described more fully hereinafter, for the printer ready signal which is required for a system ready (FIG. 12, hereinbefore), paper has to be fed through the rollers 522 and to a point in the feed where the edge of the paper is sensed by a paper sense one apparatus 526. This apparatus may comprise a light and an optical detector of the type well known in the art and commonly used for such purpose. This feeding of the paper may be done by special controls (not shown herein) or manually by releasing the clutches on the rollers 522, all as is known in the art. The paper feeder section 510 also includes a paper cutter 528 which responds to a CUT signal on a line 530 to cause cutting of the paper. In order to have the paper stopped at the time a cut is made, not only does the feeder 510 run at a higher speed than a transport 512 so as to generate a loop 532 but the feed motor 514 is temporarily halted so that the rollers 522 are stationary when a cut is made. In order to detect the amount of paper fed through the rollers 522, they are provided with a ROLLER ONE sensor (ROLR 1) 534 which may comprise a light shining through a diametric hole in the roller or a drive shaft thereof, or suitable other mechanical signalling. In the present embodiment, it is assumed that each roller has a 1-inch circumference, and that a diametric sensor is utilized so that one pulse is generated by the ROLLER ONE sensor for each half inch of paper fed therethrough. A similar sensor (ROLR 2) 536 is provided in the transport section 512 in order to keep track of the amount of paper fed therethrough. Also, a paper sensor (PAPR SENS 2) 538 at the end of the transport section 512 senses a sheet of paper reaching the end of the transport section 512. An arrow 539 indicates the position of the leading edge of paper at the time that the paper start of page signal is generated (as described with respect to FIG. 25, hereinafter.) General timing of the feed section is illustrated in FIG. 22.

Referring now to FIG. 23, all of the sensing relating to the paper handler is synchronized to phase two timing signals on the line 69 by a plurality of synchronous single shots 544–547, with the exception of paper sensor 1, which is utilized without synchronization. At the top of FIG. 23, a four-bit closed loop ring 550 advances once for each phase two signal as illustrated by the timing chart in FIG. 23a. The first and third stage outputs are utilized as phase A and phase B for synchronizing the single shots 544–547, and the second and fourth stages are used as phase-plus-90 stages to separate phase A and phase B by a suitable interval. The single shot 544 is triggered by the negative transition of a paper sensor two signal on a line 538a, as synchronized with the phase B signal on a line 548, and clocked with the phase two signal on a line 69. Thus, each time a sheet clears paper sensor two, it provides a signal and since the single shot 544 is clocked with a phase two signal next following the phase B signal which synchronizes it, a paper two synch (PAPR 2 SYNC) signal will appear on a line 550 during one of the times indicated as phase B plus 90 in FIG. 23a. Similarly, the single shot 545 is triggered by the fall of a ROLLER 1 signal on a line 534a, as synchronized with the phase A signal on a line 552 and clocked to the phase two signal on the line 69 so as to generate a roller one synch (ROLR 1 SYNC) signal on a line 554. The signal on the line 554 will coincide with one of the signals indicated as phase A plus 90 in FIG. 23a. The single shot 546 is triggered by the negative transition at the end of a ROLLER 2 signal on a line 536a, synchronized with the phase B signal on the line 548, and clocked with the phase two signal on the line 69 so that its output, a ROLR 2 SYNC signal on a line 554, will correspond in time with one of the signals indicated as phase B plus 90 in FIG. 23a. The single shot 547 is triggered with the fall of a feed signal on a line 274, synchronized with the phase A signal on the line 552, and gated with the phase two signal on the line 69 so that a FEED SYNC signal on the line 560 coincides with one of the signals indicated as phase A plus 90 in FIG. 23a.

In FIG. 24, the FEED signal on line 274 is generated by a flip-flop 566 which is clocked by the negative transition of an OR-circuit 568 in response to a PAPR SENS 1 signal on a line 526a, or in response to an AND-circuit 570. The flip-flop 566 is enabled so as to assume a set state (thereby to generate the FEED signal) on the line 274 in response to a LOGIC FEED signal on the line 262. As described with respect to FIG. 13, hereinbefore, this signal indicates that the control logic is commanding the paper handler to feed a sheet of paper. When the logic feed signal appears on line 262, it will have no immediate effect on the trigger 566, pending an output from the OR-circuit 568 to clock the trigger 566. This will be generated by the AND-circuit 570 in response to a delay circuit 572 which provides an output after a certain delay from the turn on of a transport run latch 574. This latch is turned on by a single shot 576 is response to the logic feed signal on the line 262. The delay unit 572 has sufficient delay to permit the transport stages to attain their rated speed prior to enabling the AND-gate 570. The offside (NOT Q) of the flip-flop 566 is fed to an AND-circuit 578 gated with the logical event of paper sensor one (526, FIG. 21) indicating that the edge of the sheet has appeared therebeneath. Thus, with the trigger 566 in the off state, and paper advanced to the point where it provides a signal under paper sensor one (526, FIG. 21), the AND-circuit 578 will generate the PRNTR RDY signal on the line 216. As described hereinbefore, this is utilized in FIG. 12 to enable operation of the go switch to cause a system go reset to generate the first tape go signal to begin reading information into the system from tape. The system go reset also sets the logic feed latch 263 in FIG. 13, so that once print line information is being received and the dynamic run trigger 246 of FIG. 12 is set, AND-circuit 260 in FIG. 13 will generate the logic feed signal on line 262 to cause paper feeding to begin. The logic feed signal on line 262 first sets the latch 574 to generate the transport run signal on the line 286 which is utilized in FIG. 21 to actually cause the paper transport motor control 520 to energize the motor 516 thereby causing the rollers 527 of the paper transport section 512 to commence motion. Once these are in motion, each half revolution of the first transport roller 524 will cause the roller two sensor 536 to initiate a signal resulting in a roller two synch signal on the line 556. After a suitable delay as determined by the delay unit 572, the AND-circuit 570 will respond to a roller two synch signal on the line 556 to cause the feed trigger 566 to become set. The NOT CUT INHIBIT signal on a line 580 will in this sequence enable an AND-circuit 582 to generate a FEED RUN signal on the line 584, which signal causes the paper feed motor control 518 of FIG. 21 to energize the motor 514 thereby causing the paper feeder section 510 to advance paper from beneath the paper sensor one 526 through the first rollers 524 towards the charger 502. The feed will continue to run until a sufficient loop of paper (532, FIG. 21) has been generated, due to the speed differential between transport and feeder sections), to provide the desired total length of paper for a sheet in advance of the cutter 528 (FIG. 21). Then, in the manner described hereinafter, the cut signal on the line 530 causes a latch 584 to be reset so that it no longer generates the NOT CUT ENABLE signal on the line 580. In other words, the sheet which has just now been fed becomes, in a sense, a previous sheet with respect to the feed section since it has been cut and is feeding therefrom. The feed then stops until such time as the latch 584 is again set (as described hereinafter), and will cause the paper feeder section 510 (FIG. 21) to start up again and to again feed paper until such time as the paper appears beneath the paper sensor one 526; at that time the OR-circuit 568 clocks the trigger 566 at the same time that the paper sense one signal on the line 564 provides a negative signal at the K input to the feedtrigger 566; regardless of whether the LOGIC FEED signal is still present, the trigger 566 toggles from a set condition into the reset condition. The feed unit will now wait until it receives another roller two synch signal through the AND-circuit 570; as described hereinafter, the transport run latch 574 will remain set until all paper has cleared the paper transport section 512. This function is controlled by an OR-circuit 586 which will reset the latch 574; in normal operations (other than start up and jams) the OR-circuit 586 is operated by a signal on a line 590, which indicates that the last sheet which has been fed by the paper feeder has in fact passed beneath paper sensor two 538 (FIG. 21) and is in the stacker 508. This signal is generated by a borrow out of the highest order stage of a four stage up/down idle counter 592. When the system is first turned on, the PWR ON RST signal on the line 232 presets the counter 592 to all ones, which is equivalent to minus one. Thereafter, each time the feed trigger 566 is turned on, a feed synch signal will appear on line 560 to increment the count in the up/down counter 592. This effectively logs-in the sheets sent by the paper feeder section 510 to the paper transport section 512. Then, for each sensing of a sheet by the paper sensor two 528 (FIG. 21) there will be a PAPR 2 SYNC signal on the line 550 which logs the sheet of paper out of the paper transport unit by causing the up/down counter 592 to count down by one count. FEED SYNC is timed to phase A plus 90 (FIG. 23) and PAPR 2 SYNC is timed to phase B plus 90, so the up-and-down counts never interfere with each other. As the last sheet fed is sensed passing under paper sensor two 538, that particular paper two synch signal on line 550 will cause the up/down counter 592 to count to minus one (an all ones condition) and generate a borrow signal out of the highest order, which comprises the signal on the line 590, and operate the OR-circuit 586 which resets the transport run latch 574. The OR-circuit 586 is also operated by the PWR ON RST signal on the line 232 when the system is turned on and by a jam reset signal generated on a line 594 as a result of operating a JAM RST switch 596. In addition, an AND-circuit 598 can cause the OR-circuit 586 to reset the transport latch 574 in response to a JAM 2 signal on a line 600 concurrently with the absence of the feed signal on the line 274. This is a convention (a matter of design choice) that allows the transport to run until a normal feed stop. A similar OR-circuit 599 resets the FEED trigger 566 in response to reset or a JAM 1 signal on a line 601. The nature of the JAM 1 and JAM 2 signals is described with respect to FIG. 25 hereinafter.

At the top of FIG. 24, another four stage up/down counter 602 serves to maintain a constant sheet-to-sheet spacing during repetitive feed operations (when the transport unit is running continuously and the paper feeder is running so as to supply it will successive sheets). The counter 602 maintains a dynamic count representing the amount of paper within the loop 532 (FIG. 21) by being incremented in response to the ROLR 1 SYNC signal on the line 554, and decremented by the signal on the ROLR 2 SYNC signal on the line 556. The counter is initially preset for each sheet fed by an amount which represents the desired intersheet spacing. In the present embodiment, each of the roller synch pulses represents one half inch of paper fed through the related roller. The paper feeder section 510 operates at a speed which is slightly higher than the speed of the paper transport section 512. Thus, even though paper is being removed by the transport section while paper is being fed by the feeder section, the loop will continue to build up until the desired paper length is indicated. At this point, the feeder can be stopped (because of the loop buildup) so that the cutter can cut across a stationary section of paper while the transport continues to remove paper from the loop 532. Once the sheet is cut, the loop must be allowed to fully deplete and an intersheet tailgate spacing inserted prior to allowing the paper feeder 510 to begin feeding the next sheet of paper. The up/down counter 602 is initially preset to one less than the binary value of the desired intersheet spacing, where each binary bit represents one-half inch (since each of the pulses which increment or decrement the counter represents one-half inch of paper fed). To accomplish this, each feed synch signal on the line 560 will set a latch 604, which latch remains set until it is reset by a counter borrow signal on a line 606. Resetting of the latch 604 causes forced presets to be applied to the counter 602. As an example, consider 11-inch sheets. The counter 602 would be incremented over a period of time by 22 roller synch one signals each representing one-half inch of paper feed, while during the same time, but at different synch intervals (due to the synchronizing of these signals with phase A plus 90 and phase B plus 90 as illustrated in FIG. 23) the counter 602 would be decremented once for each half inch of paper fed through the transport section. When an equal number of paper has fed through the transport as fed through the feed section, the up/down counter will return to the count to which it was preset. Assuming as an example that a 1-inch intersheet space is desired, the counter will have originally been preset to one (with the lowest ordered stage set and the remaining stages in the reset state); after being incremented and decremented for a total of 22 pulses each, the counter will again be set to one. The next roller two synch pulse will cause the counter to decrement to a count of zero, and the following roller two synch pulse will cause it to be set to minus one (an all ones condition) which causes the borrow signal to appear on the line 606. Thus, the counter 602 is preset to a binary count which is greater than minus one (all ones condition) by one binary count per half inch of desired intersheet spacing. This presetting is controlled by a plurality of switches 608–610, which can be set at the start of any job to provide the desired intersheet spacing. For a 1-inch intersheet gap, switch 608 is closed causing an OR-circuit 612 to preset the lowest ordered stage, as described in the above example. For a 1½-inch intersheet space, closing of a switch 609 causes an OR-circuit 614 to preset the counter to a count of two (the second order stage only), which requires one additional half inch to have been sensed by the roller synch two signal before the borrow is generated. Note that the preset condition is forced on the counter 602 by the latch 604 from the time the borrow signal is generated until the following feed synch signal is received; this merely prevents the counter from operating during the period when there is no loop buildup to be monitored.

Figure 25:
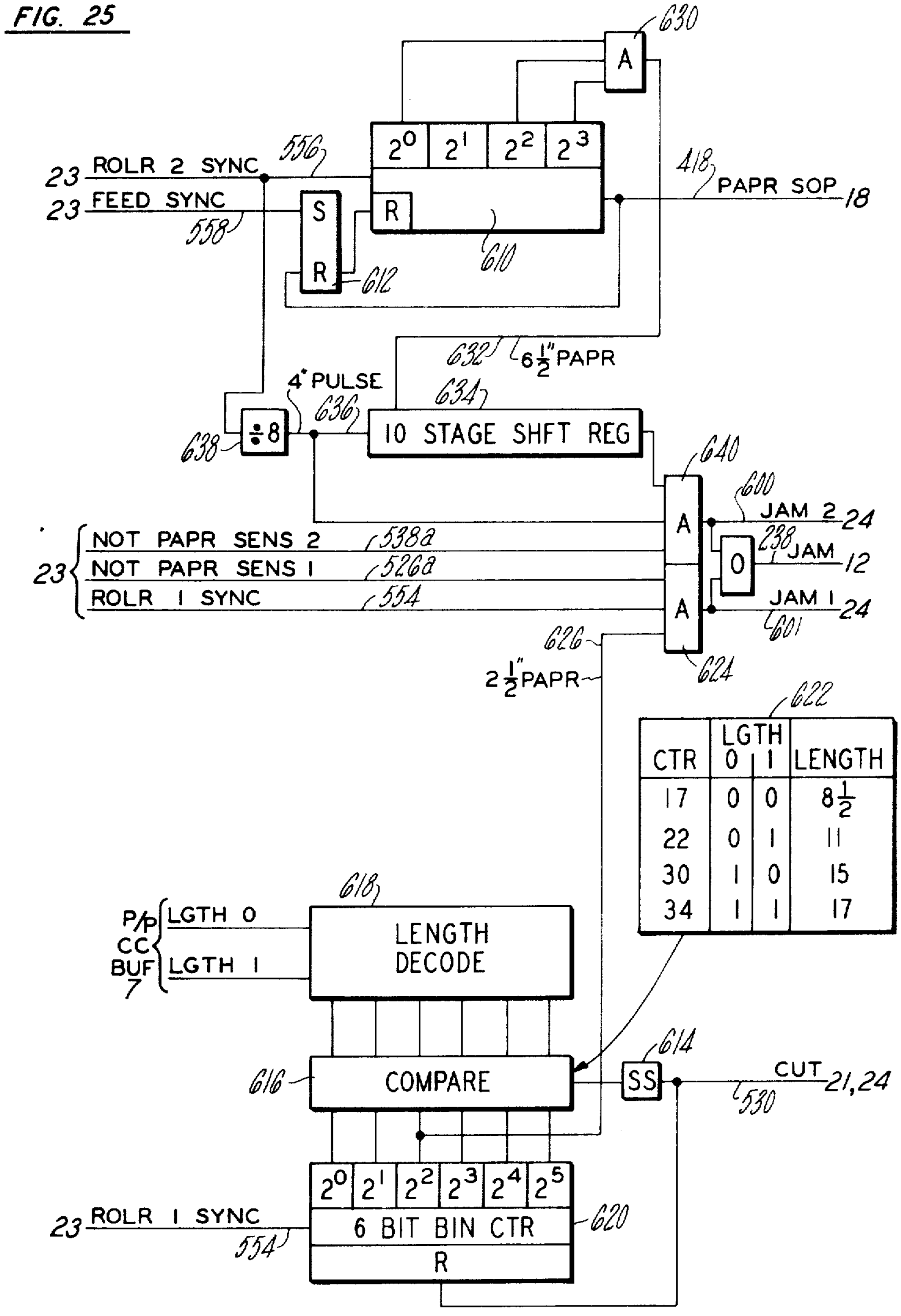

Referring to FIG. 25, the paper start of page (PAPR SOP) signal on line 418 generates the first memory buffer ready signal in FIG. 18 (thereby denoting that printing may begin from one half of memory, and that an additional print line block, or four print line blocks in the case of four print line LAC addressing, may be read into the other half of memory). The paper SOP signal on line 418 is generated by the output of a four-bit binary counter 610, which indicates a count of 16 roller two synch signals on the line 556; since in the present embodiment each roller synch signal is the equivalent to one-half inch of paper feed, this indicates that 8 inches of paper have advanced into the paper transport section 512 and that the leading edge of the paper has just reached the CRT imager, indicated by the arrow 539 in FIG. 21. Each time that a paper SOP signal is generated on a line 418, it resets a latch 612, the reset side of which forces the counter 610 to remain in an all zeros state without regard to the receipt thereat of roller two synch pulses on the line 556. Thus the counter 610 cannot operate from the time of paper SOP until a following feed command is indicated by a feed synch signal on the line 558 which sets the latch 612. Stated alternatively, the counter 610 will count roller two synch pulses from the initiation of a feed command until the leading edge of the paper has traversed eight inches, at which point it ceases counting, having generated the paper SOP signal on the line 418.

At the bottom of FIG. 25, the CUT signal is generated on the line 530 in response to a single shot 614 which is triggered by the output of a comparison circuit 616. The comparison circuit 616 compares the output of the binary length decode circuit 618 with the counts contained in a six-bit binary counter 620. The length decode circuit 618 utilizes the length designators in the page/product control character buffer (FIG. 7) to decode the desired length of each sheet of paper, as illustrated in the chart 622 of FIG. 25. Thus if the sheet length is to be 8 ½ inches, both of the bits (LGTH 0, LGTH 1) will be ZEROs. Eleven-inch sheet length is designated by LGTH 0 being a ZERO and LGTH 1 being a ONE; 15-inch paper length is designated by LGTH 1 being a ONE and LGTH 1 being a ZERO; when both bits are ONEs, a length of 17 inches is indicated. Since the roller one synch pulses on line 554 indicate one-half inch per pulse of paper feed through the paper feeder 510, twice as many pulses must be received as inches of length desired. When the counter 620 advances to a count equal to twice the number of desired inches, the compare circuit 616 provides the output to generate the CUT signal on the line 530.

As a precaution in paper handling, two different paper-jam-designating signals are generated under certain conditions. The JAM 1 signal on the line 602 detects any failure in feeding paper up to paper sensor one 526 (FIG. 21). In the present embodiment, there are approximately 1 ½ inches between the cutter 528 and the first paper sensor 526 (FIG. 21); consequently, if paper has not reached the first sensor 526 by the time that sufficient paper has been fed, then the JAM 1 signal on the line 601 will be generated. To accomplish this, an AND-circuit 624 responds to a signal on a line 626 indicating that stage 3 of the cut counter 620 has been set indicating 2 inches of paper have been fed from the cutter toward the first paper sensor 526 (FIG. 21). If the first paper sensor 526 has not been operated by that time, then a NOT PAPR SENS 1 signal on a line 526a, gated with the roller one synch pulse on line 545, will cause the AND-circuit 624 to generate the JAM 1 signal on the line 601.

The JAM 2 signal on the line 600 indicates a failure in timely passage of cut sheets through the transport section 512. When a feed command is generated, paper proceeds through the transport and ultimately passes under the second paper sensor 538 (FIG. 21) as it emerges into the paper stacker 508. The desirable precaution is therefore to monitor the passage of the various length paper sheets through the transport and check for their emergence at the stacker. Since the transport section is approximately 3 feet long, up to four or five different sheets of paper may be in transit within the transport unit at any one time. In the present invention, means are provided to create a pulse for each sheet of paper as it enters the transport, and to advance each of these pulses through a shift register so the advancement of the pulse through the shift register roughly parallels the advancement of the actual sheet through the transport. The emergence of the pulse from the shift register therefore provides an indication that the related sheet of paper should have passed under paper sensor two. At the top of FIG. 25, an AND-circuit 630 senses when the start of page counter has reached a count of 13, indicating that approximately 6 ½ inches of the sheet have been fed through the roller two sensor 536. This pulse therefore relates to that sheet of paper currently advancing to the CRT imager. The signal from the AND-circuit 630 proceeds over a line 632 to the first stage of a 10-stage shift register 634, which is advanced once for each 4 inches of paper feed, by a signal on a line 636 from a divide-by-8 circuit 638, which may comprise a simple three-stage counter. Thus for each roller two synch signal on the line 556, a signal indicating four inches of paper feed appears on the line 636. The 10-stage shift register is of the type readily available on the market, and responds to the fall of the signal on the line 636 so that when a four-inch pulse is available thereon, and any of the pulses introduced into the 10-stage shift register have advanced to the last stage thereof, there had better be paper beneath paper sensor two so that there will be no NOT PAPER SENSE 2 signal on the line 538a to thereby gate the AND-circuit 640 and generate a JAM 2 signal on the line 600. Notice that the criticality of the timing adjusting is merely that, for the various sizes of paper sheets which can pass through the transport, the 10-stage shift register 634 should not have an output coincident with a four inch pulse 636 at a time when a valid intersheet space may be passing underneath paper sensor two.

By accommodating a high resolution CRT image, the system herewith produces high-quality print or graphics (plots) at very high speed. For instance, the fiber-optic face plate CRT used herein is capable of generating spots of 5-mil diameter. With the clock (FIG. 3) set to divide system clock by 9, these dots are generated on 5-mil centers (just touching). By increasing the element clock rate (e.g., divide by 7), the dots will overlap by a small amount, thus appearing as very fine lines.

System Operation

The first step in initiating operation of the system is turning on of power to the system which causes (FIG. 12) a power on reset 232. This ensures that the system go latch 218 is reset, as well as resetting the idle counter 592 (FIG. 24) which monitors the number of sheets in the transport; the condition whereby no sheets are in the transport is indicated by the reset state. Power on reset further ensures that the transport run latch 574 (FIG. 24) is off. With power on, the system clock (FIG. 3) is running at a basic frequency of the crystal oscillator, which in this embodiment is 13.8 MHz. In preparation for starting up the system, the tape unit must be on, a suitable tape mounted and advanced to the load point, and the tape ready signal sent by the tape unit to the system go controls in FIG. 12. The paper is advanced by hand until it appears at paper sensor one, which with the feed flip-flop (FIG. 24) reset, generates a printer ready signal which is also applied to the circuits of FIG. 12. With the system ready to operate, all that remains is for the operator to press the go switch 224 (FIG. 12). When the go switch is depressed, the system go latch 218 is set so the single shot generates a system go reset. The system go reset signal resets the input scan address counter 140 and the strobe counter 121 in FIG. 8 so that loading of data from tape into memory will begin at the lowest ordered one of the 16 storage locations specified by addresses received on tape as described hereinbefore, with the first byte recognized as a control character. The system go reset is also applied in FIG. 13 to set the logic feed latch 262 so as to partially enable the circuit of FIG. 13 which will advance a logic feed signal once print line information is being received by the tape unit as indicated by the dynamic run signal (described hereinafter). The system go reset is also applied to cause a resetting of the flip-flops of the sweep control in FIG. 15 so as to synchronize a start of sweep with the commencement of operations. Finally, system go reset is applied to the controls of FIG. 18 to set the latch 402 thereby setting the latch 404 to generate the tape go signal.

The tape go signal is applied to the tap unit which begins to feed tape and read data into the input circuits of FIG. 7. Coincident with each data byte, the tape supplies a tape clock signal which is used to generate the input data clock signal in FIG. 3. This signal is monitored in FIG. 8 to generate strobe signals which cause the bytes of data received in the input circuits of FIG. 7 to be loaded in sequence: first, into the control character buffer, then the input address register, then the first input data register and then the second input data register. At this point the circuitry of FIG. 8 generates a tape data ready (TDR) signal which in turn causes the circuits of FIG. 17 to generate a load steer signal. This further causes a memory write operation, at the completion of which the input scan address counter of FIG. 8 is incremented. This is accomplished by incrementing the counter 140 on the fall of the load steer signal on the line 132, while the low-order address bits comprising the output of the four-bit counter 140 are gated (in FIG. 9) through the gate 170 into the memory address input circuits 155 during the presence of the load steer signal; in other words the address bits are used first and the incrementing of the input address counter in FIG. 8 occurs thereafter. The circuits of FIG. 8 then cause the circuits of FIG. 7 to steer the next two bytes of data into the first and second input data registers (48, 49) respectively, and again cause a TDR signal, a load steer signal, and a load memory operation to store the fifth and sixth bytes of data from tape in memory. This process continues until 32 bytes of data (16 storage words) have been stored in memory, at which time the circuit of FIG. 8 causes the next strobe signal to be a strobe address register signal, since at this point the tape provides an additional address for storing the next 32 bytes of data in a template-sized group of 16 storage locations in memory. This process may continue indefinitely until the tape signifies to the system that it has reached the end of a data block; this data block can be any length whatsoever, up to 4,225 bytes (the capacity of one-half of memory), comprising on control character, and 128 groups of 33 bytes each, each group including one input address and 32 bytes of data. In any event, the program controls the loading of tape, and therefore the position of an end of block indication on tape; when the end of block signal is received from the tape unit, the input scan address and strobe counters in FIG. 8 become reset and are blocked from receiving any further input data clock signals in FIG. 3. Assuming, as indicated in table 4 hereinbefore, that the first data block on the tape is a page/product block, the highest ordered bit of the control character buffer 46 (FIG. 7) will be a zero, indicating a page/product block. Receipt of the EOB causes the contents of the control character buffer of FIG. 7 to be transferred to the page/product control character buffer 116. The data content of the data bytes stored into memory during any data block can be either LACS or templates. In most cases, only template data will be loaded from the page/product blocks, although LACS are also permitted. However, not until a PL block has been read into the system from the tape, can printing begin, as is described more hereinafter.

An EOB at the end of a page/product block does not reset tape go (FIG. 18) since the system has not yet assumed the dynamic run condition; so the tape continues to run, and another data block is read into the system from tape. This again proceeds as before until the second end of block signal is received. What happens then depends upon whether the highest ordered bit of the control character buffer is a ONE or a ZERO. If it is still a ZERO, this means the second data block from tape is also a page/product block; if so, the procedure repeats; if the highest ordered bit is a ONE, this signifies that the block of data which has been received is a print line block, and the end of block signal (top of FIG. 7) causes the PL block register 106 to be set. This constitutes the first print line block following a page/product block in the same product, (provided the program conventions have been followed). Notice that the program has the option of placing page/product blocks in either half of memory in any location it desires. Also notice that the first page/product block need not consist of any more than the control character followed sufficient data to satisfy tape formatting constraints (normally 16- by 18-byte minimum block lengths are prescribed), since there is no necessity to cause the circuitry of FIG. 8 to continuously respond to input data clocks if there is no desire to store any additional bytes of data. Thus, the tape may provide a page/product block comprising nothing more than a control character, or if tape conventions require, it may comprise any number of bytes desired which could by stored in memory as a wasted effort. Then, the next data block may consist of a print line block which is stored in the half of memory from which printing is desired to commence, which is always the low ordered half. In any event, PL BLK register 106 (FIG. 7) is set, the transition turns on DYN RUN (FIG. 12). It is assumed that EOB is of sufficient duration to encompass dynamic run turning on at the top of FIG. 12 and the AND-circuit 410 operating at the bottom of FIG. 18 to reset the TAPE GO latch. This stops the tape unit.

The operation of the system now transfers to control of printing, and ultimately its interplay with control of reading successive print lines of data into storage. When the dynamic run flip-flop 246 (FIG. 12) becomes set, it enables operation of the template synch pulse circuit in FIG. 14 and no longer provides a forced reset (FIG. 18) to the output data enable trigger 424. With the latch 262 (FIG. 13) having previously been set by a system go reset, the AND-circuit 260 will generate a logic feed signal on the line 262. This logic feed signal generated in FIG. 12 is applied in FIG. 24 to set the transport run latch 574, and to enable the feed latch 566. After a suitable delay to allow the transport to attain rated speed, the feed trigger 566 is synched with roller two and becomes set, causing the feed section to run and begin to advance paper. When the feed trigger 566 is set, it is fed back to FIG. 13 to cause resetting of the latch 262; however, if in the product mode, the latch 262 is continuously held set. The feed now continues such that, when the paper has passed underneath the imager so printing can actually begin, the paper SOP signal is generated (top FIG. 25) causing (FIG. 18) the initial MBR synch pulse to set the latch 402 which causes the tape go latch 404 to again be set; the operation of the tape unit and the input circuitry is now the same as described hereinbefore. However, at this time, the data and LACS previously received will be read out of memory and used for printing.

With the dynamic run latch set (top FIG. 12) and the circuitry of FIG. 14 enabled, template synch pulses are continuously generated, causing data request pulses to be applied to the circuit of FIG. 17. As described hereinbefore, the circuitry of FIG. 14 will give priority to tape data requests but still has adequate time to service the data request pulses (providing two memory fetches for each data request pulse) for printing. The building of the printed product, by taking the uppermost dot rows of a first print line of templates, one template at a time, followed by a second dot row of all of the templates of a print row, and so forth, proceeds as described with respect to FIGS. 2 and 9 hereinbefore. When each line of printing is complete, this condition is signaled by a carry out of stage 17 of the vertical scan address counter, indicating that all of the dot rows required for a print line have been imaged. This signal comprises the MBR signal applied to FIG. 18, which commands (FIG. 18) the tape unit to again start up and load data into the other half of storage at the same time the previously received print line is being printed from the alternate half of storage. Since the dynamic run condition is now set, the EOB after each data block resets the tape go latch, which remains reset until the next MBR. This process continues until the printing of a page is complete. Then, if the product switch is open in FIG. 12, indicating the PAGE made, the occurrence of a page/product block (with the highest ordered bit of the control character equal to ZERO) will cause a P/P stop in the center of FIG. 12 and will block the AND-circuit 270 (top of FIG. 13) to prevent the logic feed latch 262 from being set again. Feed will be reset when paper reaches paper sensor one (FIGS. 21 and 24) so that paper will then be ready for a subsequent page to be printed. However, once the paper reaches paper sensor one, and the feed flip-flop 566 is shut off in FIG. 24, it cannot again be turned on since now the logic feed latch 262 of top of FIG. 13 has been reset and the AND-circuit 270 can no longer set it. Note that reliance on an end of product page/product block to turn off the logic feed latch 262, as just described, will by itself result in an extra sheet of paper being fed into the transport unit; therefore, the interpage page/product block which precedes the last group of print line blocks relating to the last sheet of paper to be printed should be programmed with the interrupt feed bit included in the control character. This interpage page/product block will be received and stored in the page/product control character buffer during the last print line of the next to last page to be printed; however, by this time feed for the last sheet on which data is to be printed will already have been initiated. Since this interpage page/product block will still have a mid product bit therein, the stop function in the center of FIG. 12 will not yet operate; thus printing can proceed as desired. In fact, the system go latch will remain up until reset by the page/product stop signal in FIG. 12, and the dynamic run latch will remain set until the system go latch is reset. The logic feed latch 262 will itself have been reset when the interrupt feed bit was sensed prior to starting to print the last page. This is so because FEED holds a continuous reset on the set-dominant LOGIC FEED latch, while the AND circuit enforces a set until the moment when NOT INTRPT FEED disappears. Timing considerations of the feed are illustrated in FIG. 22.

Programming Considerations

The system in accordance with the present invention is not only well suited to high-speed printing but also well suited to the hard copy generation of graphical information (such as performance data) and illustrations (such as bar charts). The programming necessary to provide suitable tapes of data blocks, in accordance with tables 1 through 4 hereinbefore and the description herein, will of course vary in dependence upon the type of hard copy printing or plotting which is desired. In the case of straight alphameric printing, the sequence of characters are automatically convertible into LACs, and appear in the same sequence in which printing is desired. The storage of templates is a straightforward move of binary image templates previously prepared and stored, for instance, on a disc. Then the tapes are so arranged as to load all of the desired templates for printing a page or a product into the printer system in accordance herewith, followed by sequences of LACs (usually in the four print line LAC addressing format) so as to call for the desired templates in the correct order to print the indicated text. In the case of graphical information, the programming is necessarily more complex, but may be performed in a variety of ways utilizing well known programming techniques. For instance, to operate well-known incremental plotters of the type which use "pen-up," "pen-dow" and "final location" commands, programs have been developed in a variety of forms so as to provide suitable control. These programs may be utilized so as to arrange data in a suitable digital format for further processing, which need consist of no more than breaking up the commands into template-sized areas of the desired page to be printed, and thereafter using those commands to reflect binary image data of the final desired products, on the template-sized basis. This final step may be performed by programming or by hardward, by determining the point of entry of a line or curve into a template area, the point of exit of a straight line approximation of the curve through the template, and decoding a binary image to reflect that line. The decoding may have modifications therein to present wide or narrow lines in either the X or Y direction or both. Grid lines (so as to generate the equivalent of graph paper directly within the printer to ensure precise registration) may take the same form as alphameric characters in the sense of being pregenerated and made available on tape or disc storage. The grid lines may then be ORed with the graphical information at various stages in the program, so that each graphical binary image template includes therewithin the grid line information which is desired as a background for the graph being plotted. In any event, only standard programming techniques are involved, and the achievement of the desired binary image information is well known in the art; the preparing of the binary image information together with control characters and addresses as described hereinbefore, particularly with respect to table 1 through 4, all may be performed with a variety of well-known standard programming techniques.

As described hereinbefore, the program can provide a variety of print configurations in addition to unlimited graphics. Printing and graphics may be controlled through control of the clock frequency (CLK 0, CLK 1) and through spot quadrupling (SINGLE SPOT). In addition, variations in printing can be achieved by causing the font (the actual dots to be printed) to be restricted to various portions of a template, or a linked template pair, thereby to alter the clear spacing between dots of the various characters as well as the line spacing between successive print lines. In addition, by utilizing the template configuration designations (TO, T1, T2) in various ways, the program can achieve additional flexibility in printing as well as additional data compaction in graphics.

Conclusion

The present invention thus described is capable of printing or plotting high-resolution information at very high speed. Printing is accomplished with resolution and speed equaling or exceeding that of many chain printers commonly used as hard copy outputs for data processing systems. In addition, plotting is achieved at much greater speed than incremental plotters known in the art. In addition, the present invention provides the opportunity to create backgrounds (such as plotting grid lines) directly on the copy, thus achieving an exceptionally high degree of registration accuracy.

The great speed and versatility of the present invention is due in part to the utilization of binary image information with a matrix printer. However, the invention is greatly enhanced by the fact that it does not require sending every required binary image of a character or a portion of a plot as many times as is necessary to form a page of printed text, or a page/size chart or graph. Instead, substantially all repetitive transfers may be eliminated insofar as the binary image information is concerned by utilizing indirect addressing to retrieve the binary image templates in a sequence determined by the addresses sent with the information to control printing. Thus, the order of printing is determined by the LACs; when ordinary, nonlinking template printing is desired, one LAC causes a character or a template-sized area of a plot to be printed. When linking is involved, one LAC is used to access two templates. The linked addressing also results in additional data compaction since not every storage location has to be specified by a LAC. Each LAC can reach at least 16 storage locations, and may reach 32 storage locations in the case where template linking is utilized. Thus, up to 512 binary image bits can be specified with a simple eight bit LAC address. In face, the memory read addressing herewith has a 32×32 capacity: it can access data in correct sequence to provide binary image signals for printing templates 8 dots through 32 dots wide, or from 8 dots through 32 dots high. This results in a very significant compaction of data, thus permitting printing or plotting at much higher speeds than would otherwise be possible. It also reduces the amount of time required for a data processing unit to assemble a tape necessary to control such a printer in an off-line situation.

Although described primarily herein as a system responding simply to a tape developed by a computer, it should be obvious that with suitable, well-known timing command interfaces, the system in accordance herewith is readily suited to direct online printing of a computer output. Thus, the source for presenting blocks of data signals to the system may be either a computer, or a tape drive used either off-line or online with a computer. The graphic information signals or data received from the source is received in a rather autonomous fashion by the input means which merely registers the first byte as a control character, the second and each subsequent 33rd byte as an input address for storing the remainder of the bytes in memory, and pairs of data bytes as being successive memory words of data to be stored. The input means provides addresses necessary to store 32 bytes in response to a single input address, which factor of course can vary from system to system in dependence upon the size of storage words and the nature of tape data which is received. In the present invention, it has been convenient to impose that all necessary output addresses, or LACs be stored in template-size-locations, thus permitting all loading of memory (FIG. 8) to be the same for data templates as for LACs. Of course, this may vary from system to system as dictated by the choice of conventions used, memory, and other factors. Thus, in the present embodiment, the blocks of data signals include first memory input address signals for storing the LACs or output address signals which comprise only a first or high order portion of the addresses necessary to store all of the signals, and similar second input address signals supply only a first or high order portion of the addresses necessary to store the binary image signals in the form of 16 storage words at sequential locations identified by the high order address portion. Thus the loading means in the present embodiment includes input means and addressing mean utilizing addresses provided from the source in a plurality of storage locations which all together necessitate 16 12-bit addresses, all being achieved in response to a single 8-bit address portion. The input system generates its own memory write commands, and is protected from interference with read commands utilized to access template information for printing; although the priority system of the present invention given preference to storage of incoming data over retrieval of data for printing, other priority arrangements may be provided without departing from the invention.

In the present embodiment, means for sequentially accessing the LACs or memory output addresses includes a memory read address generating means comprising the horizontal scan address counter which specifies a sequence of addresses wherein LACs are stored in the sequence needed to retrieve proper binary image data templates for printing in a correct order, as well as the vertical scan address counter, which selects sets of binary bits by generating low order address portions to use with the high order LACs. The memory read addressing, which provides sequential accessing in an interspersed fashion as described hereinbefore, is intermittently linked with template configurations. In the present embodiment, the template configurations have been expressed in a manner in which their use results in commensurate printed areas on the image receiving web, or sheets of paper. The significance of template linking is, however, more importantly related to the use of compact addressing, wherein a small address portion can store or retrieve a far more than commensurate number of storage locations, and is further more importantly concerned with the automatic association of greater amounts of data into single entities; stated alternatively, up to 512 bits of binary image information can be treated as a single entity in template linking configurations. The recognition of a template linking configuration relationship results in an alteration in which the system proceeds. Specifically, accessing, particularly of the LACs, may occur in different sequential order in dependence on the template configurations involved. As disclosed herein, for convenience in address sequence control (as described with respect to FIGS. 9 and 10 hereinbefore) linked templates are stored in adjacent storage locations having identical addresses except for the lowest ordered bit; the first template to be used is stored in the even address location and the second template to be used is stored in the odd address location. However, it should be understood that, in dependence upon parameters of a system employing the present invention, it may be convenient to utilize automatically incremented or indexed addressing to access related templates: for instance, a high-order address bit of zero could be used for the first template and a high-order address bit of one could be used for the related template, the two templates being stored in locations of memory separated by a fixed given increment as a result of high order address incrementing. In fact, the entire concept of linking commences with the linking of rows into standard templates, which has been found to be a convenient way to handle data, particularly when suitably sized addresses are chosen for a given memory means, and the template size is governed accordingly, as described hereinbefore. Thus, one could consider the linking herein to be automatically 32 storage words or 32 rows of binary image signals, with truncation to lesser numbers of rows in cases other than the 16×32 template configuration. Similarly, one may consider 32 binary bits in a template row with truncation to lesser numbers in all cases except the 32×16 template configuration. When so considered, then the concept of truncation becomes less meaningful. On the other hand, since the templates are handled in the storage area information blocks of 16 binary bits in each of two coordinates, truncation relates to utilizing less than that amount for printing. Thus the accessing means accesses less than a full template when a truncation configuration is specified; in this embodiment, that feature is achieved by presetting the vertical scan address counter for vertical truncation (16×25, 16×20) and is achieved by causing the output means to respond to less than all of the binary bits retrieved in the case of horizontal truncation (8×16).

The memory read addressing herein provides various sequences of different types of memory read addresses. For instance, one sequence comprises only first and second steps, one to access the LAC or memory output address signal and a second to use the LAC to access binary image signals.

Another sequence herein is established by the horizontal scan address counter which accesses like rows or sets of binary image information in memory in sequence, such that the first dot row of the first template in a print line is printed before the first dot row of the second template in a print line, etc., for a complete dot row. There is also a third sequence provided by the vertical scan address counter which ensures that for each complete dot row, a next subsequent row of the related templates for a print line are accessed; thus all the first dot rows of the involved templates are accessed and then all the second dot rows are accessed, etc., through the 16th rows of each of the templates for the print line. Naturally, in dependence upon design details of any system, these sequences may change, but the overall result is the sequential accessing of output address signals and binary information signals located thereby so as to provide information to the printer in the order in which printing is to be achieved.

The system control signals received herein from the source of data signals amongst the data blocks are most pertinent with respect to the present invention insofar as the PL BLK signal indicates when output addresses are available and printing can begin, and in the definition of relationships between the print operation and the standard data templates of binary image signals received from the source. Thus, recognition of a print line block is utilize to initiate printer and memory accessing operations for graphically recording data in response to the binary image signals accessed. Similarly, the template configuration relationship information stored in the input means alters the sequence of accessing, may truncate the amount of data sent from the memory to the printer, and may also reduce the number of sets of binary image bits accessed or utilized for printing. As described immediately hereinbefore, the template configurations may be considered to be print configurations, address relationships, or stored data relationships. The control means of the system includes a wide variety of functions; among these are functions to cause sequential fetching from locations within which LACs are stored, selecting the correct LAC, utilizing the LAC to fetch a template, and interlocking and synchronizing as described hereinbefore.

Although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. Graphical data processing apparatus comprising:

a matrix printer means;

a read/write means;

means for loading into said memory means data signals comprising the binary image signals of graphical data to be recorded by said matrix printer, and for further loading into said memory means a plurality of memory output addresses which correspond to the locations of said memory means wherein said binary images are stored, said memory output addresses being stored in a sequence of locations corresponding to the order in which said graphical data is to be recorded by said matrix printer;

means for sequentially accessing said memory output addresses and for using the memory output addresses to access related ones of said binary image signals at the locations of memory specified thereby; and means responsive to the output of said memory means for transferring said accessed binary image signals to said matrix printer means.

2. Graphical data processing apparatus according to claim 1 wherein:

said memory means comprises a plurality of addressable storage locations of M binary bits each;

said loading means includes means for loading said binary image signals into related addressable storage locations in the form of standard templates comprising N sets of M binary bits per set; and said accessing means includes means for accessing the addressable storage locations of said memory means in a sequence related to the order in which said binary image signals are to be utilized by said matrix printer means.

3. Graphical data processing apparatus according to claim 2 wherein:

said accessing means includes means for accessing said data in a manner so that the Nth set of one data template appears in a sequence with the Nth set of each of a plurality of other date templates, in the order in which said binary image signals are to be recorded by said matrix printer means, the N sets of a given data template being interspersed with the sets of said plurality of other data templates.

4. Graphical data processing apparatus according to claim 1 wherein:

said loading means includes means defining different relationships desired between graphics to be recorded by said matrix printer and said binary image signals; and said accessing means includes means for accessing said data differently in response to said different relationships specified by said defining means.

5. Graphical data processing apparatus according to claim 4 wherein:

said memory means comprises a plurality of addressable storage locations of M binary bits each;

said loading means includes means for loading said binary image signals into related addressable storage locations in the form of standard templates comprising N sets of M binary bits per set; and said accessing means includes means for accessing said data in a manner so that the Nth set of one data template appears in a sequence with the Nth set of each of a plurality of other data templates in the order in which said binary image signals are to be recorded by said matrix printer means, the N sets of a given data template being interspersed with the sets of said plurality of other data templates, said sequence differing in dependence upon different orders in which said binary image signals are to be recorded by said matrix printer means in dependence upon different relationships specified by said defining means.

6. Graphical data processing apparatus according to claim 4 wherein:

said accessing means has a capacity to access, repetitively, a given number of said binary image signals for recording by said matrix printer, and wherein said accessing means includes means for accessing a selected number of said binary image signals less than said given number in response to a corresponding particular relationship specified by said defining means.

7. Graphical data processing apparatus according to claim 1 wherein:

said loading means includes means defining different relationships desired between graphics to be recorded by said matrix printer and said binary image signals; and said means responsive to the output of said memory means transfers different numbers of said accessed binary image signals to said matrix printer means in response to different relationships specified by said defining means.

8. Graphical data processing apparatus according to claim 1 wherein:

said loading means comprises source means presenting said data signals and system control signals in a sequence of data blocks, and also comprises input means responsive to said source means for registering said system control signals, for storing said memory output addresses in an ordered fashion in said memory means and for storing said binary image signals in said memory means in locations corresponding to related ones of said memory output addresses.

9. Graphical data processing apparatus for printing and plotting information, in which the nature of units of information to be graphically recorded by a matrix printer are specified by binary image signals and the order in which the units are to be printed is specified by the order in which related memory output address signals are accessed, comprising:

matrix printer means for printing information on a record receiving web in the form of rows of dots in response to binary image data signals received thereat;

read/write memory means operable in response to address signals and write command signals or read command signals, alternatively, to respectively store or retrieve words of data signals within locations therein specified by said address signals;

source means presenting to said system blocks of data signals including system control signals, memory input address signals, and graphic information signals, said graphic information signals comprising either signals representing the binary image of a portion of the matrix print to be graphically recorded by said system, or memory output address signals corresponding to specific groups of said binary image signals to be utilized in graphical recording, said memory output address signals being preceded in said blocks of data signals by first memory input address signals defining related specific first storage areas in said memory means, and said binary image signals being preceded in said blocks of data signals by second memory input address signals defining related storage areas in said memory means other than said specific first storage areas, said second memory input address signals relating to the same storage area of said memory means for any group of said binary image signals as the memory output address signals related thereto;

input means for receiving said blocks of data signals, registering said system control signals, generating write command signals, and providing to said memory means memory write address signals corresponding to said memory input address signals to store said graphic information signals in related storage areas within said memory means;

memory read address generating means including means for generating and presenting to said memory means a sequence of first memory read address signals related to said first storage areas of said memory means;

system control means responsive to at least one signal of said registered system control signals for initiating operation of said address-generating means and said matrix printer means and for generating successive memory read command signals for repetitively causing plural memory read operations, at least a first one of said memory read operations fetching memory output address signals from one of said first storage areas of said memory means specified by said first memory read address signals, at least a second one of said memory read operations utilizing the memory output address signals fetched in said first memory read operation to access at least a portion of a group of binary image signals stored in one of said second storage areas of said memory means specified by said memory output address signals; and output means for transferring said accessed binary image signals from said memory means to said matrix printer means.

10. Graphical data processing apparatus according to claim 9 wherein:

said first storage areas of said memory means are sequentially addressed, and wherein said memory read address generating means includes means for generating a sequence of first memory read address signals related to successive ones of said sequentially addressed storage areas of said memory means.

11. Graphical data processing apparatus according to claim 9 wherein:

said source means presents in said blocks of data signals for registering in said input means a template configuration-designating portion of said system control signals for specifying in coded form a selected one of a plurality of relationships between the desired print configuration and said binary image signals; and said memory read-address-generating means is responsive to said print-configuration-designating portion of said system control signals registered in said input means to generate and present to said memory means different sequences of first memory read address signals in dependence upon corresponding different print relationships specified by said configuration-designating portion.

12. Graphical data processing apparatus according to claim 9 wherein:

said memory read address-generating means generates and presents to said memory means a sequence of first memory read address signals in a manner so that said first memory read operations fetch memory output address signals in an order to designate storage locations of said memory means in a sequence, the data content of said storage locations comprising the binary image signals in the order in which said binary image signals are to be recorded by said matrix printer means.

13. Graphical data processing apparatus according to claim 9 wherein:

said source means presents in said blocks of data signals second memory input addresses signals which are the same for any group of said binary image signals as the memory output address signals related thereto.

14. Graphical data processing apparatus according to claim 9 wherein:

said memory means is arranged with addressable storage locations for storing words of data signals comprising M binary bits each;

said source means presents in said blocks of data signals groups of binary image signals which comprise a plurality of sets of M binary bits per set, and said source means also presents in said blocks of data signals one group of said second memory input address signals for each multiset group of binary image signals; and said input means generates one memory write address for each set of said binary image signals received thereat, each memory write address comprising first address portion corresponding directly to the related one of said second memory input address signal groups and a second address portion, each said second address portion relating to a corresponding one of the binary image sets in the related group of binary image signals.

15. Graphical data processing apparatus according to claim 14 wherein said first address portion comprises a high-order address portion and wherein said second address portion comprises a low-order address portion.

16. Graphical data processing apparatus according to claim 14 wherein:

said source means presents in said blocks of data signals memory output address signals arranged in sets, there being a like number of binary bits in each of said address sets as are in each of said binary image signal sets, and wherein said input means generates, in response to related ones of said first memory input address signals, memory write addresses for storing said memory output address signals in the same fashion as for storing said binary image signals.

17. Graphical data processing apparatus according to claim 9 wherein:

said memory means is arranged with addressable storage locations for storing words of data signals comprising M binary bits each;

said source means presents, in said blocks of data signals, groups of binary image signals which comprise a plurality of sets of M binary bits per set, and said source means also presents, in said blocks of data signals, one group of said memory output address signals for each multiset group of binary image signals to be utilized in graphical recording; and said memory read-address-generating means includes means for generating, for each group of memory output address signals, a second memory read address for each set of binary image signals in a related group thereof, each second memory read address corresponding to the related group of memory output address signals fetched in one of said first memory read operations, said system control means causing said second memory read operations to utilize said second memory read addresses.

18. Graphical data processing apparatus according to claim 17 wherein:

said source means presents, in said blocks of data signals, groups of binary image signals arranged in standard data templates of N sets of M binary bits per set, and said system control signals include signals defining a selected one of a plurality of relationships between images to be recorded and said standard data templates; and said memory read-address-generating means generates different sequences of addresses in dependence upon said selected relationship.

19. Graphical data processing apparatus according to claim 17 wherein:

said memory read-address-generating means includes means for generating, for each group of memory output address signals, one second memory read address for each set of binary image signals in a related group thereof, each of said second memory read address comprising a first address portion corresponding directly to the related group of memory output address signals fetched in one of said first memory read operations, and a second portion corresponding to a specific related one of the binary image sets in a related group of binary image signals.

20. Graphical data processing apparatus according to claim 19 wherein said first address portion comprises a high-order portion and wherein said second address portion comprises a low-order portion.

21. Graphical data processing apparatus according to claim 19 wherein:

a group of said binary image signals having N sets of M binary bits each comprises a standard data template;

said source means presents in said blocks of data signals only one group of said memory output address signals for each of said data templates;

said memory read-address-generating means generates one of said second memory read addresses for each set of binary image signals in a template, each said second memory read address including a high-order portion related to said memory output address signals and a low-order portion relating to the specific set of the template.

22. Graphical data processing apparatus according to claim 17 wherein:

said system control signals include signals defining a selected one of a plurality of relationships between images to be recorded and said standard data templates; and said memory read-address-generating means includes means responsive to a template linking template configuration for generating and presenting to said memory means identical ones of said first memory read address signals for said first memory read operations corresponding to a related linked group.

23. A graphical data processing apparatus according to claim 17 wherein:

a groups of binary image signals having N sets of M binary bits each comprises a standard data template, and wherein said source means presents in said blocks of data signals a template configuration designating portion of said system control signals for specifying in coded form a selected one of a plurality of relationships between the desired print configuration and said standard data templates, at least one of said template configuration relationships including vertical template truncation in which less than N sets of binary bits of at least some of said standard data templates are to be utilized for printing; and said memory read-address-generating means is responsive to a vertical template truncation configuration registered in said input means to generate, for any standard data template to be truncated as a result of said template truncation configuration control signals, second memory read addresses for each set of binary image signals within the template configuration to be utilized for printing, said second memory read-address-generating means not generating second memory read addresses for those sets of a standard template eliminated from printing as a result of truncation.

24. A graphical data processing apparatus according to claim 17 wherein:

a group of binary image signals including N sets of M binary bits each comprises a standard data template, and wherein said source means presents in said blocks of data signals a template configuration-designating portion of said system control signals for specifying in coded form a selected one of a plurality of relationships between the desired print configuration and said standard data templates, at least one of said template configuration relationships including horizontal truncation in which less than M binary bits of each set within said standard data templates are to be printed; and said output means transfers to said matrix printer means only those binary bits of each set to be utilized for printing in the configuration specified by said horizontal truncation relationship.

25. A graphical data processing apparatus according to claim 24 wherein:

said system control means includes clocking means for generating element clock signals;

said output means includes means for transferring said accessed binary image signals to said matrix printer serially by bit, each bit transferred in response to one of said element clock signals;

said system control means includes generating a template synch pulse for initiating said plural memory read operations, said template synch pulse being generated normally in response to each Mth one of said element clock signals, said system control means generating one of said template synch pulse signals in response to less than M of said element clock signals in response to there being registered in said input means a template configuration-designating portion of said system control signals specifying said horizontal truncation configuration.

26. A graphical data processing apparatus according to claim 17 wherein:

N sets of M binary bits each of said binary image signals comprise a standard data template, and wherein said source means presents in said blocks of data signals a template configuration designating portion of said system control signals for specifying in coded form a selected one of a plurality of relationships between the desired print configuration and said standard data templates, at least one of said template configuration relationships including template linking in which a plurality of said standard data templates are to be related in a linked group for printing;

said source means presents in said blocks of data signals having a template configuration portion specifying a template linking relationship, only one group of said memory output address signals for each related linked group of said data templates; and said memory read-address-generating means is responsive to a template linking configuration registered in said input means to generate one of said second memory read addresses for each set of binary image signals in a related linked group, each said second memory read address including a first portion related to said memory output address signals and a second portion relating to the specific set in the related linked group, the first portions relating to one standard template being different from the first portions relating to another standard template of the same related linking group.

27. Graphical data processing apparatus according to claim 26 wherein:

at least one of said template linking, template configuration relationships comprises horizontal linking wherein K standard data templates are related in a linked group arranged as N set of K × M binary bits each; and said memory read-address-generating means is responsive to a horizontal linking template configuration registered in said input means to generate sequential first address portions for the standard data templates in the related linked group.

28. A graphical data processing apparatus according to claim 26 wherein:

said source means presents, in one of said blocks of data signals having a template configuration portion specifying a nonlinking template relationship, only one group of said memory output address signals for each related one of said standard data templates; and said memory read-address-generating means is responsive to a nonlinking template configuration registered in said input means to generate one of said second memory read addresses for each set of binary image signals in a related template, each said second memory read address including a first portion related directly to said memory output address signals and a second portion relating to the specific set in a template.

29. A graphical data processing apparatus according to claim 26 wherein:

said matrix printer includes means responsive to binary image signals received in an ordered fashion thereat for generating corresponding dot images in a like ordered fashion;

at least one of said template linking, template configuration relationships comprises horizontal linking wherein the standard data templates of a related linked group are to be graphically recorded in adjacent sequence to one another in said ordered fashion; and said memory read-address-generating means is responsive to a horizontal linking template configuration registered in said input means to generate sequential first address portions for the standard data templates in the related linked group.

30. Graphical data processing apparatus according to claim 29 wherein said first address portion comprises a high-order portion and wherein said second address portion comprises a low-order portion.

31. A graphical data processing apparatus according to claim 26 wherein:

said matrix printer includes means responsive to binary image signals received in an ordered fashion thereat for generating corresponding dot images in a like ordered fashion;

at least one of said template linking, template configuration relationships comprises vertical linking in which the standard data templates of a related linked group are to be recorded in adjacent sequence to one another in a direction perpendicular to the direction in which said corresponding dot images are sequentially generated; and said memory read-address-generating means is responsive to a vertical linking template configuration registered in said input means to generate high-order address portions for the related standard data templates of each related linked group displaced from one another in a sequence of memory read addresses by as many other high-order address portions as there are templates of binary image signals between said linked templates required to print said images in said ordered fashion.

32. A graphical data processing apparatus according to claim 17 wherein:

said output means includes means for transferring said accessed binary image signals to said matrix printer serially by binary bit;

said matrix printer includes means responsive to binary image signals serially received thereat for generating corresponding dot images in a row, and means advancing a record-receiving web past said image-generating means, said image-generating means scanning said web transversely once for each row of dots printable thereon; and said read-address-generating means generates said sequence of read address signals so as to sequentially access the memory locations related to like sets of a sequence of said templates, whereby each row of dots is created by said image generating means in response to at least a portion of a related set of each a plurality of said data templates, a complete printline comprising a plurality of sets of each of said plurality of data templates.

33. A graphical data processing apparatus according to claim 32 wherein:

said system control means includes clock means for generating element clock signals, said clock means being adjustable to vary the rate of said element clock signals; and said output means is responsive to said clock means to present one binary bit to said matrix printer for each of said element clock signals, whereby the rate of generating said dot images is controllable by adjusting said clock means.

34. A graphical data processing apparatus according to claim 33 wherein:

the rate at which said image-generating means scans said web transversely for each row of dots is independent of said element clock signals, whereby the spacing of said dots in rows is adjustable by adjusting said clock means.

35. A graphical data processing apparatus according to claim 34 wherein:

said clock means includes means for generating start of sweep signals related to said element clock signals;

said image-generating means is responsive to each of said start of sweep signals to scan said web transversely once, and then wait until the next start of sweep signal; and wherein said matrix printer advances said record-receiving web past said image-generating means continuously, whereby the spacing between rows of dots varies as said clock means is adjusted.

* * * * *

UNITED STATES PATENT OFFICE
CERTIFICATE OF CORRECTION

Patent No. 3,634,828 Dated January 11, 1972

Inventor(s) Roderick H. Myers and David L. Sharp

It is certified that error appears in the above-identified patent and that said Letters Patent are hereby corrected as shown below:

Claim 1, Column 37, line 52, after "write" insert
-- memory --

Claim 3, Column 38, line 14, change "date" to -- data --

Claim 12, Column 40, line 16, change "address-generating"
to -- address generating --

Claim 13, Column 40, line 28, change "addresses" to
-- address --

Claim 23, Column 41, line 67, change "groups" to -- group --

Claim 25, Column 42, line 41, after "includes" insert
-- means --

Claim 26, Column 43, line 5, change "linking" to
-- linked --

Claim 27, Column 43, line 11, change "set" to -- sets --

Claim 32, Column 44, line 29, after "each" insert -- of --

Claim 32, Column 44, line 30, change "complete" to
-- completed --

UNITED STATES PATENT OFFICE

CERTIFICATE OF CORRECTION

Patent No. 3,634,828 Dated January 11, 1972

Inventor(s) Roderick H. Myers and David L. Sharp PAGE - 2

It is certified that error appears in the above-identified patent and that said Letters Patent are hereby corrected as shown below:

Change "read-address-generating" to -- read address generating -- in the following instances:

Claim 17, Column 41, line 3

Claim 18, Column 41, line 20

Claim 19, Column 41, line 25

Claim 21, Column 41, line 47

Claim 23, Column 42, line 5

Claim 23, Column 42, line 12

Claim 26, Column 42, line 68

Claim 27, Column 43, line 12

Claim 28, Column 43, line 24

Claim 29, Column 43, line 43

Claim 31, Column 44, line 4

Claim 32, Column 44, line 24

Signed and sealed this 15th day of August 1972.

(SEAL)
Attest:

EDWARD M.FLETCHER,JR.
Attesting Officer

ROBERT GOTTSCHALK
Commissioner of Patents